US011985633B2

(12) United States Patent
Lee et al.

(10) Patent No.: US 11,985,633 B2
(45) Date of Patent: *May 14, 2024

(54) METHOD FOR TRANSMITTING AND RECEIVING FRAME

(71) Applicant: NEWRACOM, INC., Lake Forest, CA (US)

(72) Inventors: Ilgu Lee, Daejeon (KR); Changwahn Yu, Daejeon (KR)

(73) Assignee: ATLAS GLOBAL TECHNOLOGIES LLC, Austin, TX (US)

( * ) Notice: Subject to any disclaimer, the term of this patent is extended or adjusted under 35 U.S.C. 154(b) by 448 days.

This patent is subject to a terminal disclaimer.

(21) Appl. No.: 17/139,826

(22) Filed: Dec. 31, 2020

(65) Prior Publication Data

US 2021/0127392 A1    Apr. 29, 2021

Related U.S. Application Data

(63) Continuation of application No. 16/039,675, filed on Jul. 19, 2018, now Pat. No. 10,904,878, which is a continuation of application No. 14/708,030, filed on May 8, 2015, now Pat. No. 10,057,899.

(60) Provisional application No. 62/081,952, filed on Nov. 19, 2014, provisional application No. 61/991,396, filed on May 9, 2014.

(30) Foreign Application Priority Data

Mar. 16, 2015  (KR) .......................... 10-2015-0036222
Apr. 6, 2015   (KR) .......................... 10-2015-0048209

(51) Int. Cl.
*H04W 72/0446*   (2023.01)
*H04L 1/00*      (2006.01)
*H04L 25/02*     (2006.01)
*H04W 72/30*     (2023.01)
*H04W 72/00*     (2023.01)
*H04W 84/12*     (2009.01)

(52) U.S. Cl.
CPC .......... *H04W 72/0446* (2013.01); *H04L 1/00* (2013.01); *H04L 1/0083* (2013.01); *H04L 25/02* (2013.01); *H04L 25/0202* (2013.01); *H04L 25/0226* (2013.01); *H04W 72/30* (2023.01); *H04W 72/00* (2013.01); *H04W 84/12* (2013.01)

(58) Field of Classification Search
CPC . H04W 72/0446; H04W 72/30; H04W 72/00; H04W 84/12; H04L 1/00; H04L 1/0083; H04L 25/02; H04L 25/0202; H04L 25/0226

See application file for complete search history.

(56) References Cited

U.S. PATENT DOCUMENTS 9,397,805 B2 *  7/2016  Vermani ............... H04L 5/0044

* cited by examiner

*Primary Examiner* — Rhonda L Murphy

(57) ABSTRACT

A frame transmission method is provided by a device in a wireless communication network. The device generates a signal field including a symbol using a 64 FFT and carrying signaling information, and generates a data field including a symbol using a FFT having a larger size than the 64 FFT and carrying data. The device transmits a frame including the signal field and the data field.

20 Claims, 48 Drawing Sheets

METHOD FOR TRANSMITTING AND RECEIVING FRAME

CROSS-REFERENCE TO RELATED APPLICATION

This application is a continuation of U.S. patent application Ser. No. 16/039,675, filed Jul. 19, 2018, which is a continuation of U.S. patent application Ser. No. 14/708,030, filed on May 8, 2015, now U.S. Pat. No. 10,057,899, which claims the benefit of U.S. Provisional Applications No. 61/991,396, filed on May 9, 2014, and No. 62/081,952, filed on Nov. 19, 2014 in the U.S. Patent and Trademark Office, and the benefit of Korean Patent Applications No. 10-2015-0036222, filed on Mar. 16, 2015, and No. 10-2015-0048209, filed Apr. 6, 2015, in the Korean Intellectual Property Office, the entire contents of all of which are incorporated herein by reference.

BACKGROUND

(a) Field

The described technology relates generally to a method for transmitting and receiving method. More particularly, the described technology relates generally to a method for transmitting and receiving method in a wireless local area network (WLAN).

(b) Description of the Related Art

A WLAN is being standardized by the IEEE (Institute of Electrical and Electronics Engineers) Part 11 under the name of "Wireless LAN Medium Access Control (MAC) and Physical Layer (PHY) Specifications." After an original standard was published on 1999, new version standards are continuously published by amendments. The IEEE standard 802.11a (IEEE Std 802.11a-1999) supporting 2.4 GHz band was published on 1999, and the IEEE standard 802.11g (IEEE Std 802.11g-2003) supporting 5 GHz band was published on 2003. These standards are called legacy. Subsequently, the IEEE standard 802.11n (IEEE Std 802.11n-2009) for enhancements for higher throughput (HT) was published on 2009, and the IEEE standard 802.11ac (IEEE 802.11ac-2013) for enhancements for very high throughput (VHT) was published on 2013.

Recently, scenarios that many devices densely exist in the WLAN frequently occur, and the system throughput is deteriorated in the high density scenarios. Accordingly, a high efficiency WLAN (HEW) for enhancing the system throughput in high density scenarios is being developed by the IEEE 802.11ax task group. Particularly, a frame transmitting method and a frame receiving method for enhancing the system throughput are required.

SUMMARY

An embodiment of the present invention provides a frame transmitting method and a frame receiving method for enhancing the system throughput.

According to another embodiment of the present invention, a method of transmitting a frame is provided by a device in a wireless communication network. The method includes generating a first signal field including a symbol having first subcarrier spacing, the first signal field carrying signaling information, generating a data field including a symbol having the second subcarrier spacing narrower than the first subcarrier spacing, the data field carrying data, and transmitting a frame including the first signal field and the data field.

The second subcarrier spacing may be ¼ of the first subcarrier spacing.

An FFT period of the symbol having the second subcarrier spacing may be four times of an FFT period of the symbol having the first subcarrier spacing.

A set of allowable guard intervals for the symbol having the second subcarrier spacing may include 0.8 μs, 1.6 μs, and 3.2 μs.

The method may further include generating a long training field following the first signal field and used for channel estimation, and the long training field may include a symbol having the second subcarrier spacing.

An entire bandwidth may be divided in to a plurality of bands each having a predetermined bandwidth and the first signal may be duplicated and transmitted on the plurality of bands. The entire bandwidth may be divided into a plurality of resource blocks for a plurality of users in the data field and a bandwidth narrower than the predetermined bandwidth may be allowed for the plurality of resource blocks.

The method may further include a legacy preamble preceding the first signal field and being compatible with a previous version wireless communication network. The legacy preamble may include a short training field, a long training field, and a second signal field, and the short training field, the long training field, and the second signal field may be duplicated and transmitted on the plurality of bands.

According to yet another embodiment of the present invention, a method of transmitting a frame is provided by a device in a wireless communication network. The method includes dividing a band into a plurality of subbands, transmitting on the band a first part including a legacy preamble compatible with a previous version wireless communication network and a signal field carrying signaling information, and transmitting a second part including a data field carrying data on a corresponding subband among the plurality of subbands.

The second part may further include a long training field following the signal field and used for channel estimation.

The first part may further include a short training field following the signal field and used for an automatic gain control.

A symbol of the first part and a symbol of the second part may have the same subcarrier spacing.

Subcarrier spacing of a symbol of the second part may be narrower than subcarrier spacing of a symbol of the second part.

A first FFT may be used in the first part and a second FFT having the larger size than the first FFT may be used in the second part.

The method may further include allocating pilots to the second part to allow a phase tracking to be performed by a symbol period unit including a plurality of consecutive symbols.

According to still another embodiment of the present invention, a method of receiving a frame is provided by a device in a wireless communication network. The method includes receiving a first part having first subcarrier spacing and including a first signal carrying signaling information, decoding a symbol of the first part on a basis of the first subcarrier spacing, receiving a second part having second subcarrier spacing narrower than the first subcarrier spacing and including a data signal carrying data, and decoding a symbol of the second part on a basis of the second subcarrier spacing.

The second subcarrier spacing may be ¼ of the first subcarrier spacing.

An FFT period of the symbol having the second subcarrier spacing may be four times of an FFT period of the symbol having the first subcarrier spacing.

A set of allowable guard intervals for the symbol having the second subcarrier spacing may include 0.8 μs, 1.6 μs, and 3.2 μs.

Receiving the first part may include receiving the first part on a band which is assigned to the device, and receiving the second part may include receiving the second part on a subband that corresponds to the device among a plurality of subbands into which the band is divided.

The method may further include performing a phase tracking by extracting pilots by a symbol period unit including a plurality of consecutive symbols.

According to further embodiment of the present invention, an apparatus for transmitting a frame is provided by a device in a wireless communication network. The apparatus includes a processor and a transceiver. The processor generates a first signal field including a symbol having first subcarrier spacing, the first signal field carrying signaling information, and generates a data field including a symbol having the second subcarrier spacing narrower than the first subcarrier spacing, the data field carrying data. The transceiver transmits a frame including the first signal field and the data field.

According to further embodiment of the present invention, an apparatus for transmitting a frame is provided by a device in a wireless communication network. The apparatus includes a processor and a transceiver. The processor divides a band into a plurality of subbands. The transceiver transmits on the band a first part including a legacy preamble compatible with a previous version wireless communication network and a signal field carrying signaling information, and transmits a second part including a data field carrying data on a corresponding subband among the plurality of subbands.

According to further embodiment of the present invention, an apparatus for receiving a frame is provided by a device in a wireless communication network. The apparatus includes a processor and a transceiver. The transceiver receives a first part having first subcarrier spacing and including a first signal carrying signaling information, and receives a second part having second subcarrier spacing narrower than the first subcarrier spacing and including a data signal carrying data. The processor decodes a symbol of the first part on a basis of the first subcarrier spacing and decodes a symbol of the second part on a basis of the second subcarrier spacing.

DETAILED DESCRIPTION OF THE EMBODIMENTS

Figure 1:
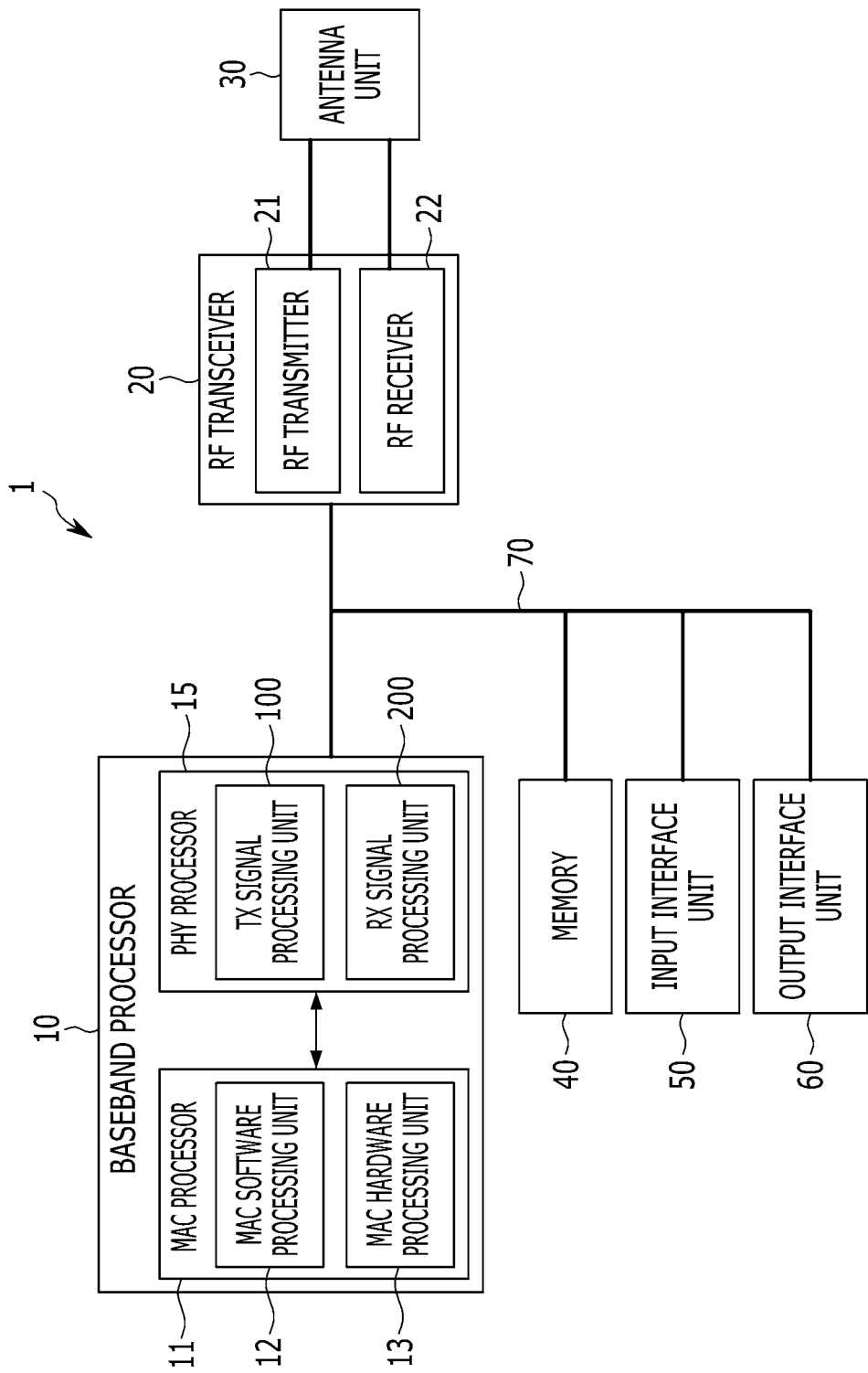
FIG. 1 is a schematic block diagram exemplifying a WLAN device.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Ina wireless local area network (WLAN), a basic service set (BSS) includes a plurality of WLAN devices. The WLAN device may include a medium access control (MAC) layer and a physical (PHY) layer according to the IEEE (Institute of Electrical and Electronics Engineers) standard 802.11. The plurality of WLAN devices may include a WLAN device that is an access point and the other WLAN devices that are non-AP stations (non-AP STAs). Alternatively, all the plurality of WLAN devices may be non-AP STAs in Ad-hoc networking. In general, the AP STA and the non-AP STA may be collectively called the STA. However, for easy description, only the non-AP STA may be called the STA.

FIG. 1 is a schematic block diagram exemplifying a WLAN device.

Referring to FIG. 1, the WLAN device 1 includes a baseband processor 10, a radio frequency (RF) transceiver 20, an antenna unit 30, a memory 40, an input interface unit 50, an output interface unit 60, and a bus 70.

The baseband processor 10 performs baseband signal processing, and includes a MAC processor 11 and a PHY processor 15.

In one embodiment, the MAC processor 11 may include a MAC software processing unit 12 and a MAC hardware processing unit 13. The memory 40 may store software (hereinafter referred to as "MAC software") including at least some functions of the MAC layer. The MAC software processing unit 12 executes the MAC software to implement the some functions of the MAC layer, and the MAC hardware processing unit 13 may implement remaining functions of the MAC layer as hardware (hereinafter referred to "MAC hardware"). However, the MAC processor 11 is not limited to this.

The PHY processor 15 includes a transmitting signal processing unit 100 and a receiving signal processing unit 200.

The baseband processor 10, the memory 40, the input interface unit 50, and the output interface unit 60 may communicate with each other via the bus 70.

The RF transceiver 20 includes an RF transmitter 21 and an RF receiver 22.

The memory 40 may further store an operating system and applications. The input interface unit 50 receives information from a user, and the output interface unit 60 outputs information to the user.

The antenna unit 30 includes one or more antennas. When multiple-input multiple-output (MIMO) or multi-user MIMO (MU-MIMO) is used, the antenna unit 30 may include a plurality of antennas.

Figure 2:
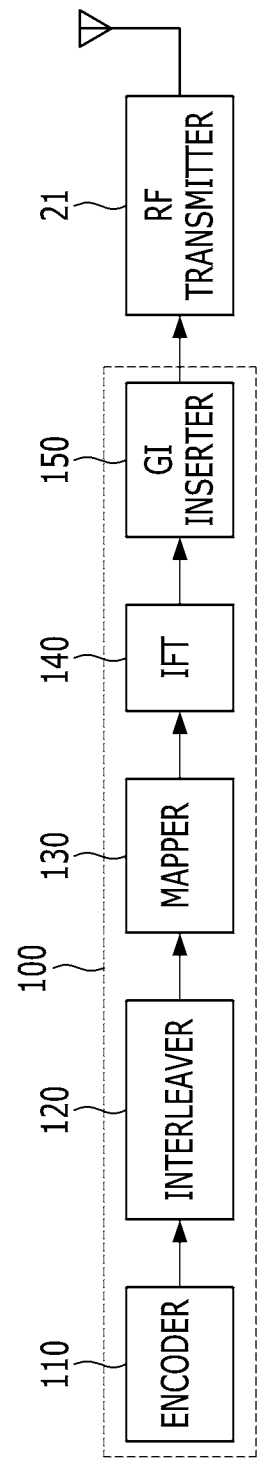
FIG. 2 is a schematic block diagram exemplifying a transmitting signal processor in a WLAN.

FIG. 2 is a schematic block diagram exemplifying a transmitting signal processor in a WLAN.

Referring to FIG. 2, a transmitting signal processing unit 100 includes an encoder 110, an interleaver 120, a mapper 130, an inverse Fourier transformer (IFT) 140, and a guard interval (GI) inserter 150.

The encoder 110 encodes input data. For example, the encoder 100 may be a forward error correction (FEC) encoder. The FEC encoder may include a binary convolutional code (BCC) encoder followed by a puncturing device, or may include a low-density parity-check (LDPC) encoder.

The transmitting signal processing unit 100 may further include a scrambler for scrambling the input data before the encoding to reduce the probability of long sequences of 0s or 1s. If BCC encoding is used in the encoder, the transmitting signal processing unit 100 may further include an encoder parser for demultiplexing the scrambled bits among a plurality of BCC encoders. If LDPC encoding is used in the encoder, the transmitting signal processing unit 100 may not use the encoder parser.

The interleaver 120 interleaves the bits of each stream output from the encoder to change order of bits. Interleaving may be applied only when BCC encoding is used. The mapper 130 maps the sequence of bits output from the interleaver to constellation points. If the LDPC encoding is used in the encoder, the mapper 130 may further perform LDPC tone mapping besides the constellation mapping.

When the MIMO or the MU-MIMO is used, the transmitting signal processing unit 100 may use a plurality of interleavers 120 and a plurality of mappers corresponding to the number of $N_{SS}$ of spatial streams. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When the MIMO or the MU-MIMO is used, the transmitting signal processing unit 100 may insert cyclic shift diversities (CSDs) to prevent unintentional beamforming. The CSD insertion may occur before or after the inverse Fourier transform. The CSD may be specified per transmit chain or may be specified per space-time stream. Alternatively, the CSD may be applied as a part of the spatial mapper.

When the MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When the MIMO or the MU-MIMO is used, the GI inserter 150 and the RF transmitter 21 may be provided for each transmit chain.

Figure 3:
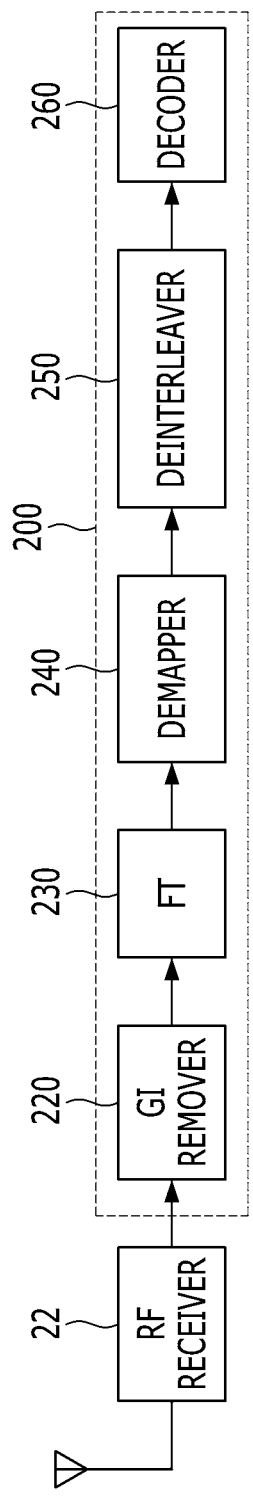
FIG. 3 is a schematic block diagram exemplifying a receiving signal processing unit in the WLAN.

FIG. 3 is a schematic block diagram exemplifying a receiving signal processing unit in the WLAN.

Referring to FIG. 3, a receiving signal processing unit 200 includes a GI remover 220, a Fourier transformer (FT) 230, a demapper 240, a deinterleaver 250, and a decoder 260.

An RF receiver 22 receives an RF signal via the antenna unit 30 and converts the RF signal into the symbols. The GI remover 220 removes the GI from the symbol. When the MIMO or the MU-MIMO is used, the RF receiver 22 and the GI remover 220 may be provided for each receive chain.

The FT 230 converts the symbol (i.e., the time domain block) into a block of the constellation points by using a discrete Fourier transform (DFT) or a fast Fourier transform (FFT). The Fourier transformer 230 may be provided for each receive chain.

When the MIMO or the MU-MIMO is used, the receiving signal processing unit 200 may a spatial demapper for converting the Fourier transformed receiver chains to constellation points of the space-time streams, and an STBC decoder for despreading the constellation points from the space-time streams into the spatial streams.

The demapper 240 demaps the constellation points output from the Fourier transformer 230 or the STBC decoder to the bit streams. If the LDPC encoding is used, the demapper 240 may further perform LDPC tone demapping before the constellation demapping. The deinterleaver 250 deinterleaves the bits of each stream output from the demapper 240. Deinterleaving may be applied only when BCC encoding is used.

When the MIMO or the MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder, the receiving signal processing unit 200 may further include an encoder deparser for multiplexing the data decoded by a plurality of BCC decoders. If LDPC decoding is used in the decoder, the receiving signal processing unit 100 may not use the encoder deparser.

Figure 4:
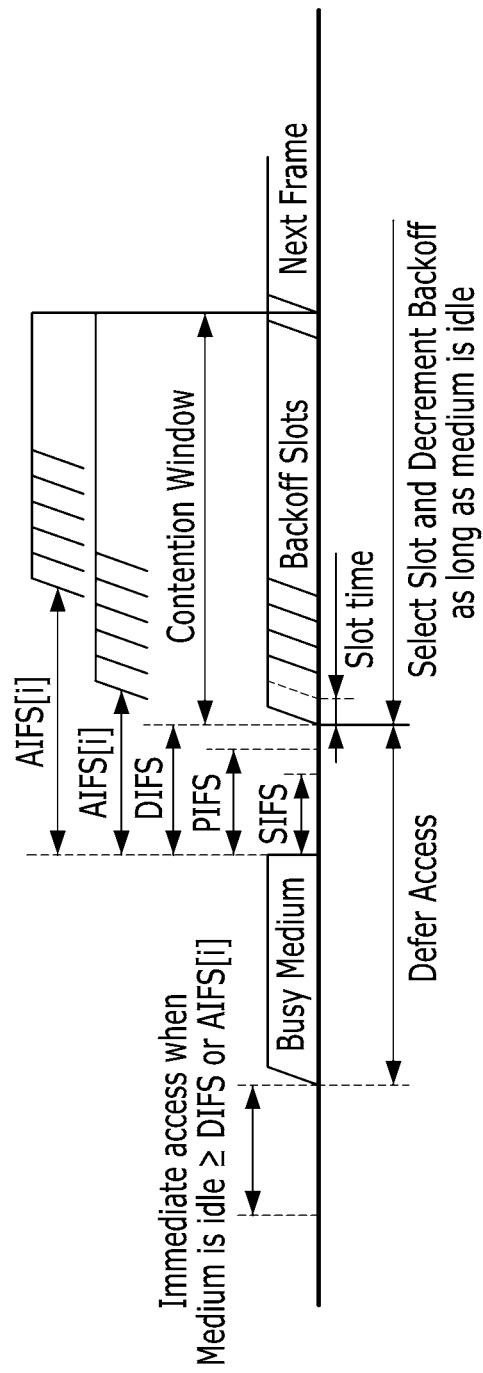
FIG. 4 exemplifies IFS relationships.

FIG. 4 exemplifies interframe space (IFS) relationships.

A data frame, a control frame, or a management frame may be exchanged between WLAN devices.

The data frame is used for transmission of data forwarded to a higher layer. The WLAN device transmits the data frame after performing backoff if a distributed coordination function IFS (DIFS) has elapsed from a time when the medium has been idle. The management frame is used for exchanging management information which is not forwarded to the higher layer. Subtype frames of the management frame include a beacon frame, an association request/response frame, a probe request/response frame, and an authentication request/response frame. The control frame is used for controlling access to the medium. Subtype frames of the control frame include a request to send (RTS) frame, a clear to send (CTS) frame, and an acknowledgement (ACK) frame. In the case that the control frame is not a response frame of the other frame, the WLAN device transmits the control frame after performing backoff if the DIFS has elapsed. In the case that the control frame is the response frame of the other frame, the WLAN device transmits the control frame without performing backoff if a short IFS (SIFS) has elapsed. The type and subtype of frame may be identified by a type field and a subtype field in a frame control field.

On the other hand, a Quality of Service (QoS) STA may transmit the frame after performing backoff if an arbitration IFS (AIFS) for access category (AC), i.e., AIFS[AC], has elapsed. In this case, the data frame, the management frame, or the control frame which is not the response frame may use the AIFC[AC].

Figure 5:
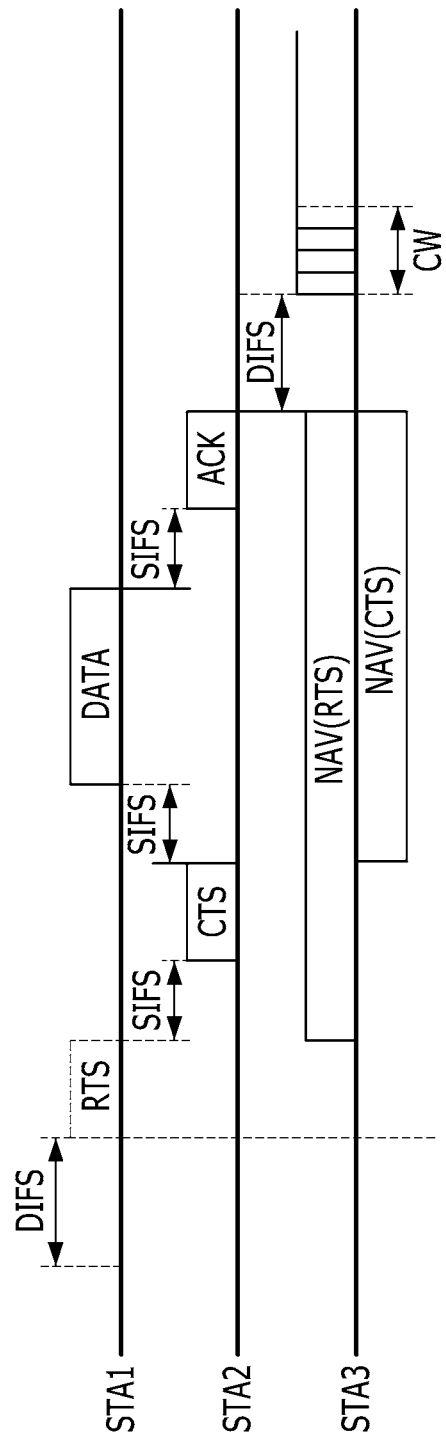
FIG. 5 is a schematic diagram explaining CSMA/CA based frame transmission procedure for avoiding collision between frames in a channel.

FIG. 5 is a schematic diagram explaining a CSMA (carrier sense multiple access)/CA (collision avoidance) based frame transmission procedure for avoiding collision between frames in a channel.

Referring to FIG. 5, STA1 is a transmit WLAN device for transmitting data, STA2 is a receive WLAN device for receiving the data, and STA3 is a WLAN device which may be located at an area where a frame transmitted from the STA1 and/or a frame transmitted from the STA2 can be received by the WLAN device.

The STA1 may determine whether the channel is busy by carrier sensing. The STA1 may determine the channel occupation based on an energy level on the channel or correlation of signals in the channel, or may determine the channel occupation by using a network allocation vector (NAV) timer.

When determining that the channel is not used by other devices during DIFS (that is, the channel is idle), the STA1 may transmit an RTS frame to the STA2 after performing backoff. Upon receiving the RTS frame, the STA2 may transmit a CTS frame as a response of the CTS frame after SIFS.

When the STA3 receives the RTS frame, it may set the NAV timer for a transmission duration of subsequently transmitted frames (for example, a duration of SIFS+CTS frame duration+SIFS+data frame duration+SIFS+ACK frame duration) by using duration information included in the RTS frame. When the STA3 receives the CTS frame, it may set the NAV timer for a transmission duration of subsequently transmitted frames (for example, a duration of SIFS+data frame duration+SIFS+ACK frame duration) by using duration information included in the RTS frame. Upon receiving a new frame before the NAV timer expires, the STA3 may update the NAV timer by using duration information included in the new frame. The STA3 does not attempt to access the channel until the NAV timer expires.

When the STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after SIFS elapses.

When the NAV timer expires, the STA3 may determine whether the channel is busy by the carrier sensing. Upon determining that the channel is not used by the other devices during DIFS after the NAV timer has expired, the STA3 may attempt the channel access after a contention window according to random backoff elapses.

Figure 6:
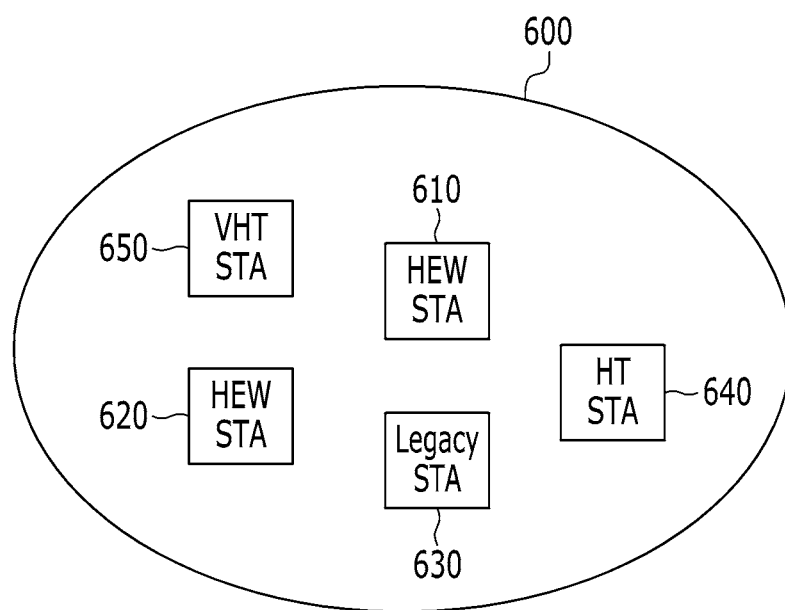
FIG. 6 shows an example of a wireless communication network according to an embodiment of the present invention.
Figure 7:
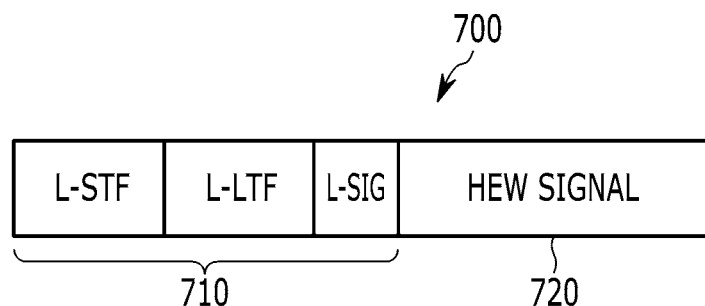
FIG. 7, FIG. 8, FIG. 9, FIG. 10, and FIG. 11 each schematically exemplify a frame format of a wireless communication network according to various embodiments of the present invention.
Figure 8:
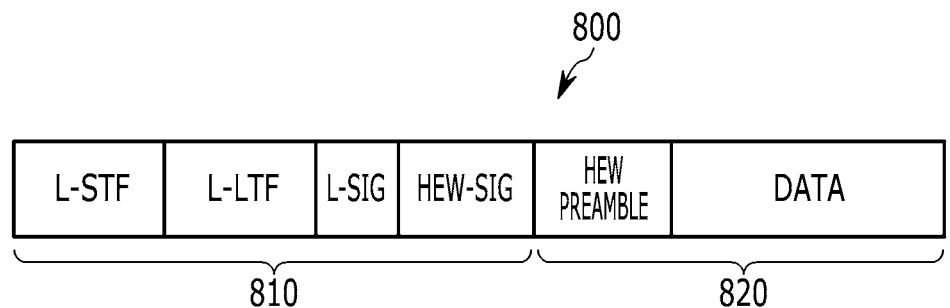

FIG. 6 shows an example of a wireless communication network according to an embodiment of the present invention, and FIG. 7 and FIG. 8 each schematically exemplify a frame format of a wireless communication network according to various embodiments of the present invention.

Referring to FIG. 6, a BSS 600 includes a plurality of WLAN devices. In the plurality of WLAN devices includes a device 610 that is an AP and devices 620, 630, 640, and 650 that are non-AP STAs, i.e., STAs.

The AP 610 supports a wireless communication network according to an embodiment of the present invention. For example, the wireless communication network according to an embodiment of the present invention may be a new version WLAN. One example of the new version WLAN is a high efficiency WLAN (HEW) that is being developed by the IEEE 802.11ax task group. Hereinafter, the wireless communication network according to an embodiment of the present invention is assumed as the HEW for convenience. The AP supporting the HEW is called a HEW-AP.

The STAs 620, 630, 640, and 650 included in the BSS 600 may include the STA (hereinafter referred to as "HEW-STA") 620 supporting the HEW and/or the STAs 630, 640, and 650 of the previous version. The previous version STAs may include, for example, an STA (hereinafter referred to as a "legacy-STA") 630 supporting IEEE standard 802.11a or 802.11g (IEEE Std 802.11a-1999 or IEEE Std 802.11g-2003), an STA (hereinafter referred to as an "HT-STA") 640 supporting IEEE standard 802.11n (IEEE Std 802.11n-2009) for enhancements for higher throughput (HT), or an STA (hereinafter referred to as a "VHT-STA") 650 supporting IEEE standard 802.11ac (IEEE Std 802.11ac-2013) for enhancements for very high throughput (VHT).

In the BSS 600, the HEW-AP 610 may transmit to the HEW-STA 620 a frame of a transmission mode (hereinafter referred to as a "HEW mode") according to the IEEE standard 802.11ax. The HEW-AP 610 may transmit to the previous version STA 630, 640, or 650 a previous version frame, for example a frame of a transmission mode (hereinafter referred to as a "legacy mode") according to the IEEE standard 802.11a or IEEE 802.11g, a frame of a transmission mode (hereinafter referred to as an "HT mode") according to the IEEE standard 802.11n, or a frame of a transmission mode (hereinafter referred to as a "VHT mode") according to the IEEE standard 802.11ac. The HEW-STA 620 may transmit a frame of the HEW mode to the HEW-AP 610. The previous version STA 630, 640, or 650 may transmit to the HEW-AP 610 a previous version frame, for example a frame of the legacy mode, the HT mode, or the VHT mode.

Hereinafter, an AP or STA supporting the HEW is called a "HEW device", an AP or STA supporting the IEEE standard 802.11a or IEEE 802.11g is called a "legacy device", an AP or STA supporting IEEE standard 802.11n is called an "HT device", and an AP or STA supporting IEEE standard 802.11ac is called a "VHT device".

When a different band from 2.4 GHz or 5 GHz band is used in the WLAN, other WLAN standards may be used as the previous version WLAN. For example, when a TV white space band is used, IEEE standard 802.11af may be used as the previous version WLAN. When 1 GHz or less band is used, IEEE standard 802.11ah may be used as the previous version WLAN.

Referring to FIG. 7, a frame 700 according to an embodiment of the present invention includes a legacy signal part 710 and a signal part for a wireless communication network according to the present embodiment, for example a HEW signal part 720. The frame 700 shown in FIG. 7 and frames to be described below may be physical layer (PHY) frames, for example a physical layer convergence procedure (PLCP) frames.

The legacy signal part 710 includes a legacy short training field (L-STF), a legacy long training field (L-LTF), and a legacy signal field (L-SIG) for backward compatibility with previous version WLAN devices. The L-STF and the L-LTF may be used for synchronization and channel estimation. The L-SIG may include rate and length information. The L-SIG includes one symbol, i.e., an orthogonal frequency division multiplexing (OFDM) symbol.

The HEW signal part 720 carries signaling information for a HEW device. The signaling information includes information necessary for interpreting the frame 700. The HEW signal part 720 includes a HEW signal field (HEW-SIG) following the legacy signal part 710. The HEW-SIG includes information indicating a transmission mode corresponding to a frame format.

The signaling information of the L-SIG and the HEW-SIG may be decoded based on the channel information estimated by the L-STF and the L-LTF. It may be detected whether the transmission mode of the frame 700 is a HEW mode based on the information decoded in the HEW-SIG.

Referring to FIG. 8, a frame 800 according to an embodiment of the present invention includes a legacy compatible part 810 and a part supporting a wireless communication network according to an embodiment of the present invention, for example a HEW compatible part 820. The legacy compatible part 810 can be restored by a legacy preamble, and the HEW compatible part 820 can be restored by a HEW preamble.

The legacy compatible part 810 includes a legacy short training field (L-STF), a legacy long training field (L-LTF), a legacy signal field (L-SIG) and a HEW signal field (HEW-SIG) described with reference to FIG. 7. The L-STF and the L-LTF correspond to the legacy preamble. Signaling information of the HEW-SIG can be decoded by channel information estimated by the L-LTF, and the signaling information includes information necessary for interpreting the frame 800, particularly the HEW compatible part 820.

The HEW compatible part 820 includes the HEW preamble and a data field, and may further include an additional HEW signal field. The HEW preamble is a training field to be used for channel estimation. Signaling information of the additional HEW signal field can be decoded based on the channel information estimated by the HEW preamble.

Figure 9:
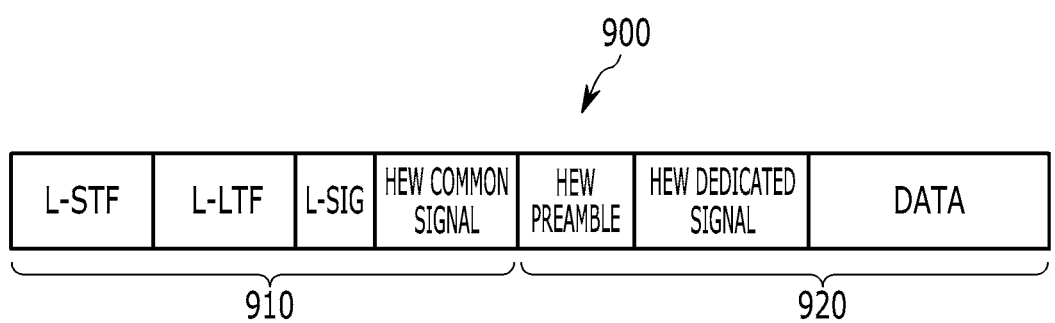
Figure 10:
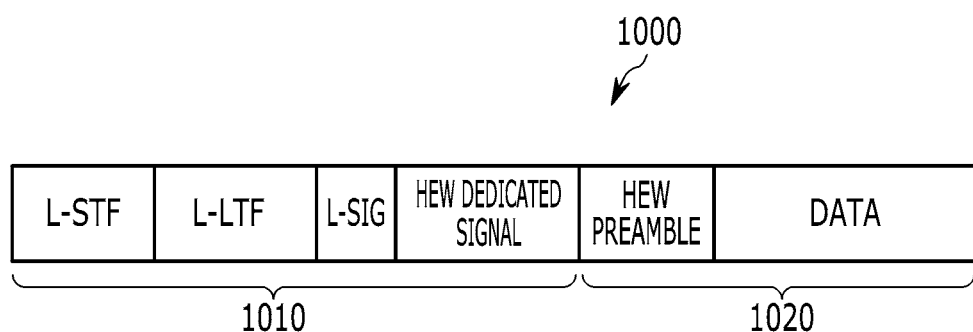
Figure 11:
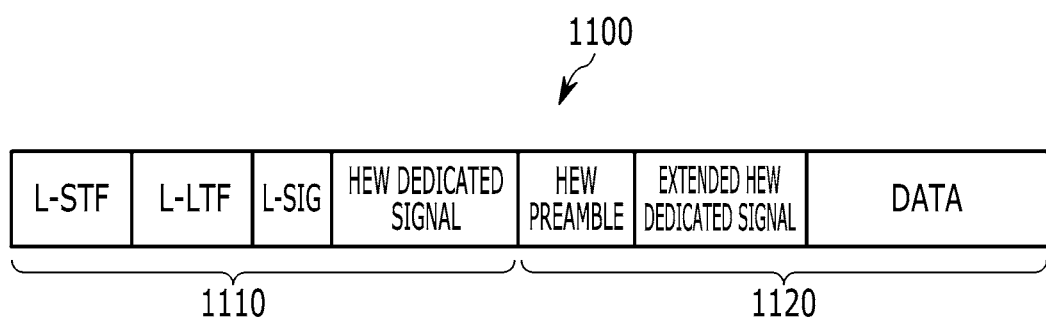

FIG. 9, FIG. 10, and FIG. 11 each schematically exemplify a frame format of a wireless communication network according to various embodiment of the present invention, and FIG. 12, FIG. 13, FIG. 14, and FIG. 15 each schematically exemplify a HEW compatible part in a frame format shown in FIG. 9, FIG. 10, and FIG. 11.

Referring to FIG. 9, a frame 900 according to an embodiment of the present invention includes a legacy compatible part 910 and a HEW compatible part 920.

The legacy compatible part 910 includes a legacy short training field (L-STF), a legacy long training field (L-LTF), a legacy signal field (L-SIG), and a HEW common signal field. The HEW compatible part 920 includes a HEW preamble, a HEW dedicated signal field, and a data field. The HEW common signal field may include HEW signaling information that is common within a BSS. The HEW dedicated signal field may include HEW signaling information that is dedicated to a user when MU-MIMO is used. The HEW common signal field may be denoted as a "HEW-SIG-A" and the HEW dedicated signal field may be denoted as a "HEW-SIG-B."

Referring to FIG. 10, a frame 1000 according to another embodiment of the present invention includes a legacy compatible part 1010 and a HEW compatible part 1020.

The legacy compatible part 1010 includes a legacy short training field (L-STF), a legacy long training field (L-LTF), a legacy signal field (L-SIG), and a HEW dedicated signal field. The HEW compatible part 1020 includes a HEW preamble and a data field. The HEW dedicated signal field may include HEW signaling information that is common within a BSS and HEW signaling information that is dedicated to a user. In some embodiments, the HEW dedicated signal field shown in FIG. 10 may include a HEW common signal field (HEW-SIG-A) carrying the HEW signaling information that is common within the BSS and a HEW dedicated signal field (HEW-SIG-B) carrying the HEW signaling information that is dedicated to the user.

Referring to FIG. 11, a frame 1100 according to yet another embodiment of the present invention includes a legacy compatible part 1110 and a HEW compatible part 1120.

The legacy compatible part 1110 includes a legacy short training field (L-STF), a legacy long training field (L-LTF), a legacy signal field (L-SIG), and a HEW dedicated signal field. The HEW compatible part 1120 includes a HEW preamble, an extended HEW dedicated signal field, and a data field. The HEW dedicated signal field may include HEW signaling information that is common within a BSS and HEW signaling information that is dedicated to a user. The extended HEW dedicated signal field may include information that cannot be carried due to the restriction of the number of symbols included in the HEW dedicated signal field. The extended HEW dedicated signal field may be denoted as a "HEW-SIG-C."

In some embodiments, the HEW dedicated signal field shown in FIG. 11 may include a HEW common signal field (HEW-SIG-A) carrying the HEW signaling information that is common within the BSS and a HEW dedicated signal field (HEW-SIG-B) carrying the HEW signaling information that is dedicated to the user.

In one embodiment, any one format among the formats described with reference to FIG. 9, FIG. 10, and FIG. 11 may be used.

In another embodiment, the frame formats shown in FIG. 10 and FIG. 11 may be used together. In this case, the HEW dedicated signal field of a short preamble frame 1000 or 1100 may further include indication indicating whether the short preamble frame includes the extended HEW dedicated signal field. If the indication indicates that the extended HEW dedicated signal field is included, the short preamble frame 1100 has the HEW dedicated signal field as shown in FIG. 11. If the indication indicates that the extended HEW dedicated signal field is not included, the short preamble frame 1000 does not have the extended HEW dedicated signal field as shown in FIG. 10.

In yet another embodiment, the frame formats shown in FIG. 9 to FIG. 11 may be used together. That is, a HEW device may select any one from among a long preamble frame 900 shown in FIG. 9, a short preamble frame 1000 shown in FIG. 100, or an extended short preamble frame 1100 shown in FIG. 11.

In this case, a HEW common signal field of the long preamble frame 900 and HEW dedicated signal fields of the short preamble frames 1000 and 1100 may include format information indicating any one of the long preamble frame, the short preamble frame, or the extended short preamble frame. Alternatively, the HEW common signal field of the long preamble frame 900 and the HEW dedicated signal fields of the short preamble frames 1000 and 1100 may include format information indicating any one of the long preamble frame or the short preamble frame, and the HEW dedicated signal fields of the short preamble frames 1000 and 1100 may further include indication information indicating whether the extended HEW dedicated signal field is included.

Figure 12:
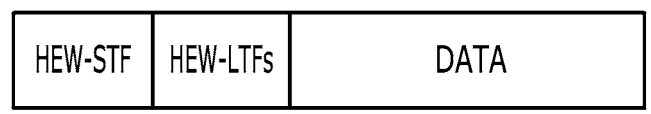
FIG. 12, FIG. 13, FIG. 14, and FIG. 15 each schematically exemplify a HEW compatible part in a frame format shown in FIG. 9, FIG. 10, and FIG. 11.
Figure 13:
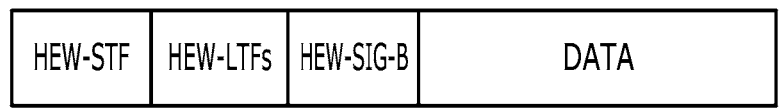

Referring to FIG. 12 and FIG. 13, a HEW preamble of a HEW compatible part 920, 1020, or 1120 may include a HEW short training field (HEW-STF) and a HEW long training field (HEW-LTF). The HEW-STF may include one symbol, and the HEW-LTF may include a plurality of long preambles (HEW-LTFs). The HEW-STF may be used for an automatic gain control of the HEW compatible part 920, 1020 or 1120. The HEW-LTFs may be used for channel estimation of the HEW compatible part.

When the HEW compatible part 920 or 1120 includes an additional HEW signal field (HEW-SIG-B) that is the HEW dedicated signal field shown in FIG. 9 or the extended HEW dedicated signal field shown in FIG. 11, the HEW-SIG-B may follow the HEW-LTF as shown in FIG. 13.

Figure 14:
Figure 15:
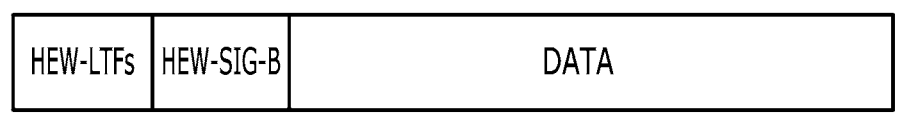

Referring to FIG. 14 and FIG. 15, a HEW preamble of a HEW compatible part 920, 1020, or 1120 may not include a HEW-STF.

Hereinafter, an orthogonal frequency division multiple access (OFDMA) transmission in a wireless communication network according to an embodiment of the present invention is described.

Figure 16:
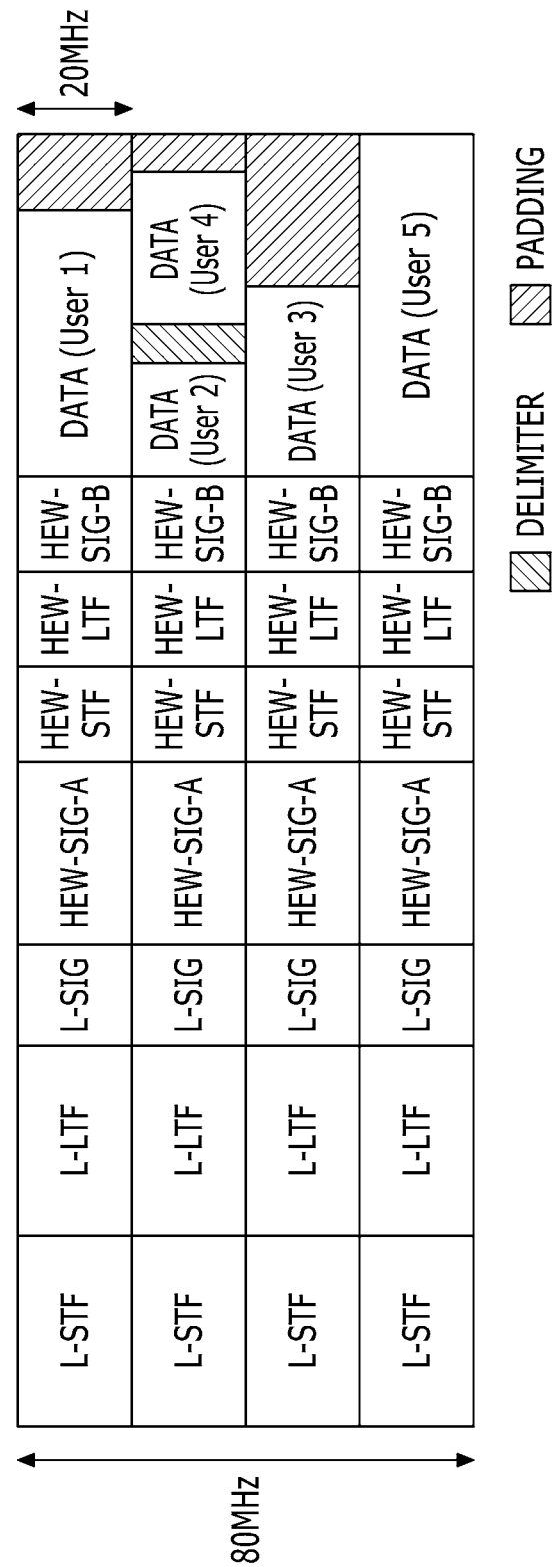
FIG. 16 and FIG. 17 each schematically exemplify a frame format for OFDMA transmission in a wireless communication network according to various embodiments of the present invention.
Figure 17:
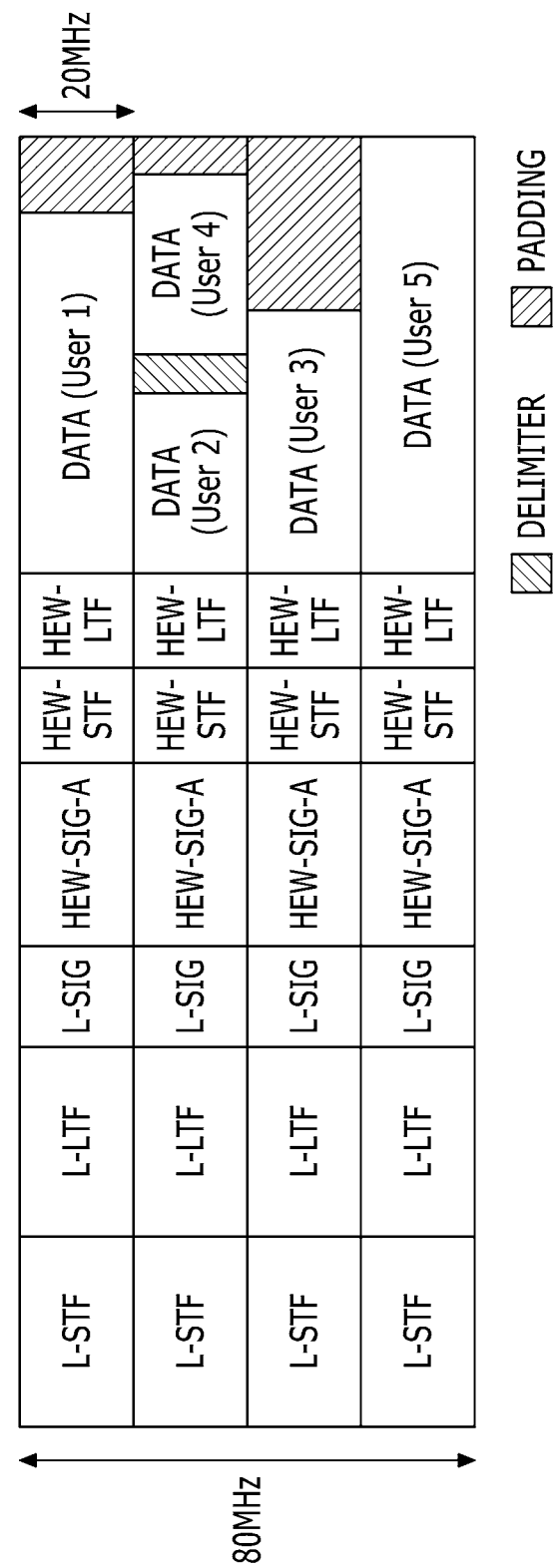
Figure 18:
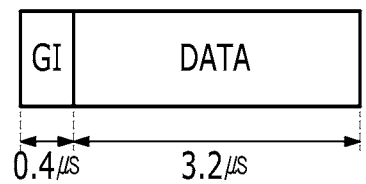
FIG. 18 and FIG. 19 each exemplify a 64 FFT symbol in a wireless communication network according to various embodiments of the present invention.
Figure 19:
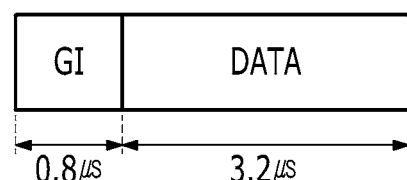
Figure 20:
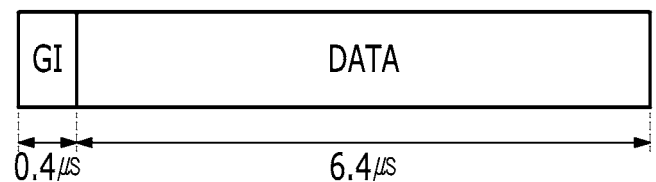
FIG. 20, FIG. 21, and FIG. 22 each exemplify a 128 FFT symbol in a wireless communication network according to various embodiments of the present invention.
Figure 21:
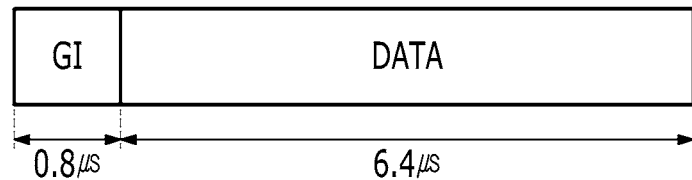
Figure 22:
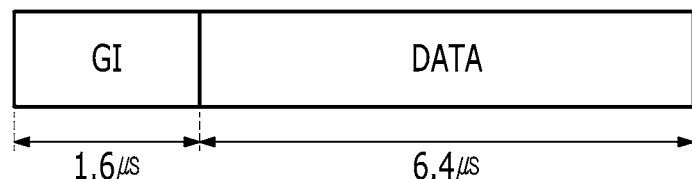
Figure 23:
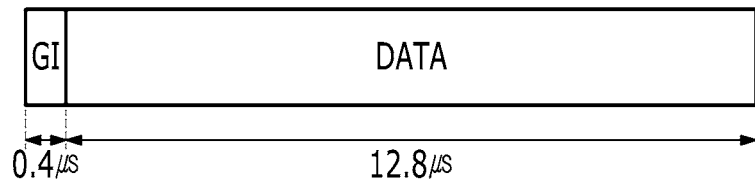
FIG. 23, FIG. 24, FIG. 25, and FIG. 26 each exemplify a 256 FFT symbol in a wireless communication network according to various embodiments of the present invention.

FIG. 16 and FIG. 17 each schematically exemplify a frame format for OFDMA transmission in a wireless communication network according to various embodiments of the present invention, FIG. 18 and FIG. 19 each exemplify a 64 FFT symbol in a wireless communication network according to various embodiments of the present invention, FIG. 20, FIG. 21, and FIG. 22 each exemplify a 128 FFT symbol in a wireless communication network according to various embodiments of the present invention, FIG. 23, FIG. 24, FIG. 25, and FIG. 26 each exemplify a 256 FFT symbol in a wireless communication network according to various embodiments of the present invention, and FIG. 27, FIG. 28, FIG. 29, and FIG. 30 each exemplify a 512 FFT symbol in a wireless communication network according to various embodiments of the present invention.

It is assumed in FIG. 16 and FIG. 17 that an entire channel width is divided into a plurality of bands, for example four bands. Further, it is assumed that the entire channel width is 80 MHz and each band has a bandwidth of 20 MHz.

FIG. 16 exemplifies a case that a long preamble frame exemplified in FIG. 9 or FIG. 11 uses a HEW compatible part exemplified in FIG. 13. Referring to FIG. 16, a frame transmits a legacy short training field (L-STF), a legacy long training field (L-LTF), a legacy signal field (L-SIG), HEW signal field (HEW-SIG-A), a HEW short training field (HEW-STF), a HEW long training field (HEW-LTF), an additional HEW signal field (HEW-SIG-B), and a data field, for each band.

For the backward compatibility, legacy preambles, i.e., the L-STF, the L-LTF, and the L-SIG included in a legacy compatible part may be commonly transmitted for all the bands. That is, the legacy preambles may be duplicated on each of bands. Further, the HEW-SIG-A included in the legacy compatible part may be commonly transmitted for all the bands. That is, the HEW-SIG-A may be duplicated on each of bands.

A HEW compatible part, i.e., the HEW-STF, the HEW-LTF, the HEW-SIG-B, and the data field may be transmitted for each band.

For each band, the frame may include data for user assigned a corresponding band in the data field. In an example shown in FIG. 16, among the four bands, a first band is assigned to a user 1, a second band is assigned to a user 2 and a user 4, a third band is assigned to a user 3, and a fourth band is assigned to a user 5. Data [DATA(User 2) and DATA(User 4)] of two users assigned to the same band may be transmitted in a time division duplex (TDD). A delimiter may be included between the data [DATA(User 2) and DATA(User 4)] of the two users. When data of users have different lengths, pad bits may be added to the data field including the data having the short length. Further, tail bits may be added to an end of the data field.

In one embodiment, the HEW-SIG-A may carry signaling information that is common to all the users. In another embodiment, the HEW-SIG-A may carry signaling information dedicated to a specific user. In yet another embodiment, the HEW-SIG-A may carry both the common signaling information and the dedicated signaling information.

The HEW-STF, the HEW-LTF, and the HEW-SIG-B of each band are fields that are dedicated to a user assigned to a corresponding band. For example, the HEW-STF may be used for an automatic gain control of the HEW compatible part in the corresponding band, and the HEW-LTF may be used for channel estimation of the HEW compatible part in the corresponding band. Further, the HEW-SIG-B may carry signaling information that is dedicated to a user assigned the corresponding band.

FIG. 16 exemplifies a case that a short preamble frame exemplified in FIG. 10 uses a HEW compatible part exemplified in FIG. 12. Referring to FIG. 17, a frame transmits a legacy short training field (L-STF), a legacy long training field (L-LTF), a legacy signal field (L-SIG), HEW signal field (HEW-SIG-A), a HEW short training field (HEW-STF), a HEW long training field (HEW-LTFs), and a data field, for each band.

In FIG. 16 and FIG. 17, a FFT size that is applied to a symbol within the legacy compatible part may be 64 on a 20 MHz bandwidth basis, for the backward compatibility. As shown in FIG. 18 and FIG. 19, each symbol within the legacy compatible part may include a data interval corresponding to an FFT period with 3.2 μs length and a GI that is prepended to the data interval and has the length of 0.4 μs, 0.8 μs, or 1.6 μs. For example, the GI may be formed by a cyclic prefix (CP) of the data interval. In this case, a 0.4 μs GI may be called ⅛ CP since it is formed by the CP corresponding to ⅛ of 3.2 μs length. A 0.8 μs GI may be called ¼ CP since it is formed by the CP corresponding to ¼ of 3.2 μs length. A 1.6 μs GI may be called ½ CP since it is formed by the CP corresponding to ½ of 3.2 μs length. Further, subcarrier spacing of the symbol within the legacy compatible part may be 312.5 kHz.

In a wireless communication network environment according to an embodiment of the present invention, a FFT having a size greater than 64 is applied to some field of HEW compatible part. For example, an inverse Fourier transformer (140 of FIG. 2) of a transmitting device may use the FFT having the size greater than 64 when performing an IDFT, and a Fourier transformer (230 of FIG. 3) of a receiving device may use the FFT having the size greater than 64 when performing a DFT.

As shown in FIG. 20, FIG. 21, and FIG. 22, a symbol according to an embodiment may use 128 FFT, i.e., 2 times FFT of the legacy compatible part. In this case, each symbol has a data interval corresponding to an FFT period of 6.4 μs, and has subcarrier spacing of 156.25 kHz. The GI has 0.4 μs length at 1/16 CP, has 0.8 μs length at ⅛ CP, and has 1.6 μs length at ¼ CP. For example, when the ¼ CP is used, symbol duration is 8.0 μs.

A wireless communication network according to one embodiment may use any one GI among the GIs shown in FIG. 20, FIG. 21 and FIG. 22 while using 64 FFT. A wireless communication network according to another embodiment may use at least two GIs among the GIs shown in FIG. 20, FIG. 21, and FIG. 22. In this case, the wireless communication network may select a GI in accordance with a user, or may select a GI in accordance with a channel or network interference.

As shown in FIG. 23, FIG. 24, FIG. 25, and FIG. 26, a symbol according to another embodiment may use 256 FFT, i.e., 4 times FFT of the legacy compatible part. In this case, each symbol has a data interval corresponding to an FFT period of 12.8 μs, and has subcarrier spacing of 78.125 kHz. The GI has 0.4 μs length at 1/32 CP, has 0.8 μs length at 1/16 CP, has 1.6 μs length at ⅛ CP, and has 3.2 μs length at ¼ CP. For example, when the ¼ CP is used, symbol duration is 16.0 μs.

A wireless communication network according to one embodiment may use any one GI among the GIs shown in FIG. 23, FIG. 24, FIG. 25, and FIG. 26 while using 256 FFT. A wireless communication network according to another embodiment may use at least two GIs among the GIs shown in FIG. 23, FIG. 24, FIG. 25, and FIG. 26. In this case, the wireless communication network may select a GI in accordance with a user, or may select a GI in accordance with a channel or network interference.

As shown in FIG. 27, FIG. 28, FIG. 29 and FIG. 30, a symbol according to yet another embodiment may use 512 FFT, i.e., 8 times FFT of the legacy compatible part. In this case, each symbol has a data interval corresponding to an FFT period of 25.6 μs, and has subcarrier spacing of 39.063 kHz. The GI has 0.8 μs length at 1/32 CP, has 1.6 μs length at 1/16 CP, has 3.2 μs length at ⅛ CP, and has 6.4 μs length at ¼ CP. For example, when the ¼ CP is used, symbol duration is 32.0 μs.

A wireless communication network according to one embodiment may use any one GI among the GIs shown in FIG. 27, FIG. 28, FIG. 29, and FIG. 30 while using 512 FFT. A wireless communication network according to another embodiment may use at least two GIs among the GIs shown in FIG. 27, FIG. 28, FIG. 29, and FIG. 30. In this case, the wireless communication network may select a GI in accordance with a user, or may select a GI in accordance with a channel or network interference.

A relationship between the FFT and GI described above may be represented as in Table 1.

TABLE 1

| FFT Size | Subcarrier Spacing | FFT period | GI duration | | | | Symbol duration |
| --- | --- | --- | --- | --- | --- | --- | --- |
| | | | 1/32 CP | 1/16 CP | 1/8 CP | 1/4 CP | (1/4 CP) |
| 64 FFT (Current FFT) | 312.5 kHz | 3.2 μs | — | — | 0.4 μs | 0.8 μs | 4 μs |
| 128 FFT (2 times FFT) | 156.25 kHz | 6.4 μs | | 0.4 μs | 0.8 μs | 1.6 μs | 8 μs |
| 256 FFT (4 times FFT) | 78.125 kHz | 12.8 μs | 0.4 μs | 0.8 μs | 1.6 μs | 3.2 μs | 16 μs |
| 512 FFT (8 times FFT) | 39.063 kHz | 25.6 μs | 0.8 μs | 1.6 μs | 3.2 μs | 6.4 μs | 32 μs |

In Table 1, a 1.6 μs GI corresponding to ½ CP may be additional provided in the 64 FFT.

A wireless communication network according to some embodiments may select an appropriate FFT size or GI duration from among various FFT sizes and GI durations shown in Table 1 in accordance with a user. Alternatively, the wireless communication network may select an appropriate FFT size or GI duration from among various FFT sizes and GI durations shown in Table 1 in accordance with a channel or network interference.

In some embodiments, a frame may include GI information indicating the selected GI duration or FFT size information indicating the selected FFT size. In one embodiment, a signal field (for example, a HEW-SIG-A shown in FIG. 16 or FIG. 17) of the frame may include the GI information or the FFT size information. In another embodiment, a MAC header of a MAC frame included in a data field of the frame may include the GI information or the FFT size information. The MAC frame may be a data frame, a control frame, or a management frame. A transmitting device can notify a receiving device of the length of the used GI duration or the used FFT size through the GI information or the FFT size information. The receiving device can identify the length of the used GI duration or the used FFT size through the GI information or the FFT size information included in the frame.

In some embodiments, the frame may include channel information for allowing two or more devices to know a channel state of a communicated device. The channel information may be a delay spread indicator indicating a measured delay spread, a Doppler Effect indicator indicating a measured Doppler Effect, an outdoor indicator indicating an outdoor environment, a measured co-channel interference factor, or a measured adjacent channel interference factor. In one embodiment, a signal field (for example, HEW-SIG-A shown in FIG. 16 or FIG. 17) of the frame may include the channel information. In another embodiment, a MAC header of a MAC frame included in a data field of the frame may include the channel information.

Each device can select the length of the GI duration or the FFT size based on the channel information. For example, the device may select a long GI duration when the delay spread is long.

The system throughput can be enhanced in the high density environment when the great size FFT is used as described above. In detail, since many devices densely exist in the high density environment, the multi-path characteristic in a time domain may have an influence on the network performance and the Doppler spread in a frequency domain may have an influence on the network performance. A time delay generated by the multi-path characteristic may cause an inter symbol interference (ISI) or an inter carrier interference (ICI) such that the inter-symbol or inter-carrier orthogonality can be broken. Further, the ICI may occur or the flat fading may be not ensured by the Doppler spread in the frequency domain.

Since the L-SIG and HEW-SIG-A of the legacy compatible part is modulated and transmitted by using robust BPSK, they may be little influenced by the multi-path characteristic. However, symbols that are modulated by high-order modulation in the HEW compatible part, for example symbols included in the data field may be much influenced by the multi-path characteristic. In this case, it is required that the GI is set to be longer than a maximum excess delay and a length of a packet is set to be shorter than a coherence time in order to minimize the ISI and ICI in the time domain. Further, it is required that the carrier spacing is set to be narrower than a coherence bandwidth in order to ensure the flat fading on each carrier in the frequency domain and that the carrier spacing is set to be wider than the maximum Doppler spread in order to minimize the ICI.

Accordingly, if the 128 FFT, 256 FFT, or 512 FFT is used in some field of the HEW compatible part as described above, the carrier spacing can be reduced such that the flat fading can be ensured and the GI can be increased such that the ISI and ICI can be reduced.

Next, various FFT sizes described above are compared with each other.

When the 128 FFT is used, the number of data tones is doubled and the length of the symbol is doubled compared with the 64 FFT. When the GI in the 128 FFT uses 0.8 μs identically to the 64 FFT, the throughput gain of 11% can be obtained. When the 256 FFT is used, the number of data tones is quadrupled and the length of the symbol is quadrupled compared with the 64 FFT. When the GI in the 256 FFT uses 0.8 μs identically to the 32 FFT, the throughput gain of 17% can be obtained. When the 256 FFT is used, the number of data tones is octupled and the length of the symbol is octupled compared with the 64 FFT. When the GI in the 512 FFT uses 0.8 μs identically to the 32 FFT, the throughput gain of 21% can be obtained. Comparing the 128 FFT, the 256 FFT, and the 512 FFT, the 128 FFT has a little impact on the carrier frequency offset (CFO) immunity and has the low throughput gain. In the 256 FFT, the impact on the CFO immunity may be increased but the high tone gain can be obtained. In the 512 FFT, the very high tone gain can be obtained but the impact on the CFO immunity is increased very much and the symbol length is too long. In this case, the impact on the CFO immunity in the 256 FFT is experimentally a negligible level. This can be organized as in Table 2.

TABLE 2

| FFT Size | frequency and time structure | Benefit from CP ratio reduction | Pros & Cons |
|---|---|---|---|
| 64 FFT (Current FFT) | 0.8 μs + 3.2 μs | — | |
| 128 FFT (2 times FFT) | 1.6 μs + 6.4 μs 2 times more data tone 2 times longer symbol | 11% throughput gain | Lowest impact on CFO immunity Smallest throughput gain |
| 256 FFT (4 times FFT) | 3.2 μs + 12.8 μs 4 times more data tone 4 times longer symbol | 17% throughput gain | Higher tone gain Increased impact on CFO immunity |
| 512 FFT (8 times FFT) | 6.4 μs + 25.6 μs 8 times more data tone 8 times longer symbol | 21% throughput gain | Highest tone gain Too much longer symbol and highest impact on CFO immunity |

Figure 24:
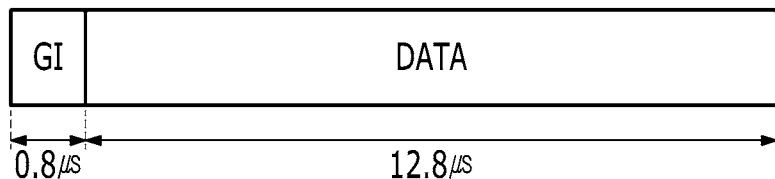
Figure 25:
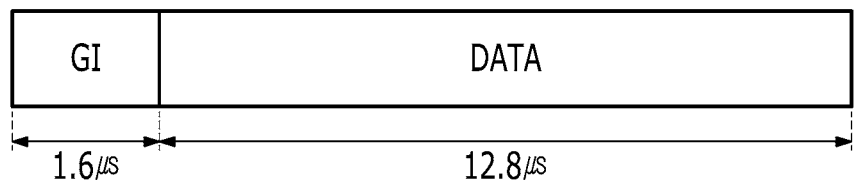
Figure 26:
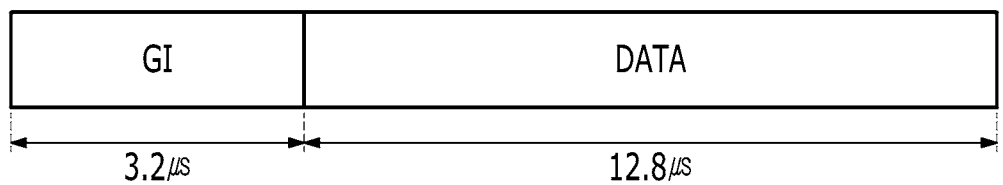
Figure 27:
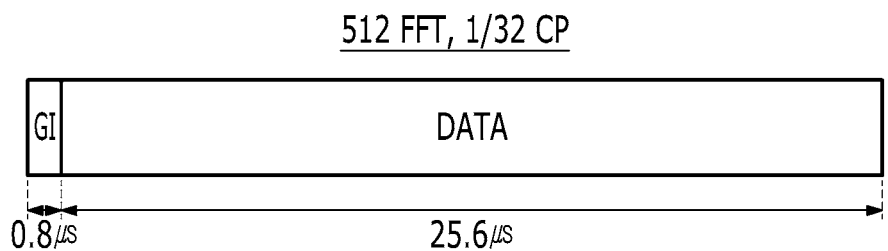
FIG. 27, FIG. 28, FIG. 29, and FIG. 30 each exemplify a 512 FFT symbol in a wireless communication network according to various embodiments of the present invention.
Figure 28:
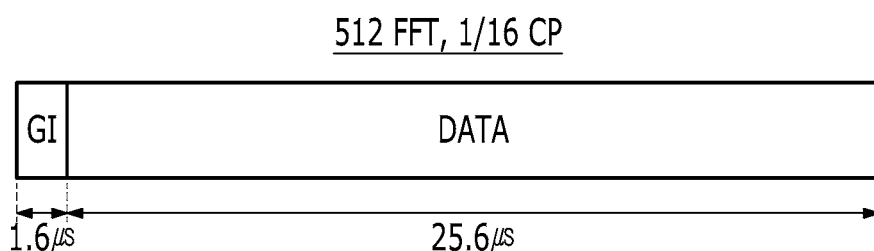
Figure 29:
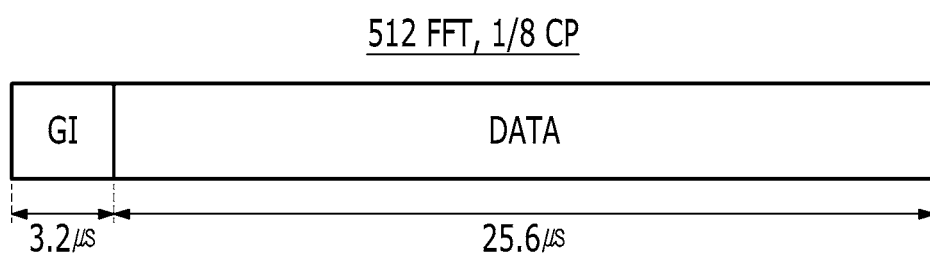
Figure 30:
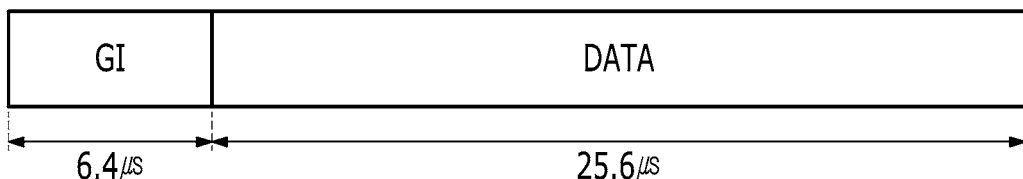

Therefore, according to some embodiments, as shown in FIG. 24, FIG. 25, and FIG. 26, the network performance can be enhanced by using the 256 FFT and using the GI of 0.8 μs, 1.6 μs or 3.2 μs length that is longer than the conventional GI.

If the 0.4 μs GI is used in the 256 FFT, the average throughput can be improved (for example, improved by 21% compared with the 3.2 μs GI) by the short GI but the short GI may be vulnerable in the outdoor environment. In the case that the 0.8 μs GI is used, the average throughput can be improved (for example, improved by 17% compared with the 3.2 μs GI) but the performance can be degraded in the outdoor environment. The 1.6 μs GI may be fit for the outdoor environment but may provide less average throughput enhancement. The 3.2 μs GI may be best fit for the outdoor environment but may provide no average throughput enhancement. This can be organized as in Table 3.

TABLE 3

| GI size | CP portion | Pros & Cons |
|---|---|---|
| 0.4 μs | 1/32 | Maximized throughput from CP (21% than 3.2 μs case) Vulnerable in outdoor environment May be used in indoor channel |
| 0.8 μs | 1/16 | Throughput enhancement from CP (17% than 3.2 us case) Performance degraded in outdoor environment May be used in indoor channel |
| 1.6 μs | 1/8 | Better for outdoor environment less throughput enhancement from CP May be used in outdoor channel May be used in indoor uplink multi-user transmission |
| 3.2 μs | 1/4 | Best fit for outdoor environment No throughput enhancement from CP May be used in outdoor uplink multi-user transmission |

Therefore, in some embodiments, the 0.4 μs GI or 0.8 μs GI, i.e., 1/32 CP or 1/16 CP may be used to enhancing the average throughput, and the 1.6 μs GI or 3.2 μs GI, i.e., 1/8 CP or 1/4 CP may be used for outdoor robustness.

As shown in Table 3, a set of allowable CPs for the symbol having the subcarrier spacing of 78.125 kHz may include 1/32 CP, 1/16 CP, 1/8 CP, and 1/4 CP. In one embodiment, 1/32 CP may be excluded from the set of allowable CPs.

Particularly, when a field indicating the GI information has 1 bit, the GI information of 1 bit cannot represent which CP is used from among three or more CPs. Accordingly, in one embodiment, two CPs among the above four CPs may allowed for downlink transmission, and two CPs among the above four CPs may be allowed for uplink transmission. Further, the set of allowable CPs for the downlink transmission may be different from the set of allowable CPs for the uplink transmission. For example, the set of allowable CPs for the downlink transmission may include 1/16 CP and 1/8 CP, and the set of allowable CPs for the uplink transmission may include 1/8 CP and 1/4 CP.

Further, two CPs among the above four CPs may allowed for indoor transmission, and two CPs among the above four CPs may be allowed for outdoor transmission. Further, the set of allowable CPs for the indoor transmission may be different from the set of allowable CPs for the outdoor transmission. For example, the set of allowable CPs for the indoor transmission may include 1/16 CP and 1/8 CP, and the set of allowable CPs for the outdoor transmission may include 1/8 CP and 1/4 CP.

Furthermore, two CPs among the above four CPs may allowed for single-user transmission, and two CPs among the above four CPs may be allowed for multi-user transmission. Further, the set of allowable CPs for the single-user transmission may be different from the set of allowable CPs for the multi-user transmission. The multi-user transmission may be, for example, MU-MIMO or OFDMA. For example, the set of allowable CPs for the single-user transmission may include 1/16 CP and 1/8 CP, and the set of allowable CPs for the multi-user transmission may include 1/8 CP and 1/4 CP.

Moreover, two CPs among the above four CPs may allowed for transmission except for uplink multi-user transmission, and two CPs among the above four CPs may be allowed for the uplink multi-user transmission. Further, the set of allowable CPs for the transmission except for the uplink multi-user transmission may be different from the set of allowable CPs for the uplink multi-user transmission. For example, the set of allowable CPs for the transmission except for the uplink multi-user transmission may include 1/16 CP and 1/8 CP, and the set of allowable CPs for the uplink multi-user transmission may include 1/8 CP and 1/4 CP.

In some embodiments, the signaling information may include an indoor/outdoor indication indicating the indoor transmission or the outdoor transmission, a downlink/uplink indication indicating the downlink transmission or the uplink transmission, or a single/multi indication indicating the single-user transmission or the multi-user transmission. The indoor/outdoor indication, the downlink/uplink indication, or the single/multi indication may have 1 bit. In one embodiment, the signaling information may be transmitted through the HEW-SIG-A.

In this case, a receiving device can identify the currently used CP based on a combination of a transmission scheme indicated by the indication and the GI information. For example, when the indoor/outdoor indication indicates the indoor transmission and the GI information is set to 1, 1/16 CP may be indicated in 1/16 CP and 1/8 CP. When the indoor/outdoor indication indicates the indoor transmission and the GI information is set to 0, 1/8 CP may be indicated in 1/16 CP and 1/8 CP. Further, when the indoor/outdoor indication indicates the outdoor transmission and the GI information is set to 1, 1/8 CP may be indicated in 1/8 CP and 1/4 CP. When the indoor/outdoor indication indicates the outdoor transmission and the GI information is set to 0, 1/4 CP may be indicated in 1/8 CP and 1/4 CP.

In some embodiments, the indoor/outdoor indication, the downlink/uplink indication, or the single/multi indication may be transmitted through a bit that is not used in the frame.

In some embodiments, the indoor/outdoor indication, the downlink/uplink indication, or the single/multi indication may be detected by auto-detection using a combination of modulation schemes. That is, a transmitting device may modulate each of a plurality of predetermined symbols included in the frame by using BPSK (binary phasing shift keying) or QBPSK (quadrature binary phasing shift keying) to indicate the transmission scheme through a combination of the modulation schemes used for the plurality of predetermined symbols. Accordingly, the receiving device can auto-detect the transmission scheme based on the combination of the modulation schemes used for the plurality of predetermined symbols.

Figure 31:
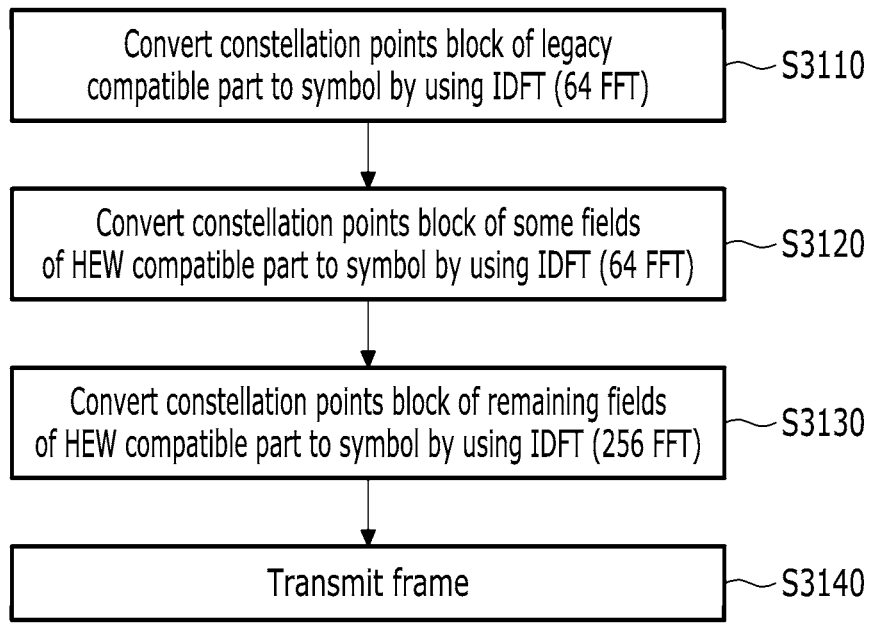
FIG. 31 is a flowchart exemplifying a frame transmitting method in a wireless communication network according to an embodiment of the present invention.
Figure 32:
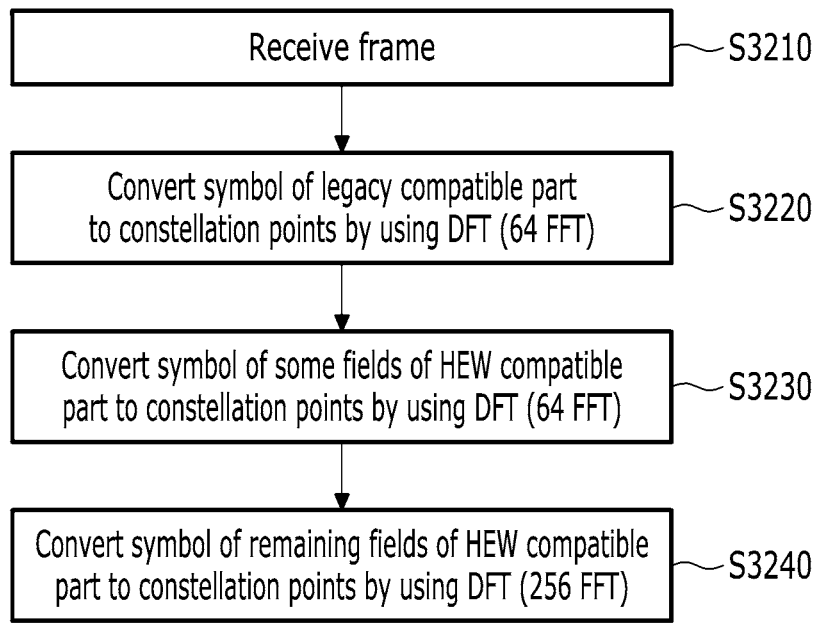
FIG. 32 is a flowchart exemplifying a frame receiving method in a wireless communication network according to an embodiment of the present invention.

FIG. 31 is a flowchart exemplifying a frame transmitting method in a wireless communication network according to an embodiment of the present invention, and FIG. 32 is a flowchart exemplifying a frame receiving method in a wireless communication network according to an embodiment of the present invention.

Referring to FIG. 31, a transmitting device converts a block of constellation points of a legacy compatible part to a symbol by using an IDFT according to a 64 FFT (S3110), and converts a block of constellation points of some field, for example a HEW short training field (HEW-STF), of a HEW compatible part to a symbol by using the IDFT according to the 64 FFT (S3120). Further, the transmitting device converts a block of constellation points of remaining fields of the HEW compatible part to a symbol by using an IDFT according to an FFT (for example, a 256 FFT) having a larger size than the 64 FFT (S3130). Next, the transmitting device transmits a frame including the generated symbols (S3140).

While it has been shown in FIG. 31 that the steps S3110, S3120, and S3130 are sequentially performed, the steps S3110, S3120, and S3130 may be performed in a different order or at the same time.

Referring to FIG. 32, a receiving device receives a frame (S3210). The receiving device converts a symbol of a legacy compatible part to constellation points by using a DFT according to a 64 FFT (S3220), and converts a symbol of some field, for example a HEW short training field (HEW-STF), of a HEW compatible part to constellation points by using the DFT according to the 64 FFT (S3230). Further, the receiving device converts a symbol of remaining fields of the HEW compatible part to constellation points by using a DFT according to an FFT (for example, a 256 FFT) having a larger size than the 64 FFT (S3240).

While it has been shown in FIG. 31 that the steps S3220, S3230, and S3240 are sequentially performed, the steps S3220, S3230, and S3240 may be performed in a different order or at the same time.

If the size of the used FFT is increased in the same bandwidth, the subcarrier spacing is reduced such that the number of data subcarriers is increased. Accordingly, when the large size FFT is used, the bandwidth can be reduced to transmit the same amount of information. Hereinafter, embodiments for reducing bandwidth while using the large size FFT are described with reference to FIG. 33, FIG. 34, FIG. 35, FIG. 36, FIG. 37, and FIG. 38.

Figure 33:
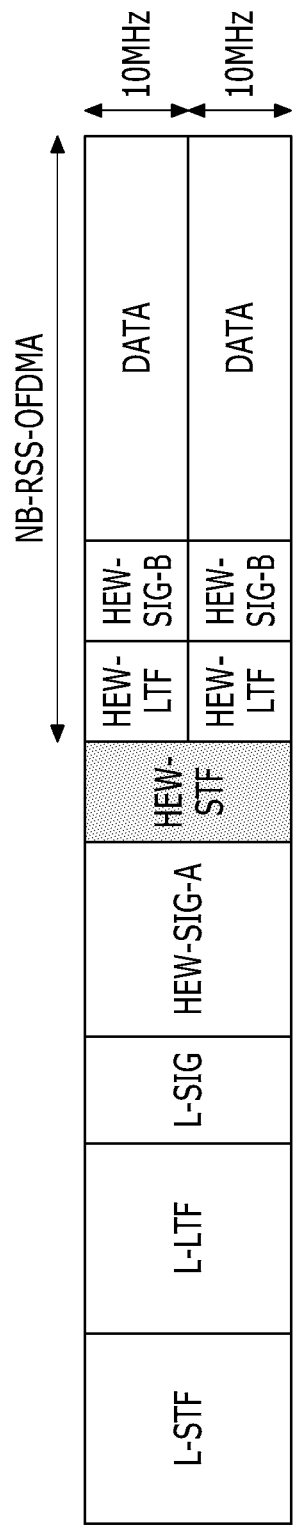
FIG. 33 and FIG. 34 each schematically exemplify one band of a frame format for a NB-RSS-OFDMA transmission in a wireless communication network according various embodiments of the present invention.
Figure 34:
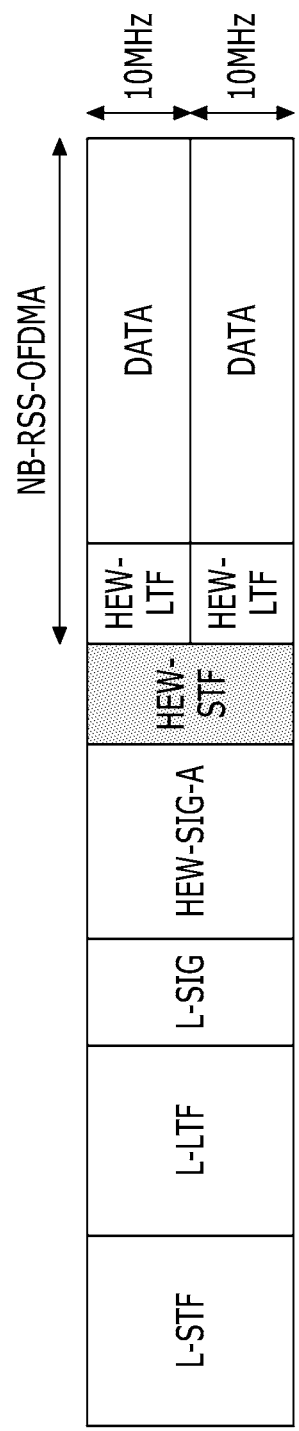

FIG. 33 and FIG. 34 each schematically exemplify one band of a frame format for a narrow band reduced subcarrier spacing OFDMA transmission in a wireless communication network according various embodiments of the present invention. FIG. 33 and FIG. 34 shows one bandwidth when an entire channel width is divided into four bands. It is assumed that the entire channel width is 80 MHz and each band has 20 MHz. Further, FIG. 33 shows one band of a case that a long preamble frame exemplified in FIG. 9 or FIG. 11 uses a HEW compatible part exemplified in FIG. 13, and FIG. 34 shows one band of a case that a short preamble frame exemplified in FIG. 10 uses a HEW compatible part exemplified in FIG. 12.

Referring to FIG. 33 and FIG. 34, a band is divided into a plurality of subbands in some field of the HEW compatible part band, and reduced subcarrier spacing is applied to each subband. Subcarrier spacing that is reduced than subcarrier spacing (hereinafter referred to as "normal subcarrier spacing") of a legacy compatible part is applied to the subband. The normal subcarrier spacing may be applied to a part to which the subband is not applied in the HEW compatible part. Hereinafter, an OFDMA scheme where transmission performed on the subband by using the reduced subcarrier spacing is referred to as a narrow band reduced subcarrier spacing OFDMA (NB-RSS-OFDMA) scheme.

In some embodiments, since each subband is used for data transmission in a data field, each subband may be called a resource block.

In some embodiments, when a band is divided into N subbands, subcarrier spacing corresponding to 1/N of the normal subcarrier spacing may be used as the reduced subcarrier spacing. The number of subcarriers can remain the same because the subcarrier spacing is reduced as much as the bandwidth is reduced. To this end, an inverse Fourier transformer (140 of FIG. 2) of a transmitting device may use a 64*N FFT when performing an IDFT on a corresponding band.

FIG. 33 and FIG. 34 show an example that a 20 MHz band is divided two 10 MHz subbands. Accordingly, the reduced subcarrier spacing, i.e., subcarrier spacing of 156.25 kHz, corresponding to ½ of the normal subcarrier spacing is applied to the 10 MHz subband. To this end, the transmitting device may use a 128 FFT when performing the IDFT.

In one embodiment, the transmitting device may apply the NB-RSS-OFDMA scheme to all fields of the HEW compatible part.

In another embodiment, the transmitting device may apply the NB-RSS-OFDMA scheme to some field including a data field in the HEW compatible part.

In yet another embodiment, the transmitting device may apply the NB-RSS-OFDMA scheme to fields except for a HEW short training field (HEW-STF) in the HEW compatible part, as shown in FIG. 33 and FIG. 34. A receiving device may measure a power on the whole received signal of the HEW compatible part and then adjust a gain for the HEW compatible part based on the measured power. Therefore, the NB-RSS-OFDMA may be not applied to the HEW-STF transmitted for an automatic gain control, and the HEW-STF may be transmitted on the 20 MHz band.

In some embodiments, a subcarrier unit of the HEW compatible part to which the NB-RSS-OFDMA scheme is applied can be received with the same power as a subcarrier unit of the legacy compatible part. The number of subcarriers in the HEW compatible part to which the NB-RSS-OFDMA scheme is applied is N times the number of subcarriers of the legacy compatible part. Accordingly, in order to make a power per tone of the legacy compatible part the same of a power per tone of the HEW compatible part, the power of the HEW-STF may be set to be N times a power of a legacy short training field (L-STF), or the number of subcarriers in the HEW-STF may be set to be N times the number of subcarriers in the L-STF. Alternatively, in order to make a power per symbol of the legacy compatible part the same of a power per symbol of the HEW compatible part, the power of the HEW-STF may be set to be the same as the power of the L-STF.

In some embodiments, a HEW signal field (HEW-SIG-A) may include an indication indicating whether the NB-RSS-OFDMA transmission is applied. In another embodiment, the indication may further a value indicating a band to which the NB-RSS-OFDMA transmission is applied.

Figure 35:
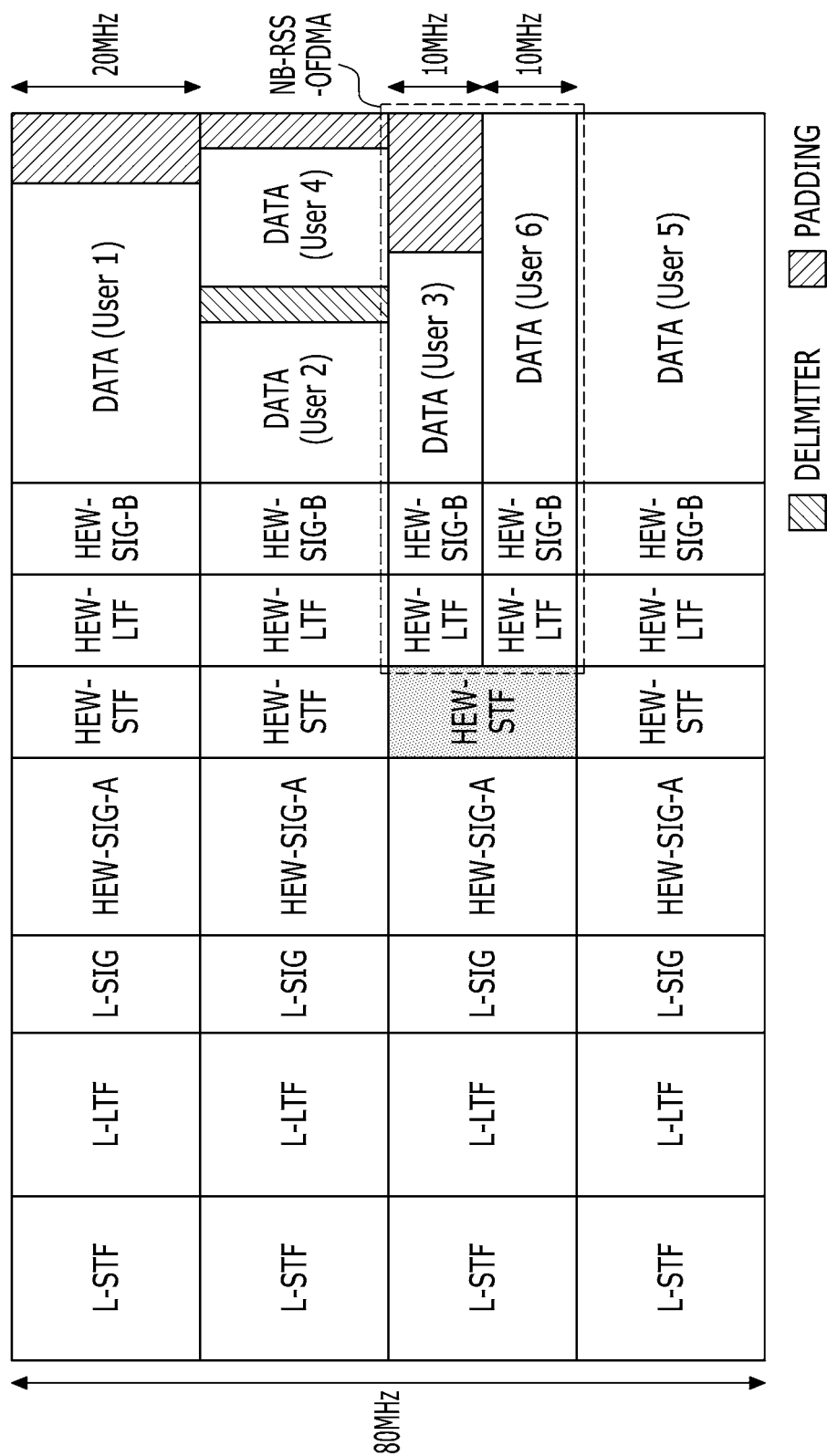
FIG. 35, FIG. 36, FIG. 37, and FIG. 38 each schematically exemplify an entire channel width of a frame format for a NB-RSS-OFDMA transmission in a wireless communication network according various embodiments of the present invention.
Figure 36:
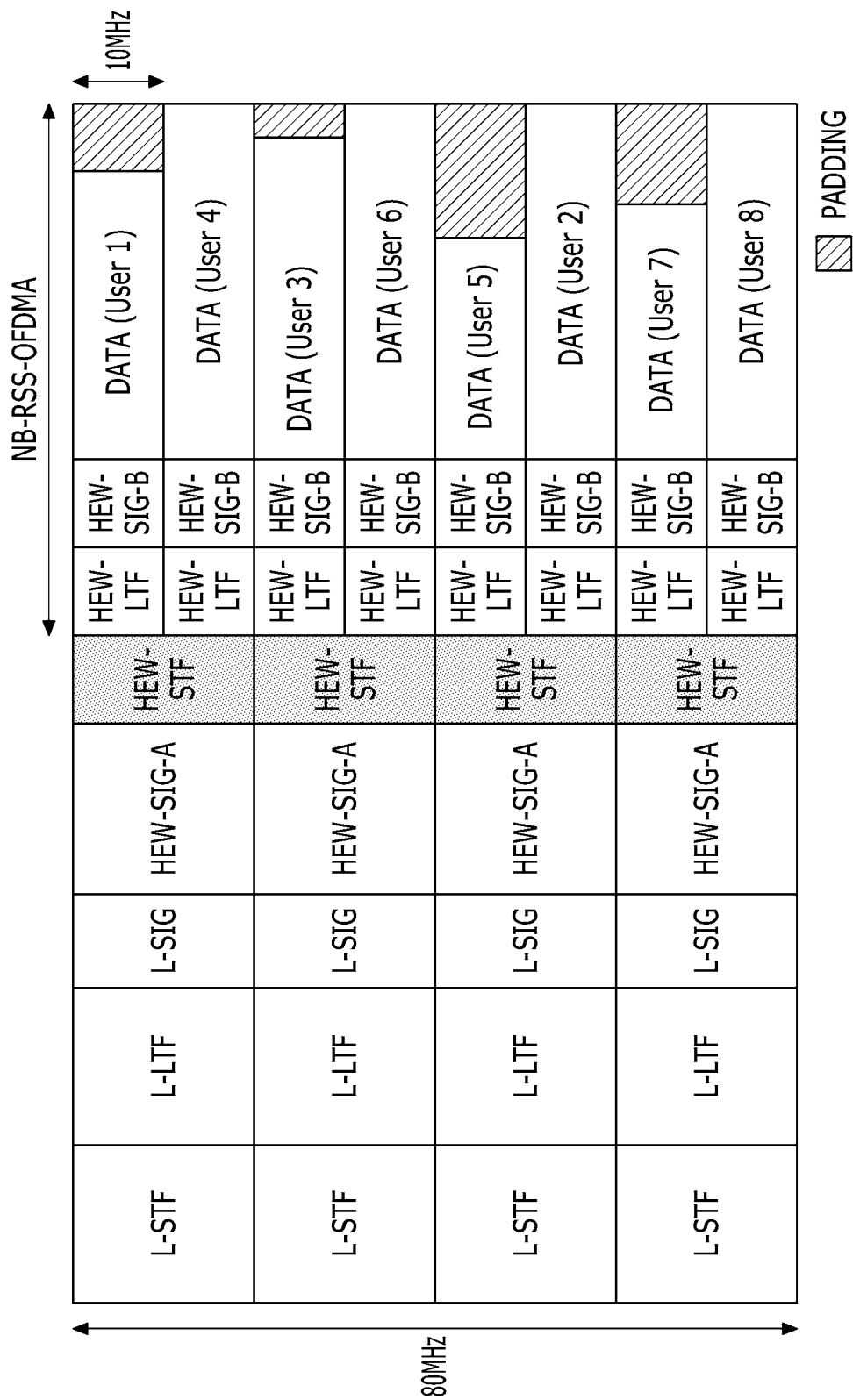
Figure 37:
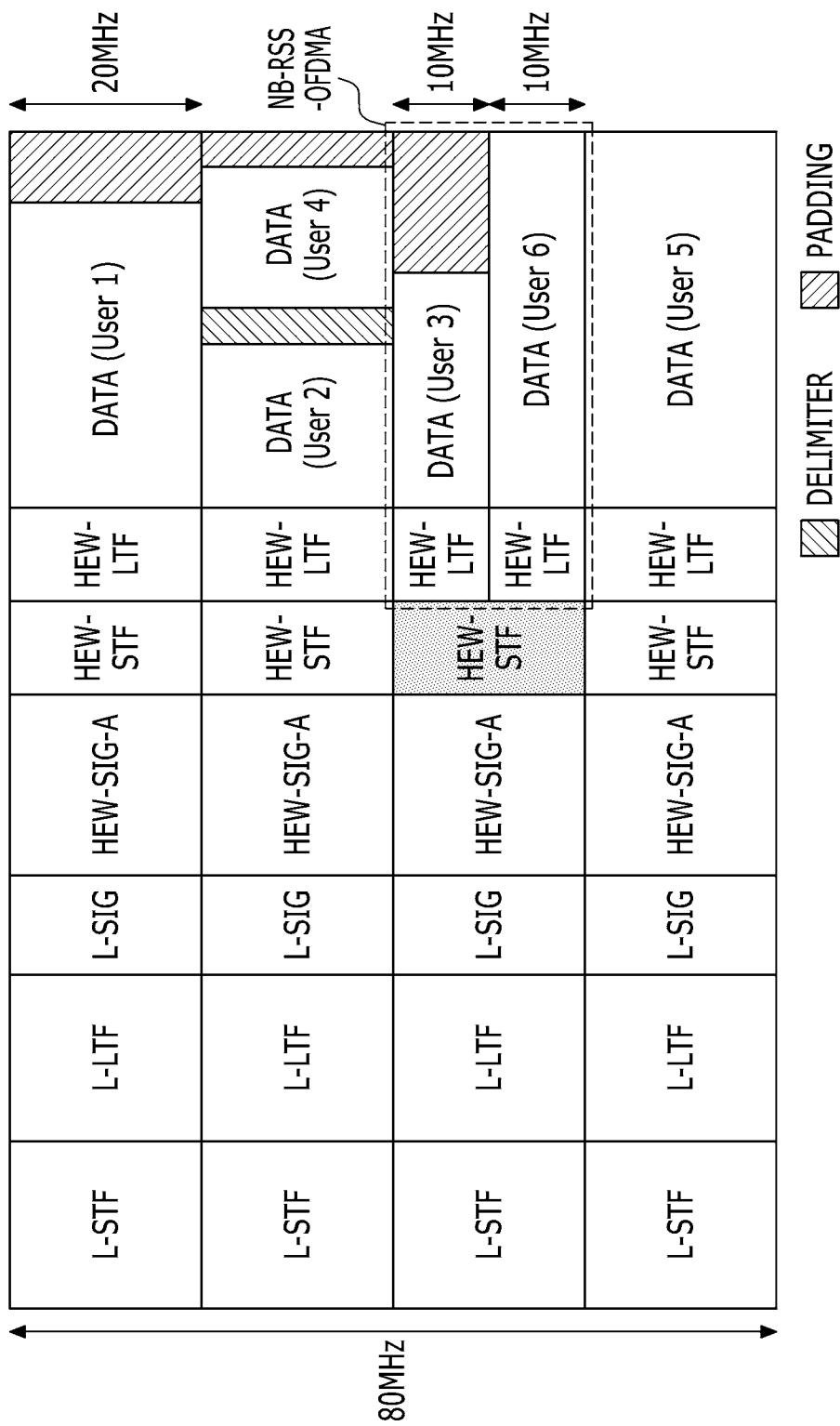
Figure 38:
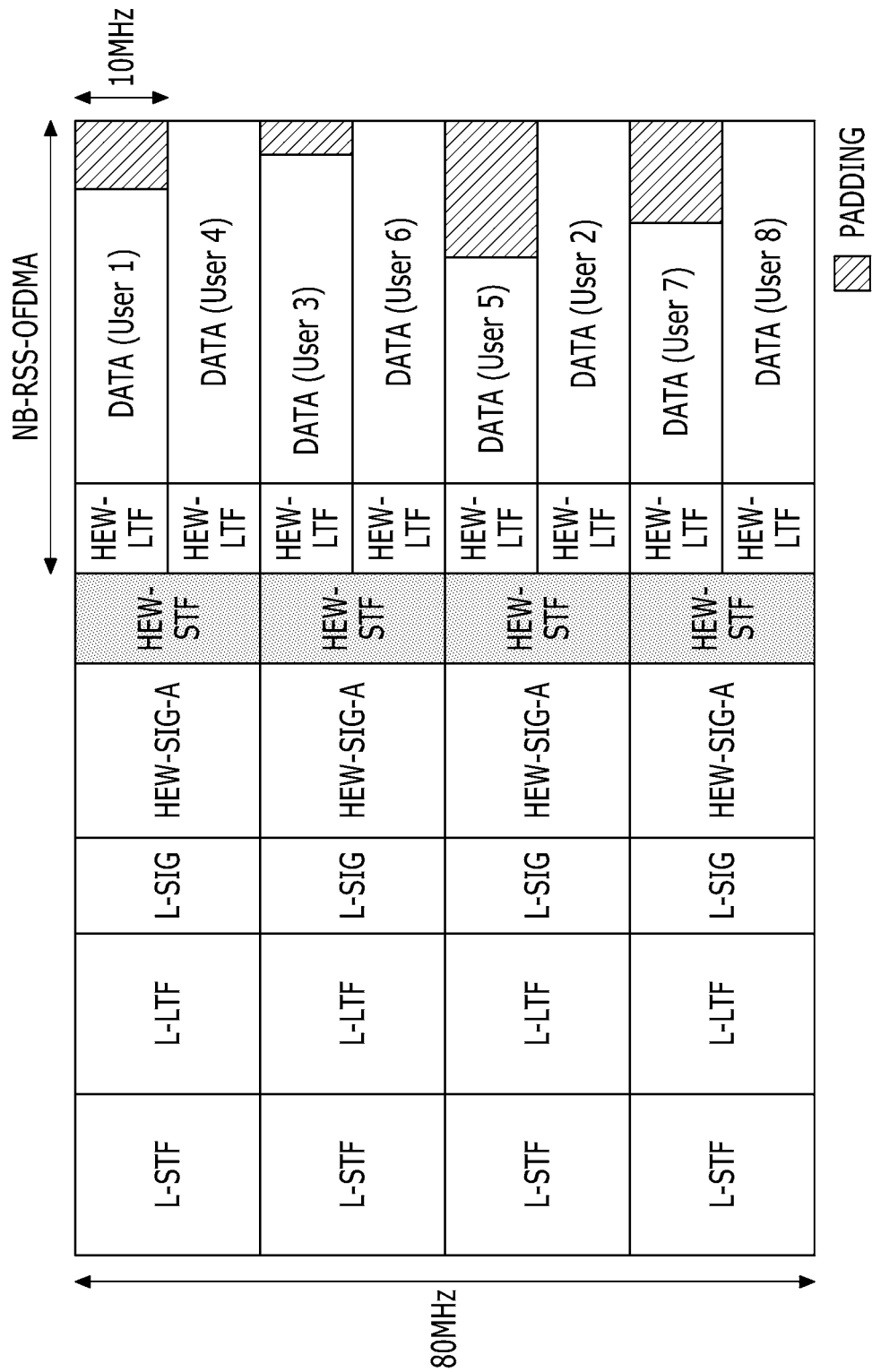

FIG. 35, FIG. 36, FIG. 37, and FIG. 38 each schematically exemplify an entire channel width of a frame format for a NB-RSS-OFDMA transmission in a wireless communication network according various embodiments of the present invention. It is assumed in FIG. 35, FIG. 36, FIG. 37, and FIG. 38 that an entire channel width is divided into four bands. Further, it is assumed that the entire channel width is 80 MHz and each band has a 20 MHz bandwidth. Furthermore, FIG. 35 and FIG. 36 show a case that a long preamble frame exemplified in FIG. 9 or FIG. 11 uses a HEW compatible part exemplified in FIG. 13, and FIG. 37 and FIG. 38 show a case that a short preamble frame exemplified in FIG. 10 uses a HEW compatible part exemplified in FIG. 12.

Referring to FIG. 35 and FIG. 37, a NB-RSS-OFDMA transmission may be applied to some band among the plurality of bands into which the entire bandwidth is divided. FIG. 35 and FIG. 37 exemplify a case that the NB-RSS-OFDMA transmission is applied to the third band and the third band is divided into two subbands.

Then, a transmitting device can transmit data of different users on a plurality of subbands into which the third band is divided. For example, as shown in FIG. 35 and FIG. 37, the transmitting device may transmit data [DATA(User 3)] to a device of user 3 on the first subband and may transmit data [DATA(User 6)] to a device of user 6 on the second subband.

Referring to FIG. 36 and FIG. 38, the NB-RSS-OFDMA transmission may be applied to all of the plurality of bands into which the entire bandwidth is divided.

Then, the transmitting device can transmit data to a corresponding user on each of the plurality of subbands. In the example shown in FIG. 36 and FIG. 38, data [DATA (User 1)] of user 1 and data [DATA(User 4)] of user 4 are transmitted on the first subband and the second subband in the first band, respectively. Data [DATA(User 3)] of user 3 and data [DATA(User 6)] of user 6 are transmitted on the first subband and the second subband in the second band, respectively. Data [DATA(User 5)] of user 5 and data [DATA(User 2)] of user 2 are transmitted on the first subband and the second subband in the third band, respectively. Data [DATA(User 7)] of user 7 and data [DATA(User 8)] of user 8 are transmitted on the first subband and the second subband in the fourth band, respectively.

In some embodiments, as described above, a power of a HEW-STF to which the NB-RSS-OFDMA transmission is applied may be set to be N times (two times in examples shown in FIG. 35 to FIG. 38) a power of a L-STF, or the number of subcarriers in the HEW-STF may be set to be N times (two times in examples shown in FIG. 35 to FIG. 38) the number of subcarriers in the L-STF. Alternatively, the power of the HEW-STF to which the NB-RSS-OFDMA transmission is applied may be set to be the same as the power of the L-STF.

In some embodiments, as described above, a HEW-SIG-A may include an indication indicating whether the NB-RSS-OFDMA transmission is applied.

As described above, since a resource can be allocated in a subband unit by the NB-RSS-OFDMA transmission, the channel efficiency can be improved and an amount of information to be transmitted can be increased.

Differently from the NB-RSS-OFDMA transmission, the subcarrier spacing may remain the same as the legacy compatible part without being reduced. Hereinafter, this transmission scheme is referred to as a narrow band OFDMA (NB-OFDMA) transmission. Embodiments using the NB-OFDMA transmission are described with reference to FIG. 39, FIG. 40, FIG. 41, FIG. 42, FIG. 43, and FIG. 44.

Figure 39:
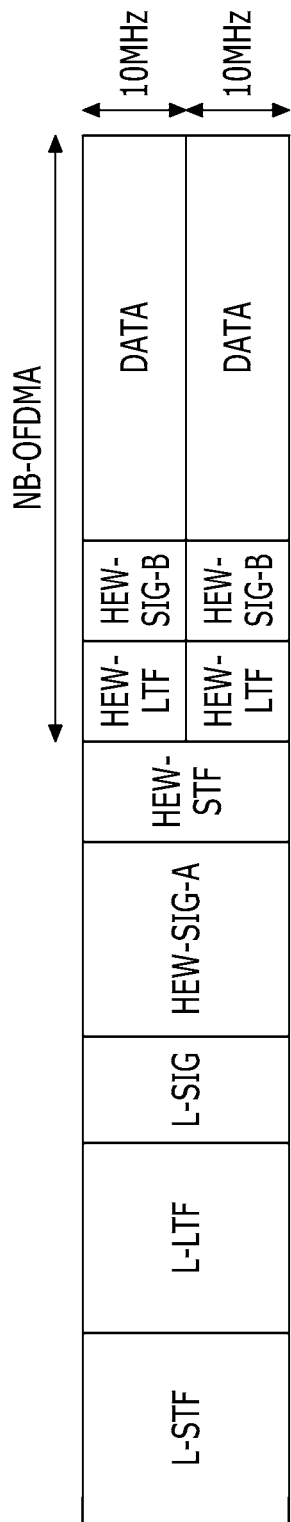
FIG. 39 and FIG. 40 each schematically exemplify one band of a frame format for a NB-OFDMA transmission in a wireless communication network according various embodiments of the present invention.
Figure 40:
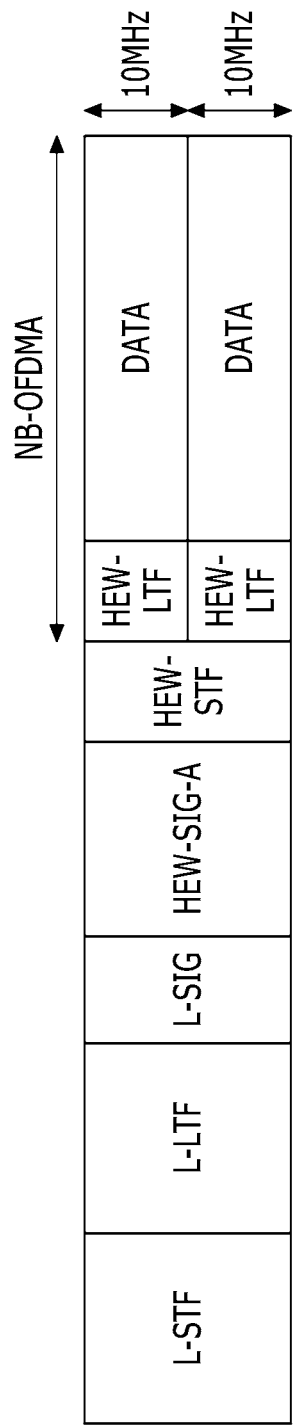

FIG. 39 and FIG. 40 each schematically exemplify one band of a frame format for a NB-OFDMA transmission in a wireless communication network according various embodiments of the present invention. FIG. 39 and FIG. 40 shows one bandwidth when an entire channel width is divided into four bands. It is assumed that the entire channel width is 80 MHz and a bandwidth of each band is 20 MHz.

Further, FIG. 39 shows one band of a case that a long preamble frame exemplified in FIG. 9 or FIG. 11 uses a HEW compatible part exemplified in FIG. 13, and FIG. 40 shows one band of a case that a short preamble frame exemplified in FIG. 10 uses a HEW compatible part exemplified in FIG. 12.

Referring to FIG. 39 and FIG. 40, a band is divided into a plurality of subbands in some field of the HEW compatible part band, and normal subcarrier spacing is applied to each subband. That is, the same subcarrier spacing, for example subcarrier spacing of 312.5 kHz, is applied to a subband of the HEW compatible part and the legacy compatible part. Accordingly, when a band is divided into N subbands, the number of subcarriers of a symbol to which the NB-OFDMA is applied is (1/N) of the number of subcarriers of a symbol to which the NB-OFDMA is not applied.

FIG. 39 and FIG. 40 show an example that a 20 MHz band is divided two 10 MHz subbands.

In one embodiment, the transmitting device may apply the NB-OFDMA scheme to all fields of the HEW compatible part.

In another embodiment, the transmitting device may apply the NB-OFDMA scheme to some field including a data field in the HEW compatible part.

In yet another embodiment, the transmitting device may apply the NB-OFDMA scheme to fields except for a HEW short training field (HEW-STF) transmitted for an automatic gain control in the HEW compatible part, as shown in FIG. 39 and FIG. 40. In this case, a power of the HEW-STF may be set to be the same as a power of the L-STF.

In some embodiments, a HEW signal field (HEW-SIG-A) may include an indication indicating whether the NB-OFDMA transmission is applied. In another embodiment, the indication may further a value indicating a band to which the NB-OFDMA transmission is applied.

Figure 41:
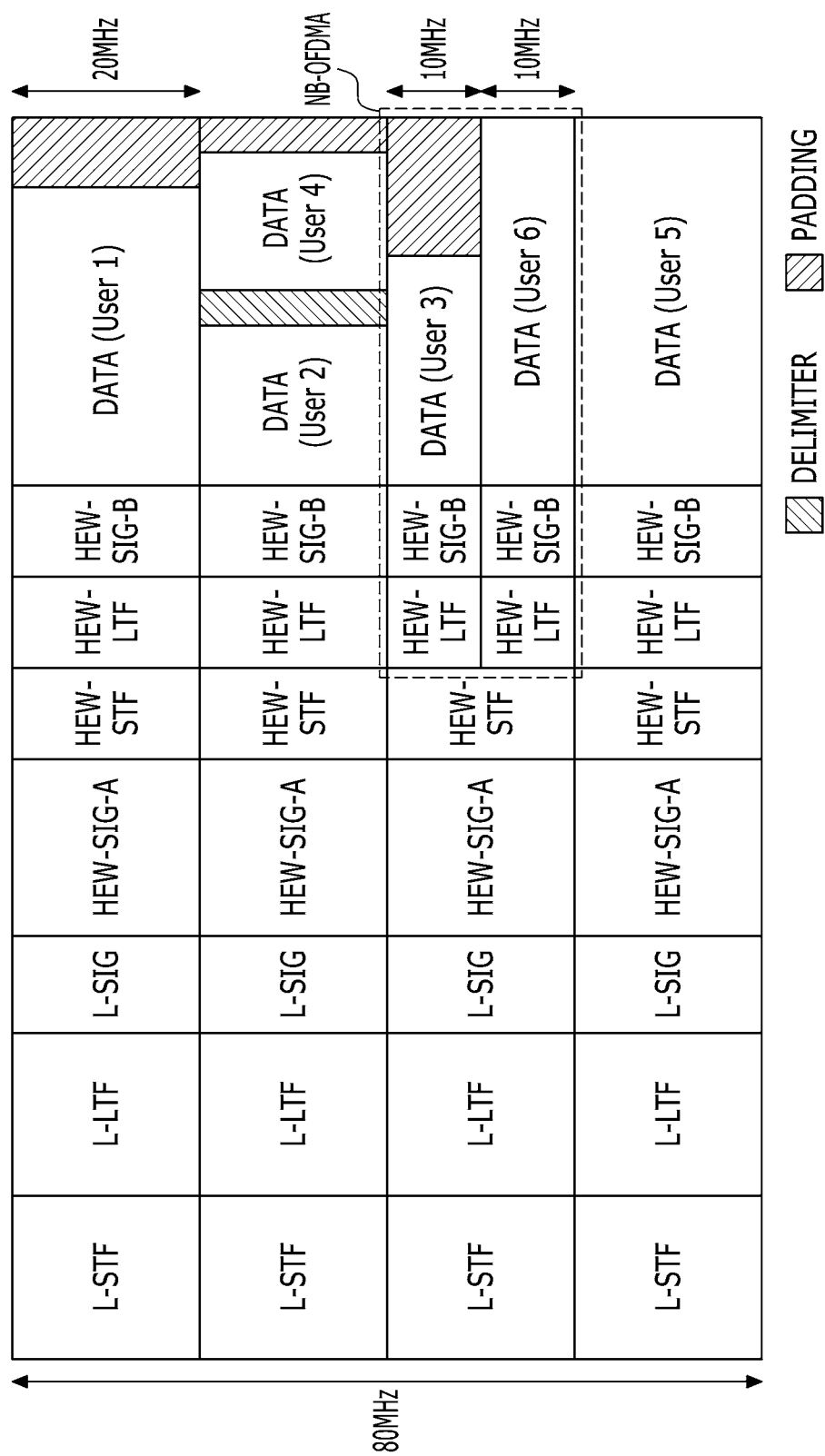
FIG. 41, FIG. 42, FIG. 43, and FIG. 44 each schematically exemplify an entire channel width of a frame format for a NB-OFDMA transmission in a wireless communication network according various embodiments of the present invention.
Figure 42:
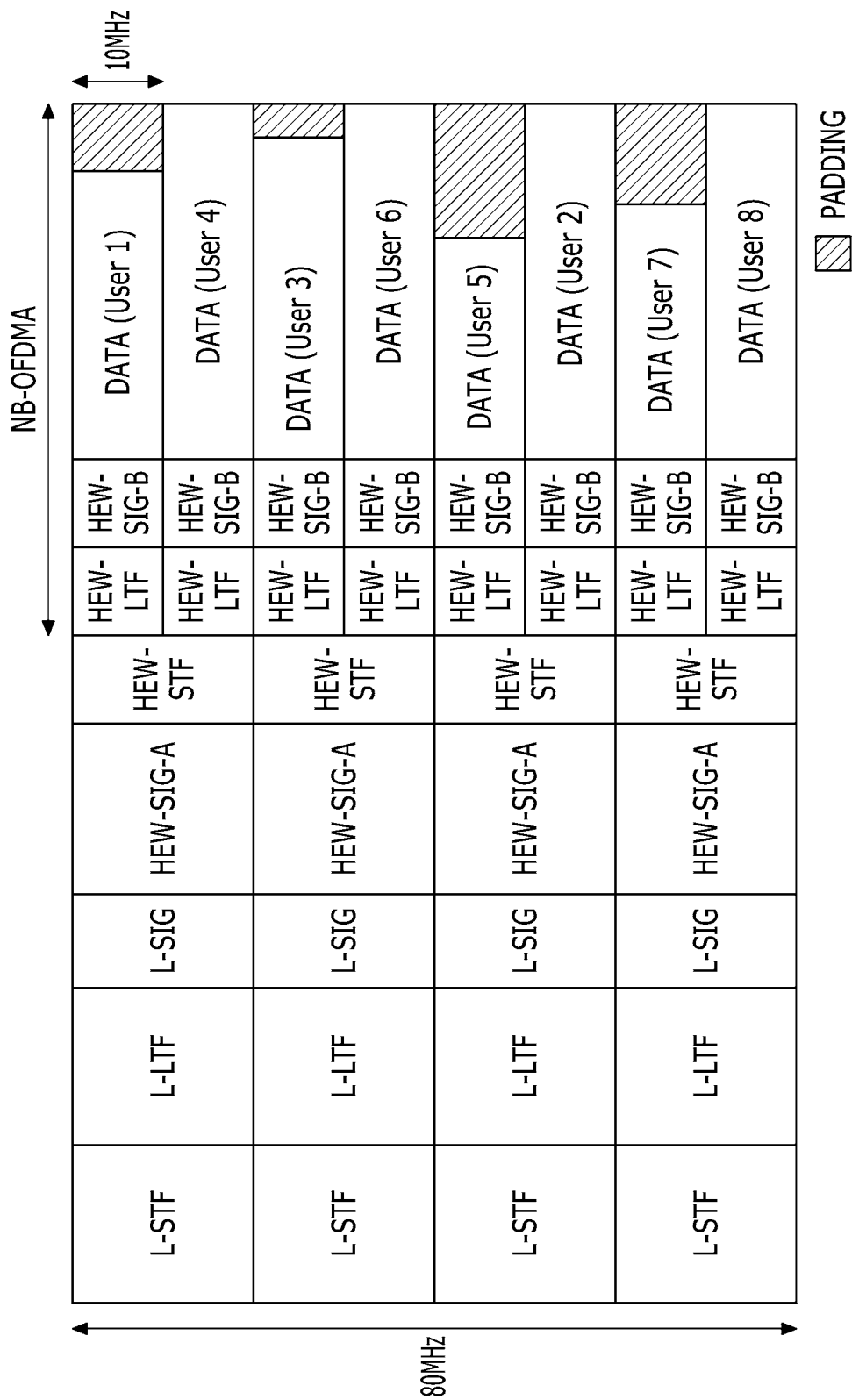
Figure 43:
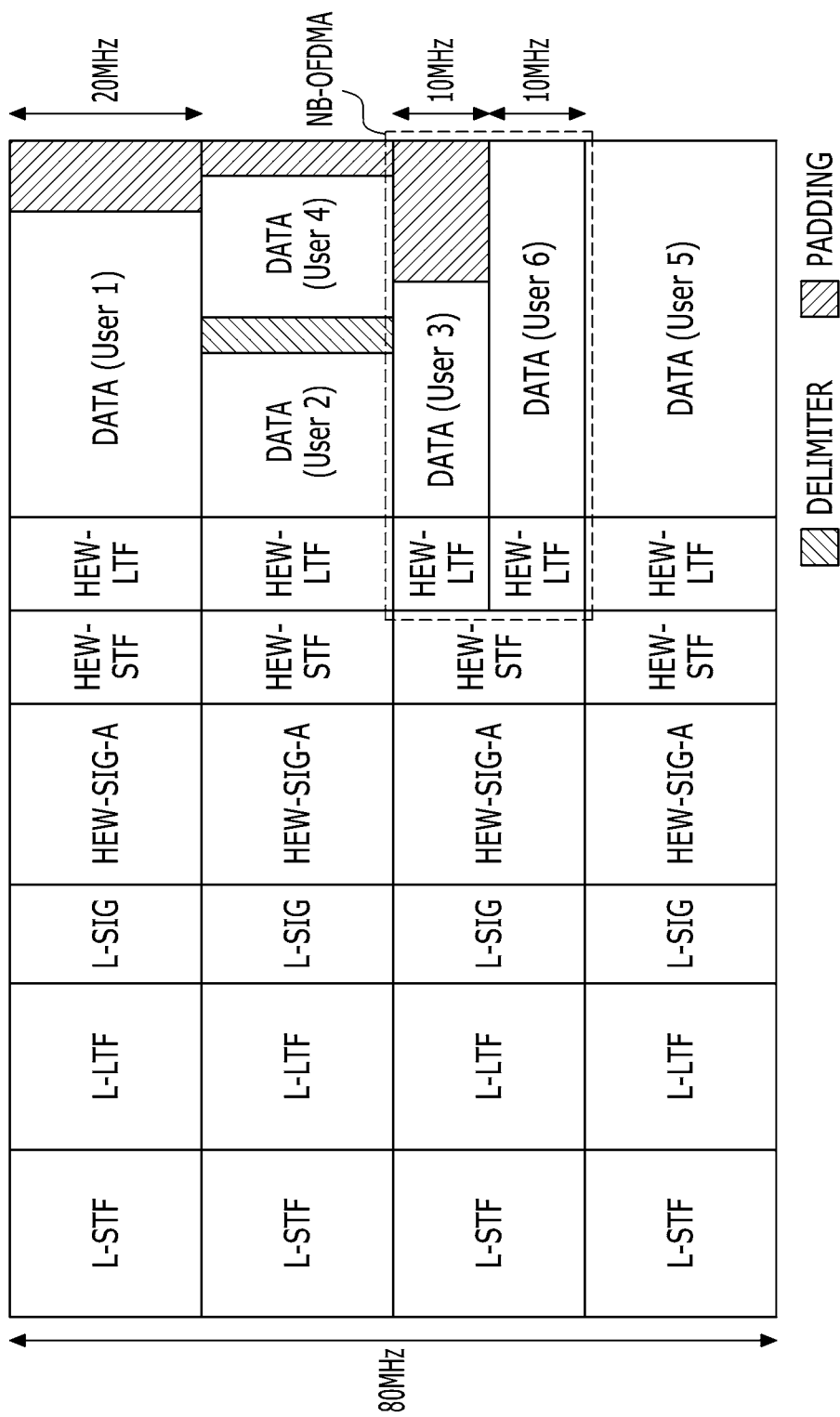
Figure 44:
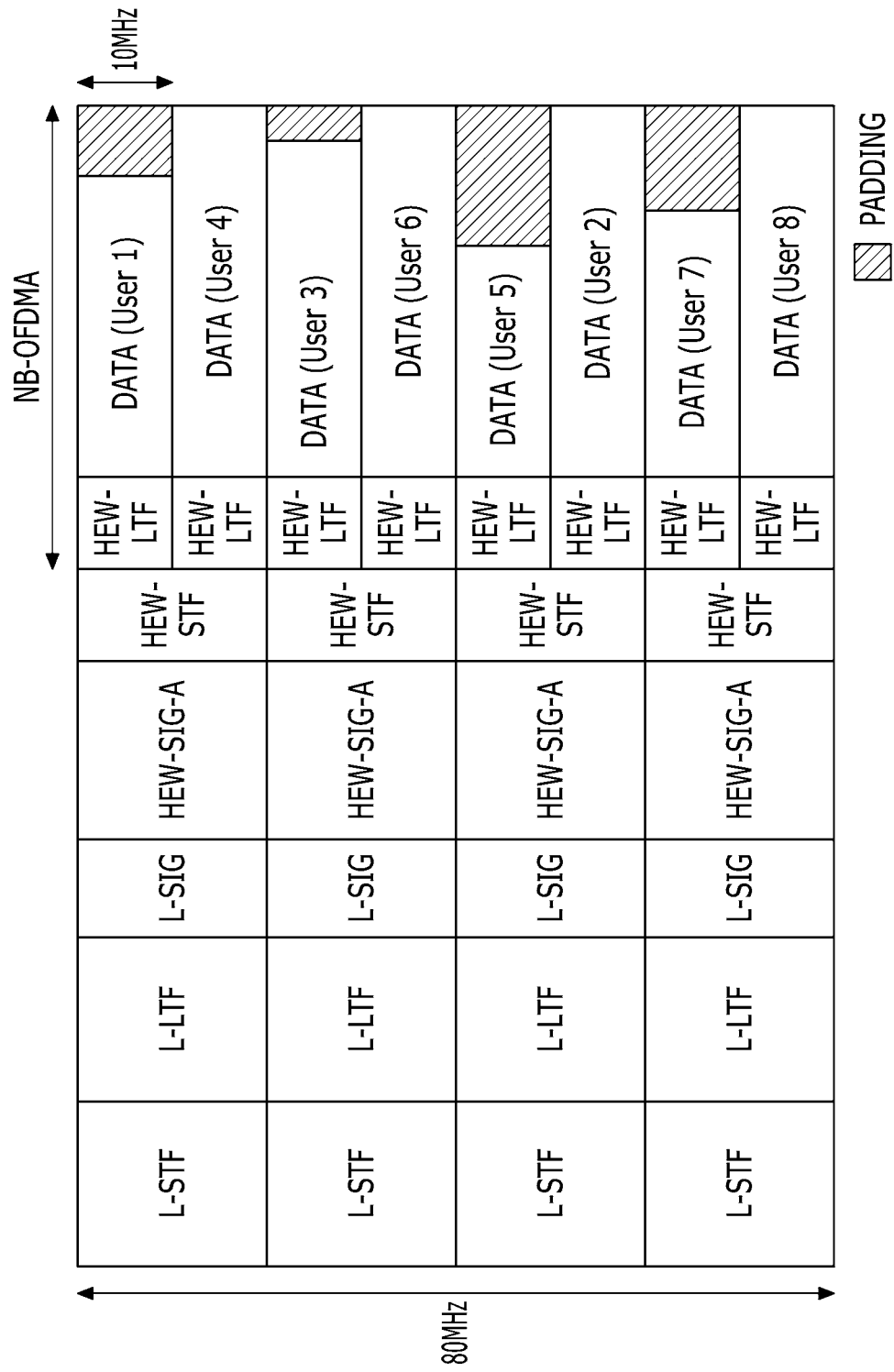

FIG. 41, FIG. 42, FIG. 43, and FIG. 44 each schematically exemplify an entire channel width of a frame format for a NB-OFDMA transmission in a wireless communication network according various embodiments of the present invention. It is assumed in FIG. 41, FIG. 42, FIG. 43, and FIG. 44 that an entire channel width is divided into four bands. Further, it is assumed that the entire channel width is 80 MHz and each band has a 20 MHz bandwidth. Furthermore, FIG. 41 and FIG. 43 show a case that a long preamble frame exemplified in FIG. 9 or FIG. 11 uses a HEW compatible part exemplified in FIG. 13, and FIG. 42 and FIG. 44 show a case that a short preamble frame exemplified in FIG. 10 uses a HEW compatible part exemplified in FIG. 12.

Referring to FIG. 41 and FIG. 43, a NB-OFDMA transmission may be applied to some band among the plurality of bands into which the entire bandwidth is divided. FIG. 41 and FIG. 43 exemplify a case that the NB-OFDMA transmission is applied to the third band and the third band is divided into two subbands. As shown in FIG. 41 and FIG. 43, the NB-OFDMA may applied to fields except for the HEW-STF in the HEW compatible part.

Then, a transmitting device can transmit data of different users on a plurality of subbands into which the third band is divided. For example, as shown in FIG. 41 and FIG. 43, the transmitting device may transmit data [DATA(User 3)] to a device of user 3 on the first subband and may transmit data [DATA(User 6)] to a device of user 6 on the second subband.

Referring to FIG. 42 and FIG. 44, the NB-OFDMA transmission may be applied to all of the plurality of bands into which the entire bandwidth is divided.

Then, the transmitting device can transmit data to a corresponding user on each of the plurality of subbands. In the example shown in FIG. 42 and FIG. 44, data [DATA (User 1)] of user 1 and data [DATA(User 4)] of user 4 are transmitted on the first subband and the second subband in the first band, respectively. Data [DATA(User 3)] of user 3 and data [DATA(User 6)] of user 6 are transmitted on the first subband and the second subband in the second band, respectively. Data [DATA(User 5)] of user 5 and data [DATA(User 2)] of user 2 are transmitted on the first subband and the second subband in the third band, respectively. Data [DATA(User 7)] of user 7 and data [DATA(User 8)] of user 8 are transmitted on the first subband and the second subband in the fourth band, respectively.

In some embodiments, as described above, a HEW-SIG-A may include an indication indicating whether the NB-OFDMA transmission is applied.

As described above, since a resource can be allocated in a subband unit by the NB-OFDMA transmission, the channel efficiency can be improved.

Next, embodiments using a NB-OFDMA transmission or a NB-RSS-OFDMA transmission according to various embodiments of the present invention are described.

Figure 45:
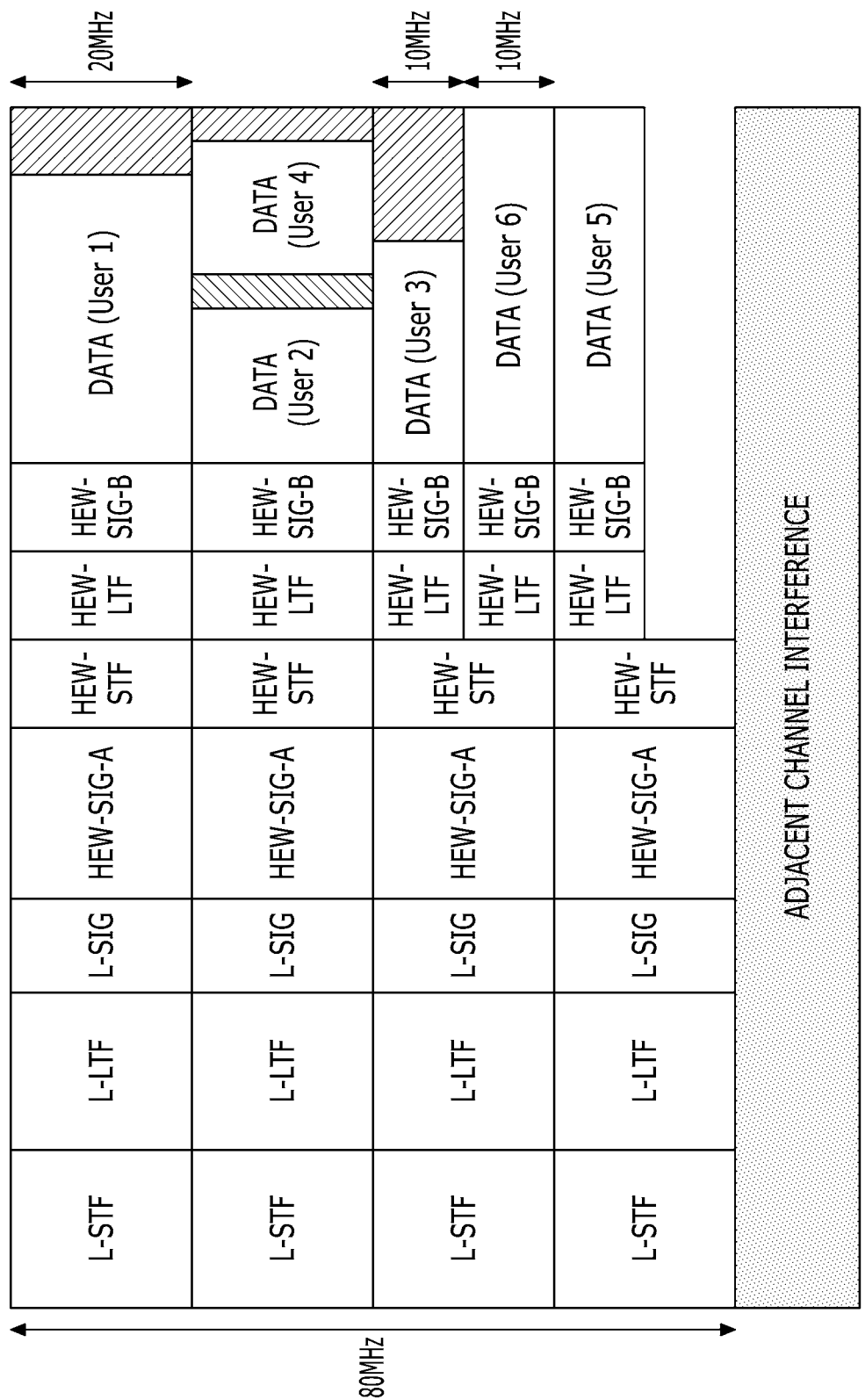
FIG. 45, FIG. 46, and FIG. 47 each exemplify an interference control method in a wireless communication network according various embodiments of the present invention.
Figure 46:
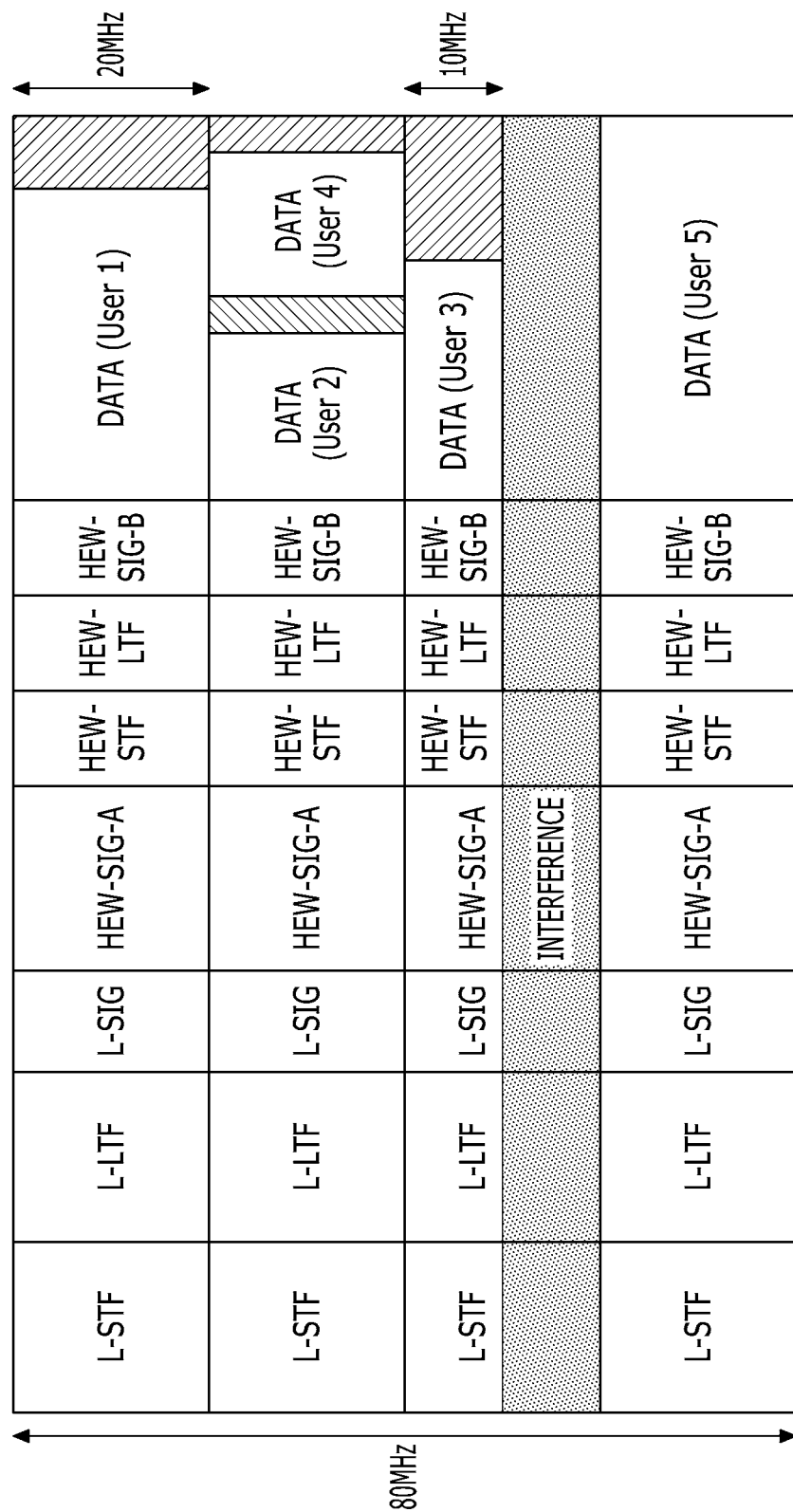
Figure 47:
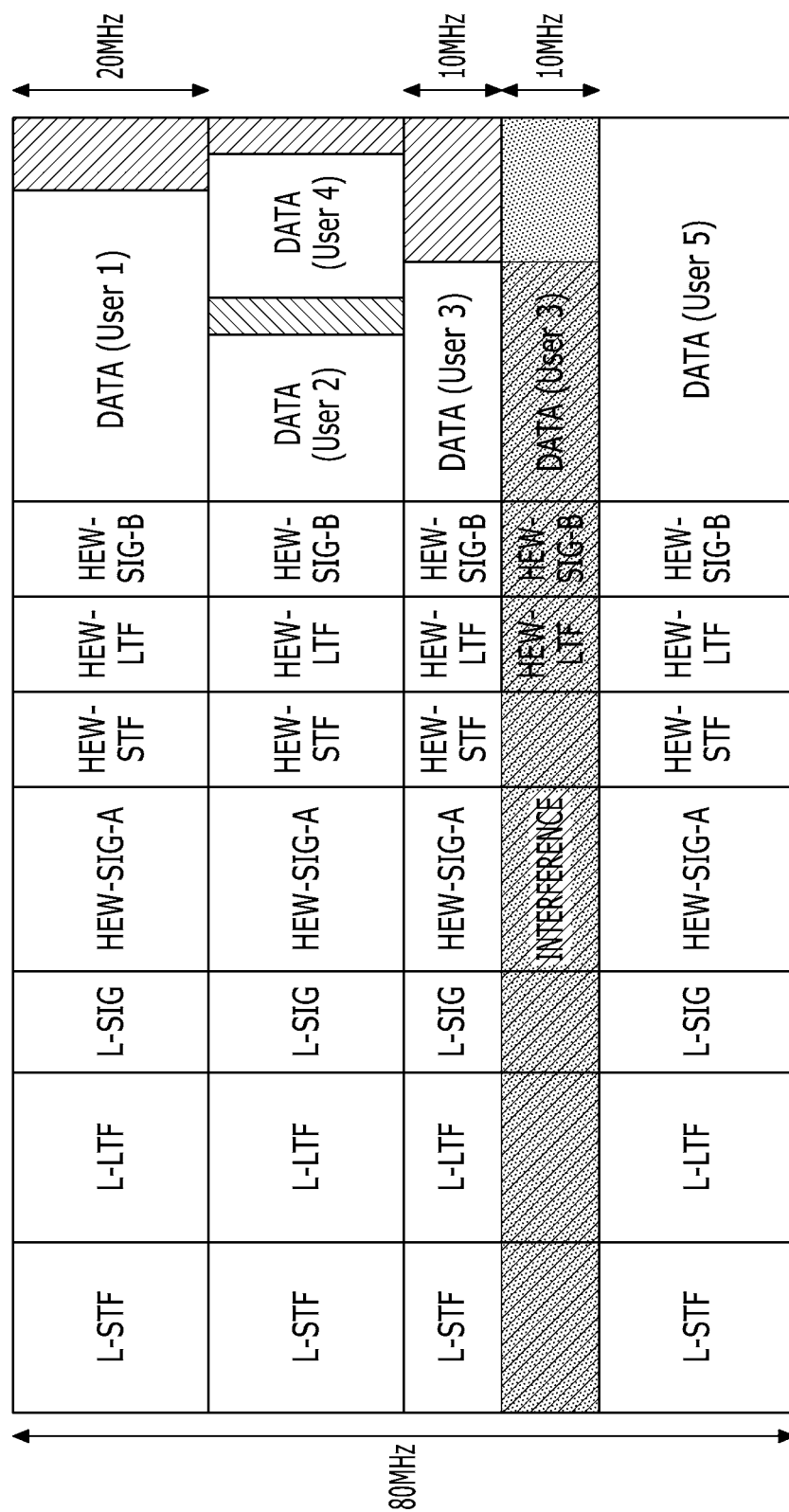

FIG. 45, FIG. 46, and FIG. 47 each exemplify an interference control method in a wireless communication network according various embodiments of the present invention.

A transmitting device and a receiving device may exchange interference information. The interference information may include adjacent channel interference information or co-channel interference information. The interference information may include information on a band in which there is no interference or information on a band in which there is interference. In some embodiments, the transmitting device transmits an RTS frame and the receiving device transmits a CTS frame as a response such that the interference information can be exchanged.

The transmitting device transmits a data frame on a frequency resource except for a subband which is influenced by the interference, by using NB-OFDMA or NB-RSS-OFDMA.

Accordingly, the receiving device can enhance reliability by filtering a subband which is influenced by the interference or placing a guard band on the subband which is influenced by the interference. Since a preamble such as a short training field and a long training field and a signal field are more robust than a data field, the link quality can be improved by excluding the subband which is influenced by the interference in a HEW compatible part.

Referring to FIG. 45, when there is interference from an adjacent channel, the transmitting device may exclude a subband neighboring to the adjacent channel from a data transmission, among a band which is influenced by the interference from the adjacent channel. That is, the transmitting device may transmit the data frame on a subband except for the subband (the second subband of the fourth band in an example shown in FIG. 45) neighboring to the adjacent channel, by applying the NB-OFDMA or NB-RSS-OFDMA. Accordingly, the influence by the interference from the adjacent channel can be removed.

Referring to FIG. 46, when there is interference from a co-channel, the transmitting device may exclude from a data transmission a subband which is influenced by the interference from the co-channel. That is, the transmitting device may transmit the data frame on a subband except for the subband (the second subband of the third band in an example shown in FIG. 46) which is influenced by the interference from the co-channel, by applying the NB-OFDMA or NB-RSS-OFDMA. Accordingly, the transmitting device can remove the influence by the interference from the co-channel, and can prevent its signal from operating as an interference source on the co-channel.

Referring to FIG. 47, when there is interference from a co-channel, the transmitting device may transmit a duplicated field on a subband which is influenced by the interference from the co-channel. That is, the transmitting device may copy fields of the first subband to the subband (the second subband of the third band in an example shown in FIG. 46) which is influenced by the interference from the co-channel and transmit the data frame, by applying the NB-OFDMA or NB-RSS-OFDMA. Accordingly, the transmitting device can remove the influence by the interference from the co-channel, and can obtain a channel diversity gain by copying and transmitting the data field.

Next, a frame transmitting method and a frame receiving method using NB-OFDMA or NB-RSS-OFDMA according to an embodiment of the present invention are described.

Figure 48:
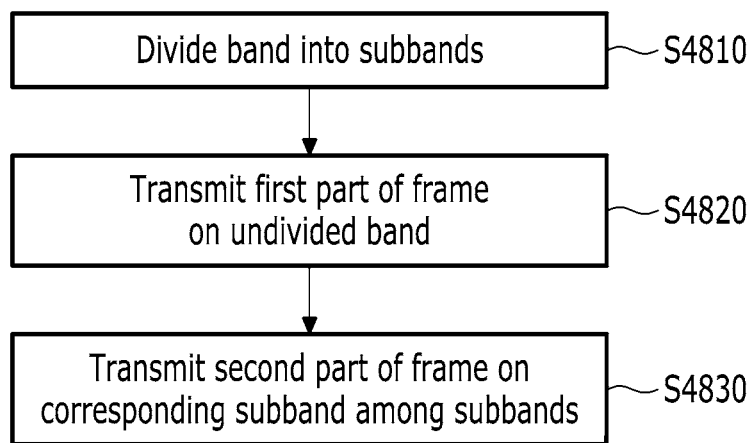
FIG. 48 is a flowchart exemplifying a frame transmitting method in a wireless communication network according to another embodiment of the present invention.
Figure 49:
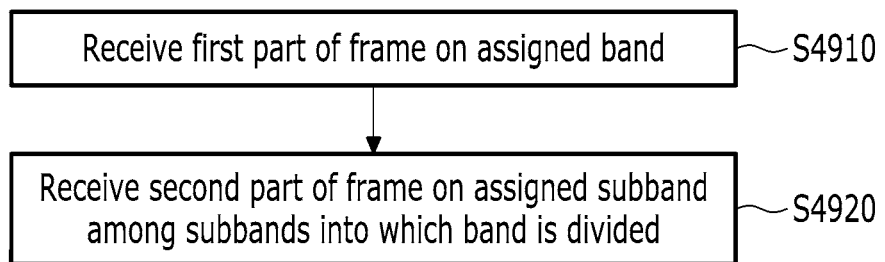
FIG. 49 is a flowchart exemplifying a frame receiving method in a wireless communication network according to another embodiment of the present invention.

FIG. 48 is a flowchart exemplifying a frame transmitting method in a wireless communication network according to another embodiment of the present invention, and FIG. 49 is a flowchart exemplifying a frame receiving method in a wireless communication network according to another embodiment of the present invention.

Referring to FIG. 48, a transmitting device divided one band into a plurality of subbands (S4810). The transmitting device transmits a first part of the frame to a band that is not divided into the subbands (S4820), and transmits a second part of the frame to a corresponding subband among the subbands (S4830).

Referring to FIG. 49, a receiving device receives a first part on a band assigned to the receiving device among a frame that is transmitted on a plurality of bands (S4910). Further, the receiving device receives a second part on a subband assigned to the receiving device among a plurality of subbands into which one band is divided (S4920).

In one embodiment, the first part includes a legacy short training field (L-STF), a legacy long training field (L-LTF), a legacy signal field (L-SIG), and a HEW signal field (HEW-SIG-A), and the second part includes a data field. In another embodiment, the first part may further include a HEW short training field (HEW-STF). In yet another embodiment, the second part may further include a HEW long training field (HEW-LTF).

In one embodiment, a symbol of the first part may have the same subcarrier spacing as a symbol of the second part. That is, the first part and the second part may use the same size FFT. In another embodiment, the subcarrier spacing in the symbol of the second part may be narrower than the subcarrier spacing in the symbol of the first part. That is, the FFT size used in the second part may be larger than the FFT size used in the first part.

A wireless communication network according to some embodiments may selectively use the NB-OFDMA or the NB-RSS-OFDMA in accordance with a current condition. Hereinafter such embodiments are described with reference to FIG. 50.

Figure 50:
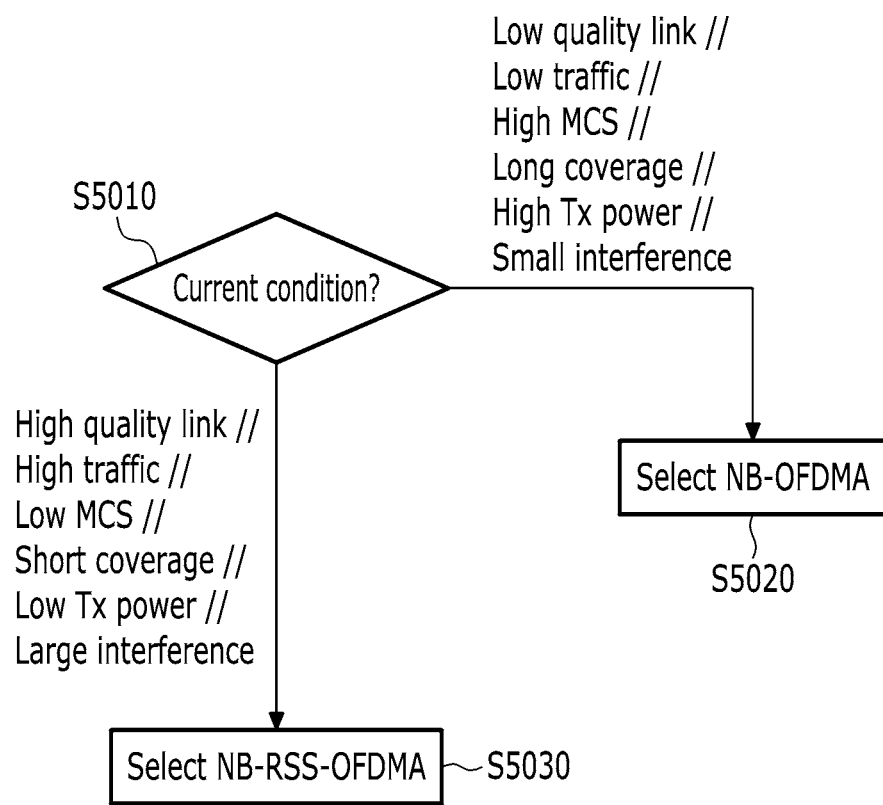
FIG. 50 is a flowchart exemplifying a method for selecting NB-OFDMA or NB-RSS-OFDMA according to an embodiment of the present invention.

FIG. 50 is a flowchart exemplifying a method for selecting NB-OFDMA or NB-RSS-OFDMA according to an embodiment of the present invention.

Referring to FIG. 50, a transmitting device can select NB-OFDMA or NB-RSS-OFDMA based on a current condition (S5010). That is, the transmitting device determines to use the NB-OFDMA transmission when the current condition is a condition suitable for the NB-OFDMA transmission (S5020), and determines to use the NB-RSS-OFDMA transmission when the current condition is a condition suitable for the NB-RSS-OFDMA transmission (S5030).

One example of the condition may be a link quality. The link quality may be determined by interference, a channel noise, fading, Doppler Effect, and/or a delay spread. If the current condition is a high quality link, the transmitting device may select the NB-RSS-OFDMA transmission since the reduced subcarrier spacing can be used. Otherwise, the transmitting device may select the NB-OFDMA transmission.

Another example of the condition may be traffic. If the current condition requires high traffic, the transmitting device may select the NB-RSS-OFDMA transmission to increase an amount of information. Otherwise, the transmitting device may select the NB-OFDMA transmission.

Yet another example of the condition may be a modulation and coding scheme (MCS). If the current condition is an environment using a high MCS level, the transmitting device may select the NB-OFDMA transmission using wide subcarrier spacing since the phase noise performance of a phase-locked loop (PLL) circuit should be good. Otherwise, the transmitting device may select the NB-RSS-OFDMA transmission.

Yet another example of the condition may be coverage. If the current condition requires the long coverage, the transmitting device may select the NB-OFDMA transmission using the wide subcarrier spacing. Otherwise, the transmitting device may select the NB-RSS-OFDMA transmission.

Yet another example of the condition may be a transmission power. If the current condition is an environment using a high transmission power, the transmitting device may select the NB-OFDMA transmission. Otherwise, the transmitting device may select the NB-RSS-OFDMA transmission.

Yet another example of the condition may be interference. If the current condition is an environment where the interference to a required data rate is large, the transmitting device may select NB-RSS-OFDMA transmission. Otherwise, the transmitting device may select the NB-OFDMA transmission.

In some embodiments, a wireless communication network may selectively use a length of GI duration in accordance with the current condition. Such embodiments are described with reference to FIG. 51.

Figure 51:
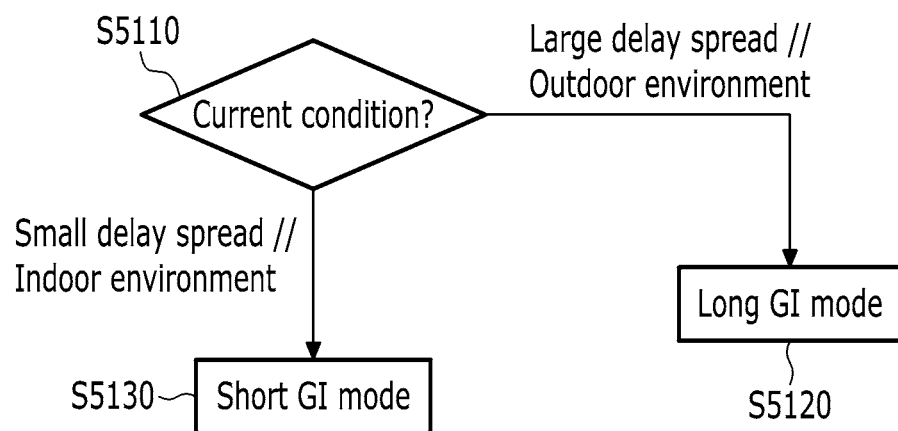
FIG. 51 is a flowchart exemplifying a method for selecting a GI mode according to an embodiment of the present invention.

FIG. 51 is a flowchart exemplifying a method for selecting a GI mode according to an embodiment of the present invention.

Referring to FIG. 51, a transmitting device may select a long GI mode or a short GI mode based on a current condition (S5110). The transmitting device determines to use the long GI mode if the current condition is a condition suitable for the long GI (S5120), and determines to use the short GI mode if the current condition is a condition suitable for the short GI (S5130). For example, ¼ CP or ⅛ CP may be used in the long GI mode and 1/16 CP or 1/32 CP may be used in the short GI mode.

One example of the condition may be delay spread. If the current condition is an environment where the delay spread is large, the transmitting device may select the long GI mode. Otherwise, the transmitting device may select the short GI mode.

Another example of the condition may be an outdoor environment. If the current condition is the outdoor environment, the transmitting device may select the long GI mode. Otherwise, the transmitting device may select the short GI mode.

Hereinafter, pilot transmission and phase tracking at the NB-RSS-OFDMA transmission in a wireless communication network according to an embodiment of the present invention are described.

Figure 52:
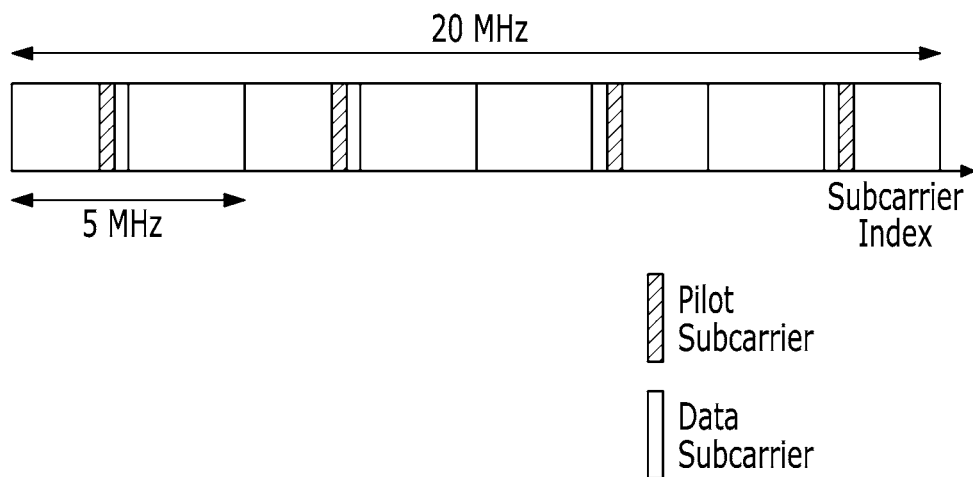
FIG. 52, FIG. 53, and FIG. 54 each exemplify a pilot transmission method in a wireless communication network according to various embodiments of the present invention.
Figure 53:
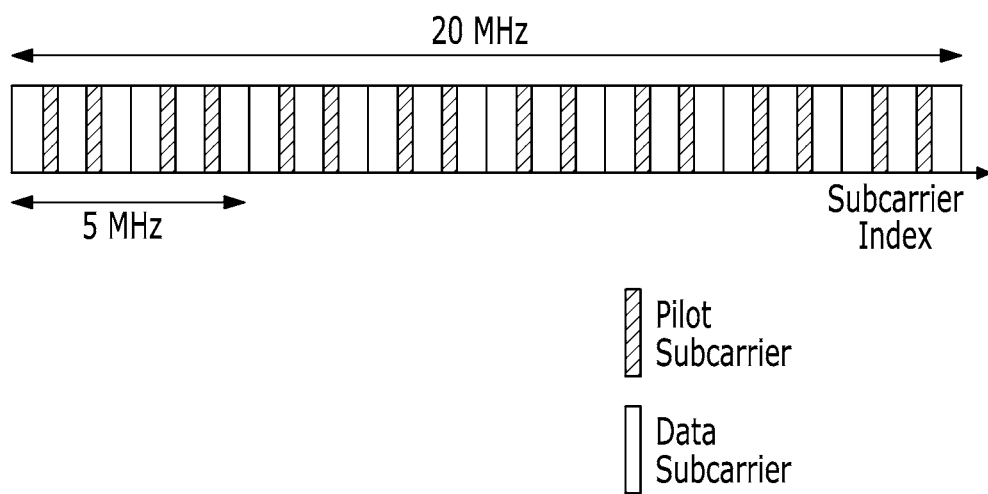
Figure 54:
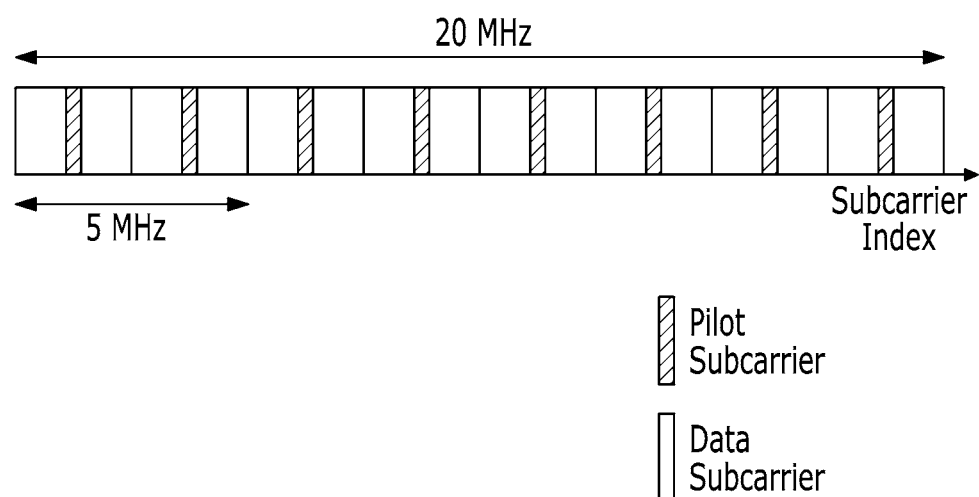

FIG. 52, FIG. 53, and FIG. 54 each exemplify a pilot transmission method in a wireless communication network according to various embodiments of the present invention.

In the previous WLAN, for example the WLAN according to the IEEE standard 802.11ac, four pilots per symbol, six pilots per symbol, and eight pilots per symbol are used in a 20 MHz bandwidth, a 40 MHz bandwidth, and an 80 MHz bandwidth, respectively. Therefore, when the NB-RSS-OFDMA transmission is used, four pilots per symbol, six pilots per symbol, and eight pilots per symbol may be used in the 20 MHz bandwidth, the 40 MHz bandwidth, and the 80 MHz bandwidth, respectively.

For example, as shown in FIG. 52, 256 FFT may be used in the 20 MHz bandwidth such that the 20 MHz bandwidth may be transmitted by being divided into four 5 MHz subbands. In this case, when a scheme according to the IEEE standard 802.11ac is used, one pilot is positioned every 5 MHz subband in one symbol. Accordingly, when the four 5 MHz subband are transmitted to receiving devices of different users, each receiving device should track the phase by receiving the entire 20 MHz bandwidth and extracting all of subcarriers corresponding to the four pilots. Therefore, implementation of the device may be complicated and power consumption efficiency may be decreased.

In some embodiments, as shown in FIG. 53 and FIG. 54, a plurality of pilots may be allocated to each subband in one symbol. Referring to FIG. 53, pilots are allocated to four subcarriers of each subband in one symbol. Referring to FIG. 54, pilots are allocated to two subcarriers of each subband in one symbol.

Then, the receiving device may track the phase by extracting only subcarriers corresponding to the pilots of a subband which is assigned to the receiving device.

In FIG. 53 and FIG. 54, the number of pilots is increased in the entire 20 MHz bandwidth such that the number of data subcarriers is decreased. As a result, the frequency resource efficiency is deteriorated. Next, embodiments for increasing frequency resource efficiency compared with embodiments exemplified in FIG. 53 and FIG. 54 are described.

Figure 57:
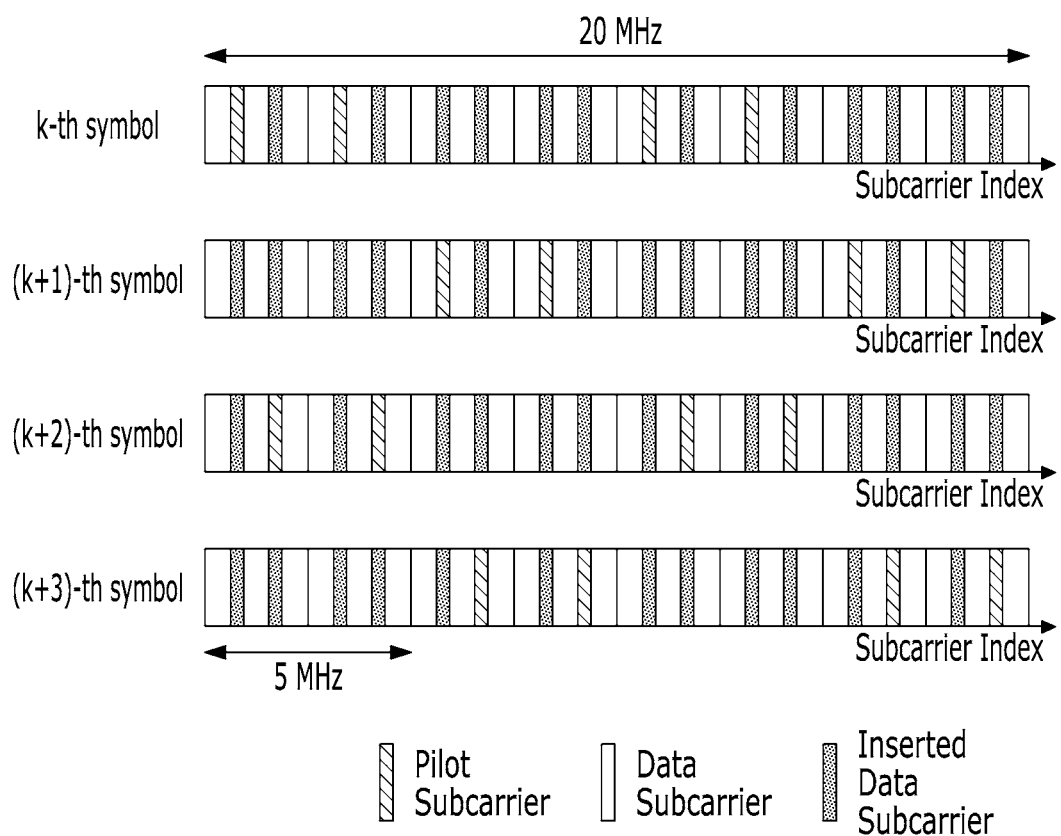
Figure 58:
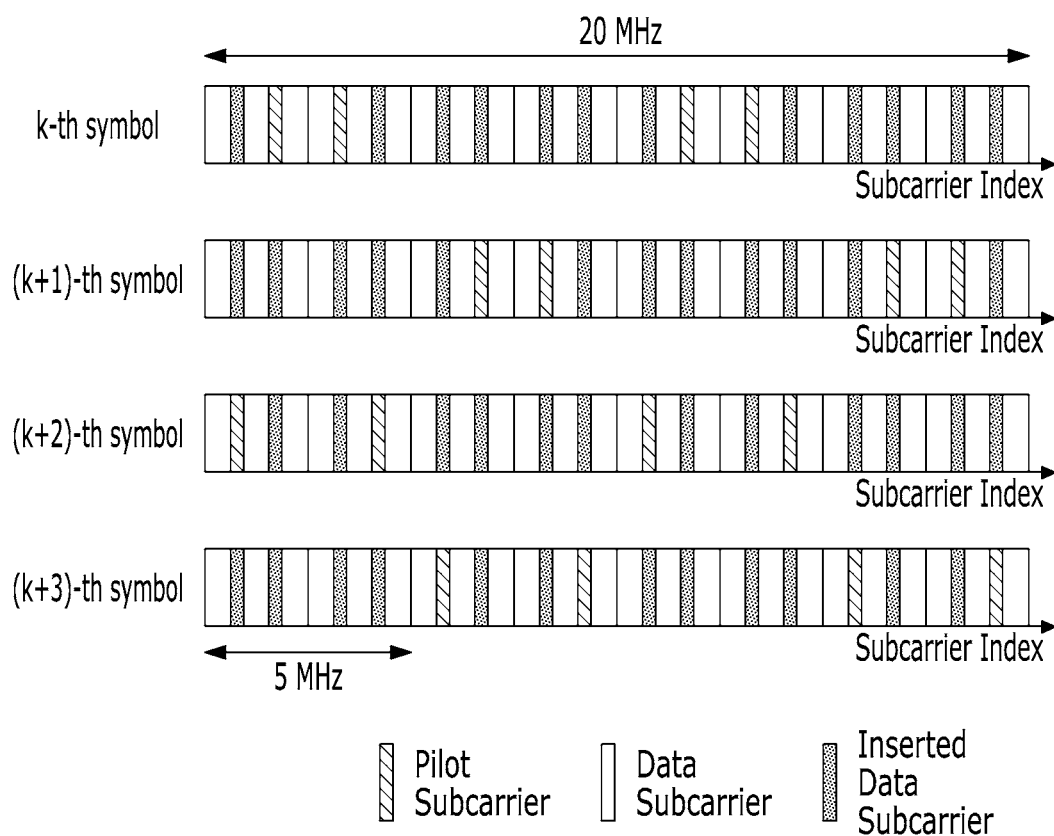
Figure 59:
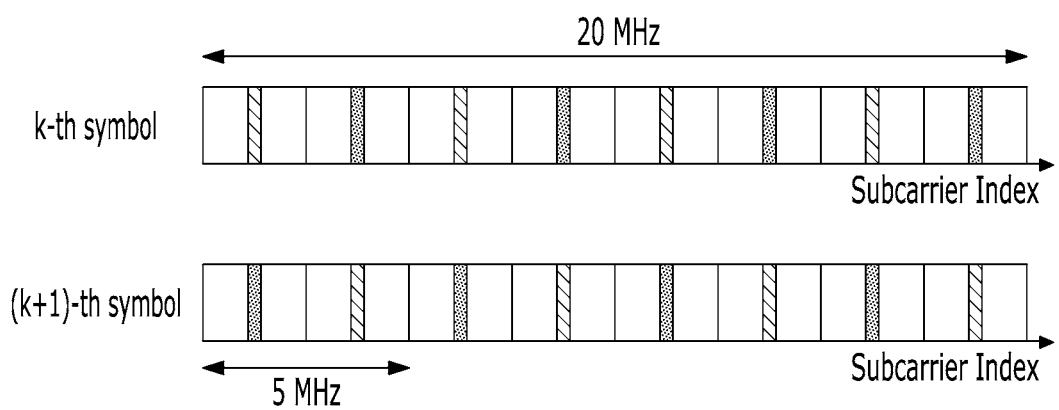
FIG. 59 and FIG. 60 each show exemplary variations of a pilot transmission method exemplified in FIG. 54.
Figure 60:
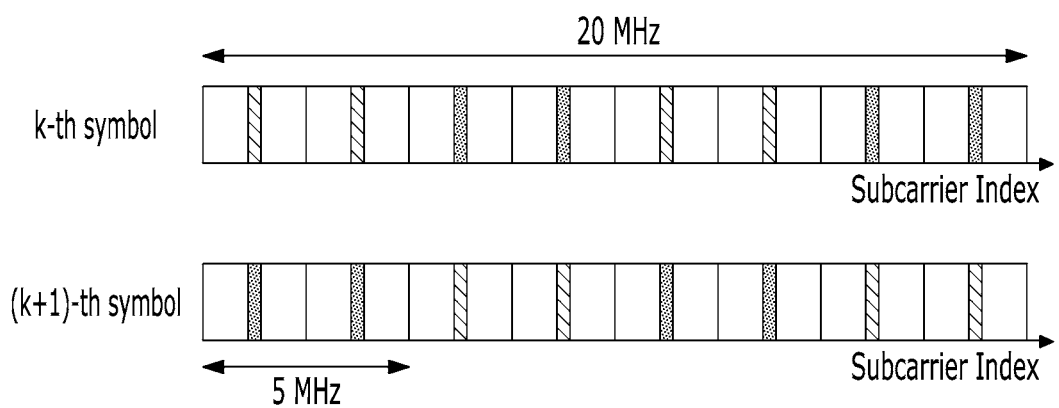

FIG. 55, FIG. 56, FIG. 57, and FIG. 58 each show exemplary variations of a pilot transmission method exemplified in FIG. 53, and FIG. 59 and FIG. 60 each show exemplary variations of a pilot transmission method exemplified in FIG. 54.

Figure 55:
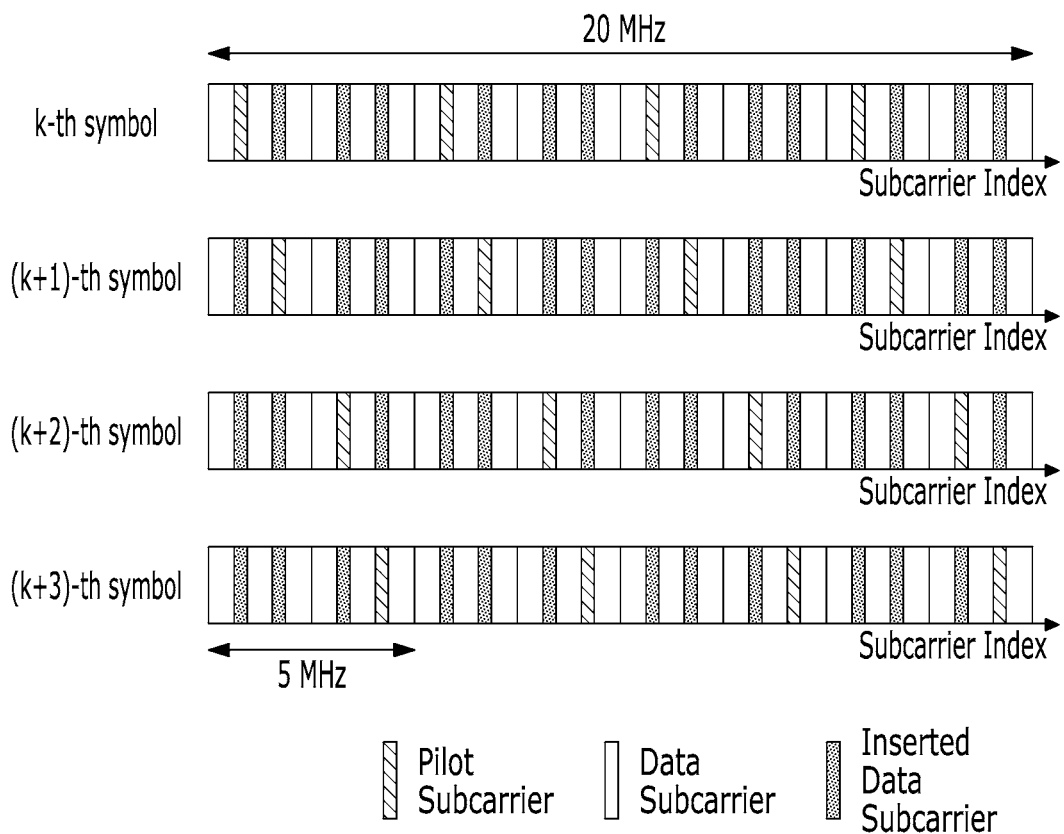
FIG. 55, FIG. 56, FIG. 57, and FIG. 58 each show exemplary variations of a pilot transmission method exemplified in FIG. 53.

Referring to FIG. 55, when N pilot subcarriers are allocated to one subband, N pilots may be transmitted through N consecutive symbols. In this case, one pilot may be allocated to one symbol in each subband. In an example shown in FIG. 55, in each subband, the pilot may be allocated to the first pilot subcarrier at the k-th symbol, the pilot may be allocated to the second pilot subcarrier at the (k+1)-th symbol, the pilot may be allocated to the third pilot subcarrier at the (k+2)-th symbol, and the pilot may be allocated to the fourth pilot subcarrier at the (k+3)-th symbol. Remaining pilot subcarriers to which the pilot is not allocated can be used as the data subcarrier.

Figure 56:
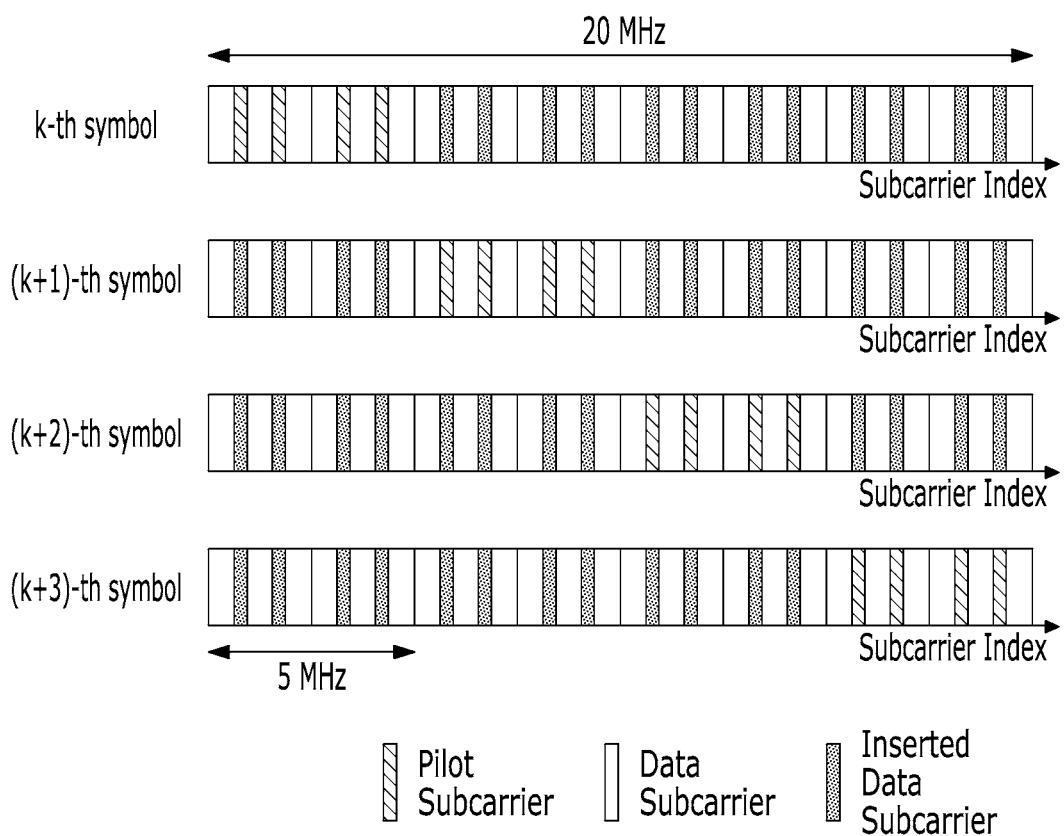

Referring to FIG. 56, when N pilot subcarriers are allocated to one subband, N pilots may be transmitted through one symbol among N consecutive symbols. In this case, a symbol to which the pilots are allocated may be set differently for each subband. In an example shown in FIG. 56, in each subband, the pilots may be allocated to four pilot subcarriers of the k-th symbol in the first subband, the pilots may be allocated to four pilot subcarriers of the (k+1)-th symbol in the second subband, the pilots may be allocated to four pilot subcarriers of the (k+2)-th symbol in the third subband, and the pilots may be allocated to four pilot subcarriers of the (k+3)-th symbol in the fourth subband. Remaining pilot subcarriers to which the pilot is not allocated can be used as the data subcarrier.

Referring to FIG. 57 and FIG. 58, when N pilot subcarriers are allocated to one subband, M pilots may be transmitted every M-symbol period among N consecutive symbols. In this case, symbols to which the pilots are allocated may be set differently for (N/M) subbands.

In an example shown in FIG. 57, the pilots may be allocated at the same interval. In the first subband, the pilots may be allocated to the first and third pilot subcarriers of the k-th symbol, no pilot may be allocated to the (k+1) symbol, the pilots may be allocated to the second and fourth pilot subcarriers of the (k+2)-th symbol in the first subband, and no pilot may be allocated to the (k+3) symbol. In the second subband, no pilot may be allocated to the k-th symbol, the pilots may be allocated to the first and third pilot subcarriers of the (k+1)-th symbol, no pilot may be allocated to the (k+2)-th symbol, and the pilots may be allocated to the second and fourth pilot subcarriers of the (k+3)-th symbol. Similarly, in the third subband, the pilots may be allocated to the first and third pilot subcarriers of the k-th symbol, no pilot may be allocated to the (k+1) symbol, the pilots may be allocated to the second and fourth pilot subcarriers of the (k+2)-th symbol, and no pilot may be allocated to the (k+3) symbol. In the fourth subband, no pilot may be allocated to the k-th symbol, the pilots may be allocated to the first and third pilot subcarriers of the (k+1)-th symbol, no pilot may be allocated to the (k+2)-th symbol, and the pilots may be allocated to the second and fourth pilot subcarriers of the (k+3)-th symbol. Remaining pilot subcarriers to which the pilot is not allocated can be used as the data subcarrier.

In an example shown in FIG. 58, the pilots are allocated in the different pattern from the example shown in FIG. 57. In the first subband, the pilots may be allocated to the second and third pilot subcarriers of the k-th symbol, no pilot may be allocated to the (k+1) symbol, the pilots may be allocated to the first and fourth pilot subcarriers of the (k+2)-th symbol in the first subband, and no pilot may be allocated to the (k+3) symbol. In the second subband, no pilot may be allocated to the k-th symbol, the pilots may be allocated to the second and third pilot subcarriers of the (k+1)-th symbol, no pilot may be allocated to the (k+2)-th symbol, and the pilots may be allocated to the first and fourth pilot subcarriers of the (k+3)-th symbol. Similarly, in the third subband, the pilots may be allocated to the second and third pilot subcarriers of the k-th symbol, no pilot may be allocated to the (k+1) symbol, the pilots may be allocated to the first and fourth pilot subcarriers of the (k+2)-th symbol, and no pilot may be allocated to the (k+3) symbol. In the fourth subband, no pilot may be allocated to the k-th symbol, the pilots may be allocated to the second and third pilot subcarriers of the (k+1)-th symbol, no pilot may be allocated to the (k+2)-th symbol, and the pilots may be allocated to the first and fourth pilot subcarriers of the (k+3)-th symbol. Remaining pilot subcarriers to which the pilot is not allocated can be used as the data subcarrier.

If the pilots are allocated as exemplified in FIG. 55 to FIG. 58, the receiving device can signal-process symbols of a corresponding subband during an N-symbol period (four-symbol period in the examples shown in FIG. 55 to FIG. 58) and extract N pilots, thereby performing the phase tracking. Accordingly, the complexity of the implementation can be reduced and the power consumption efficiency can be improved. Further, the number of data subcarriers can also be increased.

FIG. 59 shows an example where the pilot transmission method exemplified in FIG. 55 is applied to a case that two pilots are used for each subband as shown in FIG. 54. In this case, as shown in FIG. 59, in each subband, the pilot is allocated to the first pilot subcarrier at the k-th symbol and the pilot is allocated to the second pilot subcarrier at the (k+1)-th symbol. Remaining pilot subcarriers to which the pilot is not allocated can be used as the data subcarrier.

FIG. 60 shows an example where the pilot transmission method exemplified in FIG. 56 is applied to a case that two pilots are used for each subband as shown in FIG. 54. In this case, as shown in FIG. 60, the pilots are allocated to the two pilot subcarriers of the k-th symbol in first and third subbands and the pilots are allocated to the two pilot subcarriers of the (k+1)-th symbol in second and fourth subbands.

If the pilots are allocated as exemplified in FIG. 59 and FIG. 60, the receiving device can signal-process symbols of a corresponding subband during a two-symbol period and extract two pilots, thereby performing the phase tracking. Accordingly, the complexity of the implementation can be reduced and the power consumption efficiency can be improved. Further, the number of data subcarriers can also be increased.

A wireless communication network according to one embodiment may use any one method among the pilot transmission methods described with reference to FIG. 55 to FIG. 60. A wireless communication network according to another embodiment may use two or more methods among the pilot transmission methods described with reference to FIG. 55 to FIG. 60. In this case, the transmitting device may transmit pilots by selecting any one method among the two or more pilot transmission methods and indicate the selected pilot transmission method. Information on the pilot transmission method may be included in a HEW signal (HEW-SIG-A or HEW-SIG-B), or may be included in a service field of a data field. Alternatively, the information on the pilot transmission method may be included in an RTS frame or a CTS frame.

Next, a bandwidth division in a wireless communication network according to an embodiment of the present invention is described with reference to FIG. 61, FIG. 62, FIG. 63, and FIG. 64.

FIG. 61, FIG. 62, FIG. 63, and FIG. 64 each show a bandwidth division in a wireless communication network according to various embodiments of the present invention. It is exemplified in FIG. 61 to FIG. 64 that a basic bandwidth, i.e., a 20 MHz bandwidth is divided in a WLAN to which a wireless communication network according to an embodiment of the present invention is applied. Further, it is exemplified in FIG. 61 to FIG. 64 that a HEW dedicated signal field includes a HEW-SIG-A and a HEW-SIG-B in a frame exemplified in FIG. 11.

Figure 61:
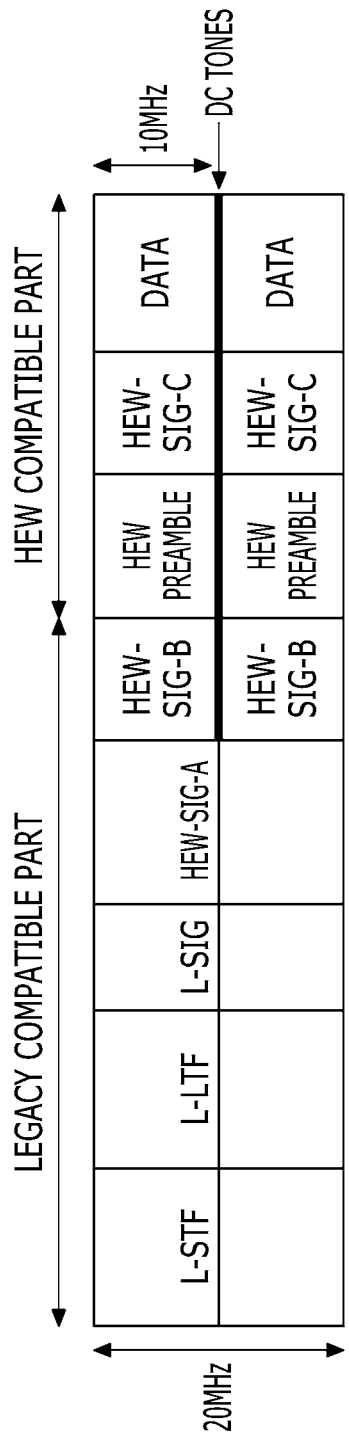
FIG. 61, FIG. 62, FIG. 63, and FIG. 64 each show a bandwidth division in a wireless communication network according to various embodiments of the present invention.

Referring to FIG. 61, the 20 MHz bandwidth is divided into two 10 MHz bandwidth units. Accordingly, a resource block of the 10 MHz bandwidth unit may be allocated to each user.

Figure 62:
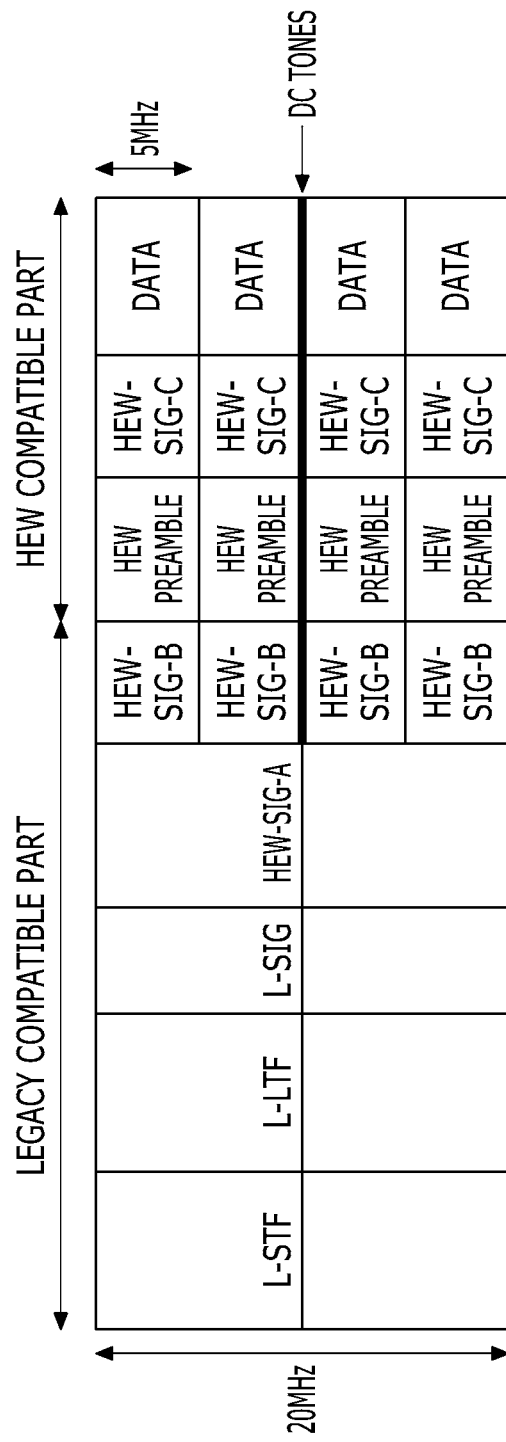

Referring to FIG. 62, the 20 MHz bandwidth is divided into four 5 MHz bandwidth units. Accordingly, a resource block of the 5 MHz bandwidth unit may be allocated to each user.

Figure 63:
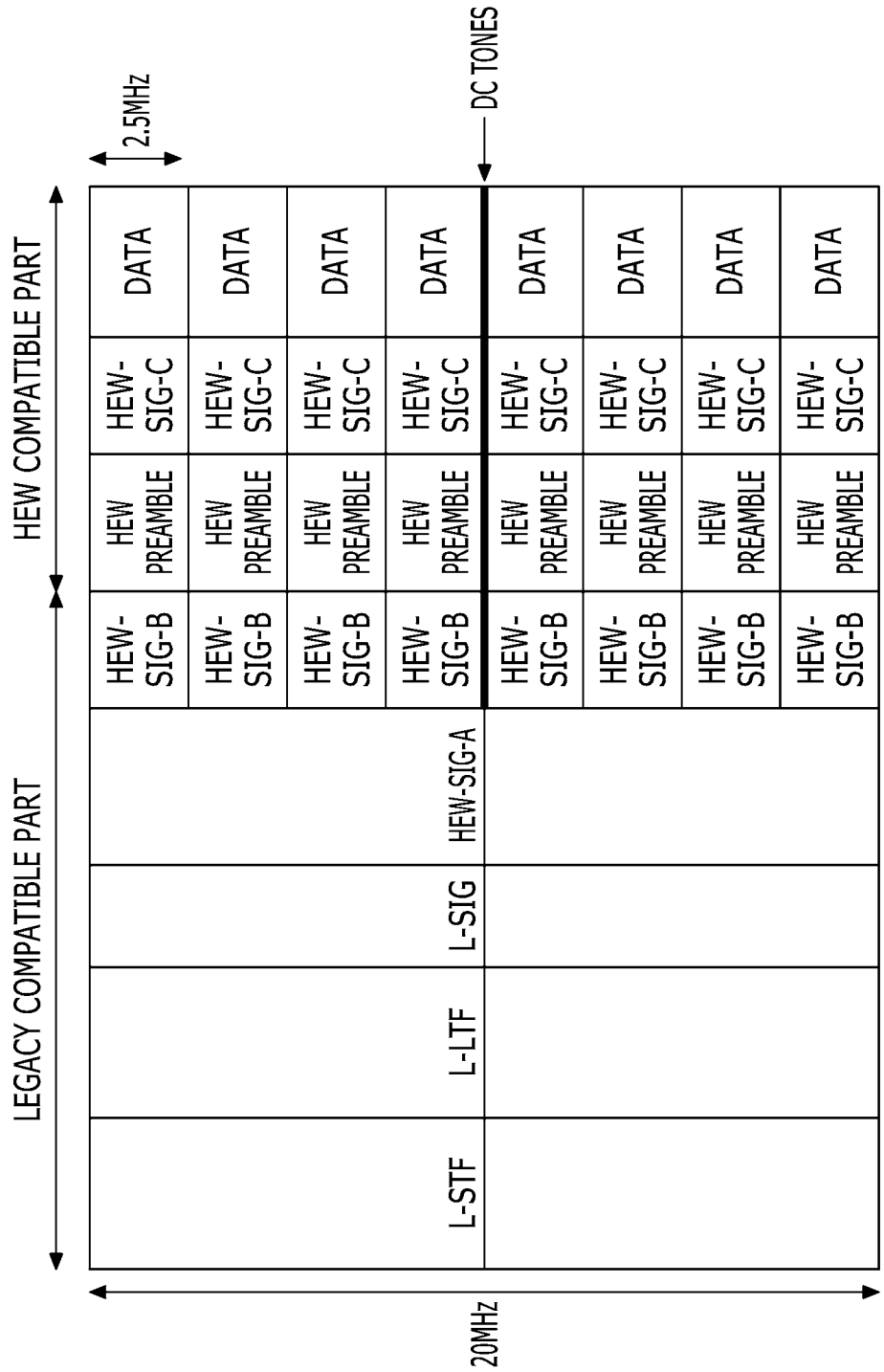

Referring to FIG. 63, the 20 MHz bandwidth is divided into eight 2.5 MHz bandwidth units. Accordingly, a resource block of the 2.5 MHz bandwidth unit may be allocated to each user.

Figure 64:
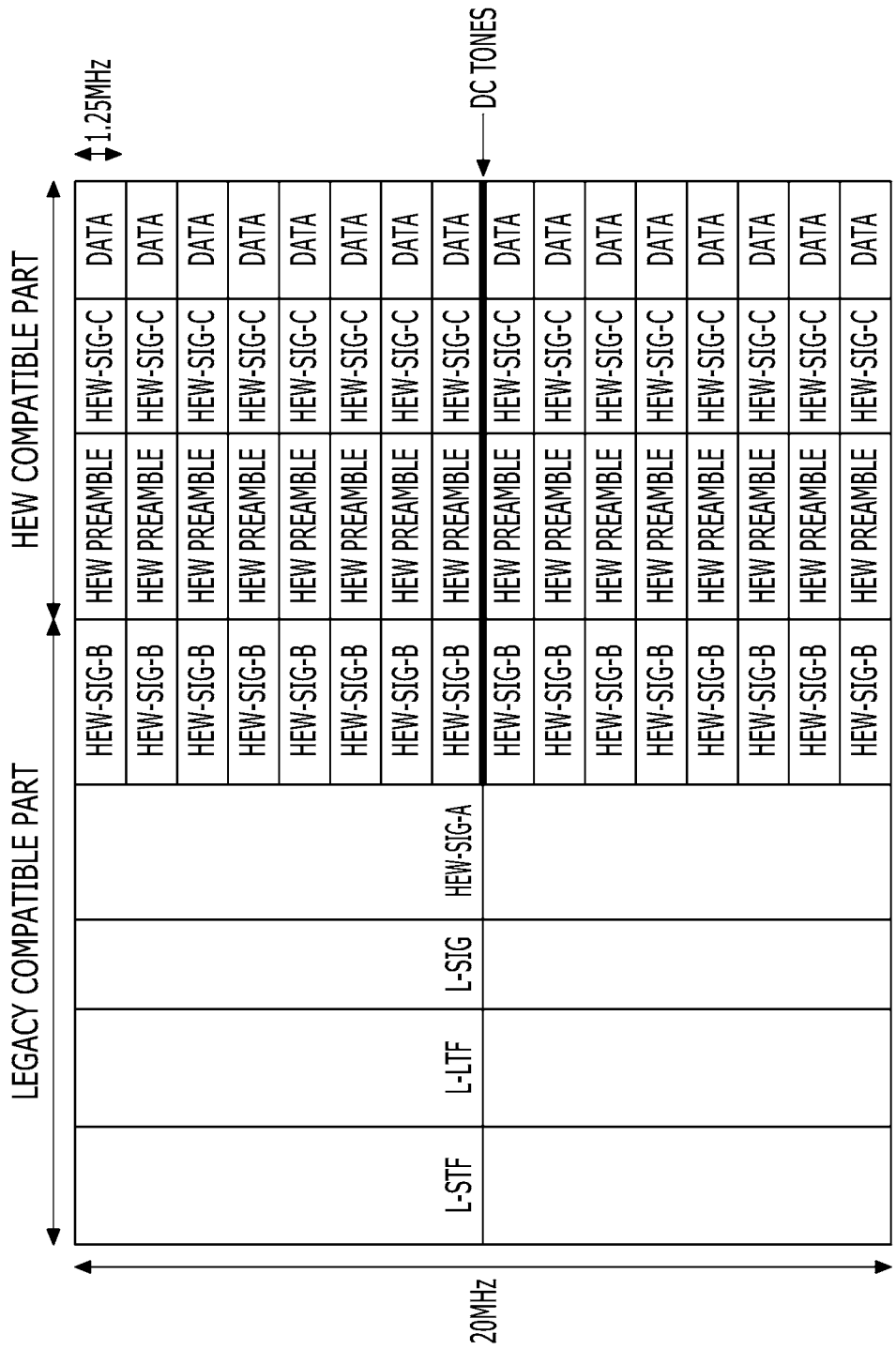

Referring to FIG. 64, the 20 MHz bandwidth is divided into sixteenth 1.25 MHz bandwidth units. Accordingly, a resource block of the 1.25 MHz bandwidth unit may be allocated to each user.

In some embodiments, when tones are allocated to the 20 MHz bandwidth in FIG. 61 to FIG. 64, a DC (direct current) tone may be positioned at a center of the 20 MHz bandwidth.

In some embodiments, a legacy compatible part and a HEW compatible part may have the different number of DC tones or the different number of nulling tones. In one embodiment, the number of DC tones or the number of nulling tones may be varied every frame. In this case, the number of DC tones or the number of nulling tones may be varied according to a request or a response of a transmitting device or a receiving device.

Since the resource block shown in FIG. 61 to FIG. 64 corresponds to a minimum size resource block, the resource blocks are combined such that resource blocks with various sizes can be used. For example, in FIG. 63, a plurality of 2.5 MHz bandwidth resource blocks are combined such that a 5 MHz bandwidth resource block, a 7.5 MHz bandwidth resource block, a 10 MHz bandwidth resource block, a 12.5 MHz bandwidth resource block, a 15 MHz bandwidth resource block, or a 17.5 MHz bandwidth resource block can be used.

If the size of the resource block is small in the OFDMA transmission, optimum resource blocks can be allocated to multi-user with the high resolution in accordance with the channel status such that the channel utilization can be improved. However, if the size of the resource block is too small, the overhead and the complexity are increased such that the efficiency cannot be improved. Accordingly, in some embodiments, any one among the minimum resource block size exemplified in FIG. 61 to FIG. 64 may be selected according to the channel or network status.

In some embodiments, the minimum resource block size may be varied every frame. In one embodiment, the number of guard tones may also be varied every frame. In this case, the minimum resource block size or the number of guard tones may be varied according to a request or a response of a transmitting device or a receiving device.

In some embodiments, the number of DC tones, the number of nulling tones, the minimum resource block size, or the number of guard tones may be varied according to a tone allocation mode, and information on the tone allocation mode may be included in a frame.

Figure 65:
FIG. 65 exemplifies a 40 MHz mode in a wireless communication network according to an embodiment of the present invention.
Figure 66:
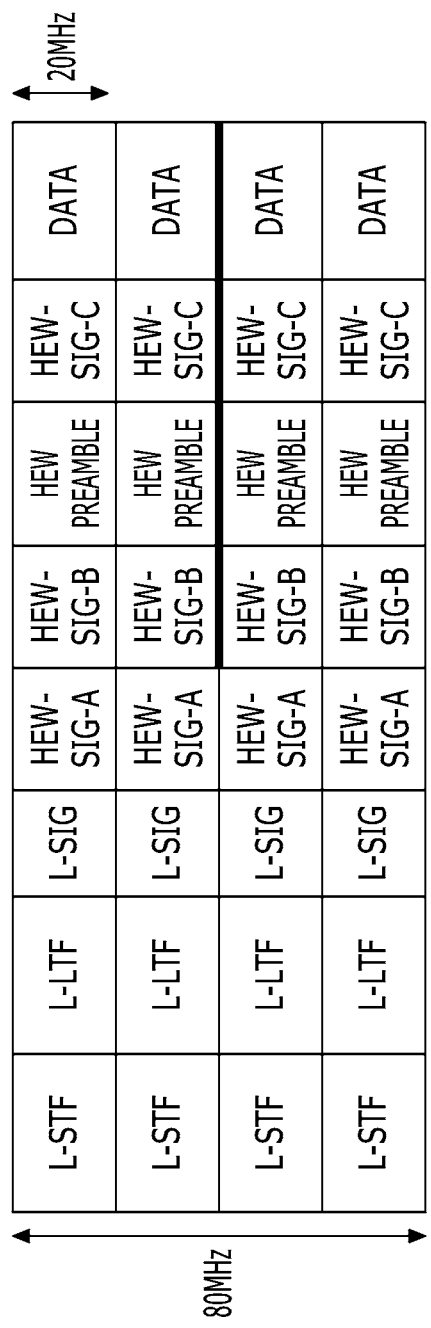
FIG. 66 exemplifies an 80 MHz mode in a wireless communication network according to an embodiment of the present invention.
Figure 67:
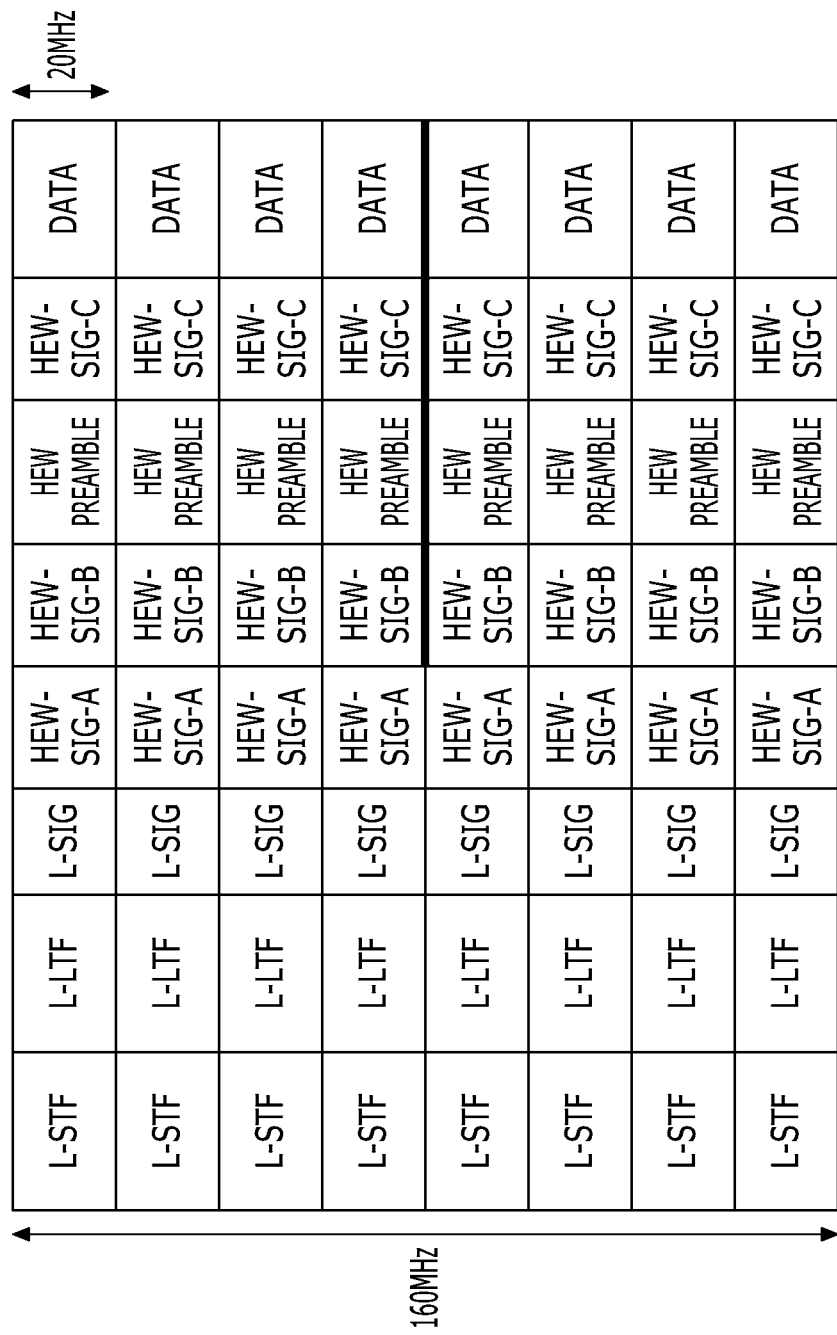
FIG. 67 exemplifies a 160 MHz mode in a wireless communication network according to an embodiment of the present invention.

FIG. 65 exemplifies a 40 MHz mode in a wireless communication network according to an embodiment of the present invention, FIG. 66 exemplifies an 80 MHz mode in a wireless communication network according to an embodiment of the present invention, and FIG. 67 exemplifies a 160 MHz mode in a wireless communication network according to an embodiment of the present invention.

A wireless communication network according to an embodiment of the present invention may support a 20 MHz mode using a 20 MHz bandwidth, a 40 MHz mode using 40 MHz bandwidth, an 80 MHz mode using an 80 MHz bandwidth and a 160 MHz mode using 160 MHz bandwidth based on the 20 MHz bandwidth.

Referring to FIG. 65, the 40 MHz mode may be transmitted by connecting the two 20 MHz bandwidths in the same tone allocation mode. That is, the 40 MHz mode may be transmitted by a replica of the 20 MHz mode.

Referring to FIG. 66, the 80 MHz mode may be transmitted by connecting the four 20 MHz bandwidths in the same tone allocation mode. That is, the 80 MHz mode may be transmitted by a replica of the 20 MHz mode.

While the HEW compatible part has been shown by the 20 MHz bandwidth unit in FIG. 65 and FIG. 66, the HEW compatible part may be represented by 40 MHz or 80 MHz bandwidth unit. That is, when an N point FFT (N FFT) is used in the 20 MHz bandwidth, the 40 MHz mode may be a mode where a 2*N FFT into which two N FFTs are combined is applied to the 40 MHz bandwidth and the 80 MHz mode may be a mode where a 4*N FFT into which four N FFTs are combined is applied to the 80 MHz bandwidth. In this case, N may be 256 as described above.

Referring to FIG. 67, the 160 MHz mode may be transmitted by a replica of the 80 MHz mode.

As shown in FIG. 65, FIG. 66, and FIG. 67, a DC tone may be positioned at a center of each bandwidth.

When a 256 FFT is applied to the 20 MHz bandwidth, subcarrier spacing is 78.125 kHz (=312.5 kHz/4). Since a carrier frequency offset is allowed by 20 ppm in each of a transmission device and a receiving device, the carrier frequency offset of the 5.8 GHz band is up to approximately 232 kHz (=5.8 GHz*40 ppm).

If the carrier frequency offset is not corrected in the WLAN, the frequency orthogonality is not satisfied such that the performance may be degraded. Further, if a transmission local oscillator leakage and a receiving DC offset are combined with the carrier frequency offset, a signal is distorted and is input to a digital circuit in an RF and analog circuit (for example, an RF transceiver of FIG. 1) such that the performance may be degraded. Furthermore, a guard band needs to be sufficiently guaranteed in order to minimize interference to an adjacent channel.

Hereinafter, a tone allocation method for preventing the performance degradation is described with reference to Table 4.

Table 4 shows an example of a tone allocation method in a wireless communication network according to an embodiment of the present invention. It is assumed in Table 4 that a 2.5 MHz bandwidth is a minimum resource block, i.e., a basic resource block. Therefore, a 2.5 MHz mode, a 5 MHz mode, a 10 MHz mode, a 20 MHz mode, a 40 MHz mode, an 80 MHz mode, and a 160 MHz mode may be used.

TABLE 4

| BW | Subcarrier range | DC subcarriers (including nulling tone) | Guard band | # of Pilot subcarriers | # of subcarriers | FFT |
|---|---|---|---|---|---|---|
| 2.5 | −13 to −1, +1 to +13 | DC: 0 Nulling: −3 to −1, +1 to +3 | (3, 2) | 2 | 26 = 24d + 2p | 32 |
| 5 | −29 to −4, +4 to +29 | −3 to +3 | (3, 2) | 4 | 52 = (24d + 2p)*2 | 64 |
| 10 | −58 to −4, +4 to +58 | −3 to +3 | (6, 5) | 6 | 110 = 104(26*4)d + 6p | 128 |
| 20 | −124 to −4, +4 to +124 | −3 to +3 | (4, 3) | 8 | 242 = 234(26*9)d + 8p | 256 |
| 40 | −245 to −4, +4 to +245 | −3 to +3 | (11, 10) | 16 | 484 = 468(26*18)d + 16p | 512 |
| 80 | −500 to −4, +4 to +500 | −3 to +3 | (12, 11) | 32 | 994 = 936(26*37)d + 32p | 1024 |
| 160 | −1012 to −19, +19 to +1012 | −7 to +6 | (12, 11)*2 | 64 | 994*2 = 936*2d + 64p | 1024*2 |

In Table 4, d denotes a data subcarrier and p denotes a pilot subcarrier. For example, 24d+2p means that twenty four data subcarriers and two pilot subcarriers are included. In a guard band, (a,b) means the number (a) of negative guard tones and the number (b) of positive guard tones.

Since the 2.5 MHz mode uses a 32 FFT, 32 subcarriers are used. When an index of a center subcarrier is 0, indices of the 32 subcarriers are −16 to +15.

As described above, the carrier frequency offset condition is maximally about 232 kHz. Accordingly, in order to satisfy the carrier frequency offset condition, three negative subcarriers (i.e., subcarriers whose indices are −3, −2, and −1) and three positive subcarriers (i.e., subcarriers whose indices are +1, +2, and +3) with a DC tone (hereinafter referred to as a "zero DC tone") of the center subcarrier having index 0 as the center may be DC tones. As such, when the 2.5 MHz mode uses seven DC tones, the number of available subcarriers is reduced by the seven DC tones.

Therefore, in some embodiments, the three negative subcarriers (indices −3, −2, and −1) and the three positive subcarriers (indices +1, +2, and +3) near the zero DC tone are used as data subcarriers, and these data subcarriers are nulled and transmitted. Hereinafter, such transmission method is referred to as a nulling transmission method. In this case, since nulled data subcarriers can perform a role of the DC tone, effects by the receiving DC offset and the carrier frequency offset can be reduced. Further, even if a (3,2) guard band is used, 26 available subcarriers can be provided. That is, 26 subcarriers (indices −13 to −1 and +1 to +13) that exclude the DC tone subcarrier (index 0) and the guard tone subcarriers (indices −16, −15, −14, +14, and +15) from 32 subcarriers can be provided as the available subcarriers. The 26 available subcarriers may include 24 data tones and 2 pilot tones, i.e., 24d+2p. That is, the resource block of the 2.5 MHz mode is 26-tone resource block.

In one embodiment, when the 26-tone resource block is used in a center frequency, the transmitting device and the receiving device may support the nulling transmission method.

In another embodiment, an indication indicating whether the nulling transmission method is used may be included in a HEW signal field (HEW-SIG-A). The HEW signal field (HEW-SIG-A) may further include the number of the nulled tones. The legacy compatible part uses a 64 FFT and the HEW compatible part uses a 256 FFT in the frame on the basis of the 20 MHz bandwidth. The nulling transmission method may be applied to the HEW compatible part. Accordingly, the receiving device can identify whether the nulling transmission method is used from the HEW signal field (HEW-SIG-A) of the legacy compatible part and then identify the nulled tones in the HEW compatible part.

Since the 5 MHz mode uses a 64 FFT, 64 subcarriers (indices −32 to +31) are used. Since the 10 MHz mode uses a 128 FFT, 128 subcarriers (indices −64 to +63) are used. Since the 20 MHz mode uses a 256 FFT, 256 subcarriers (indices −128 to +127) are used. Since the 40 MHz mode uses a 512 FFT, 512 subcarriers (indices −256 to +255) are used. Since the 80 MHz mode uses a 1024 FFT, 1024 subcarriers (indices −512 to +511) are used.

In order to satisfy the carrier frequency offset condition, a zero DC tone and three negative subcarriers (indices −3, −2, and −1) and three positive subcarriers (indices +1, +2, and +3) near the zero DC tone may be DC tones. Accordingly, the performance degradation by the channel frequency offset and the receiving DC offset can be minimized. The 5 MHz, 10 MHz, 20 MHz, 40 MHz, and 80 MHz modes may use four pilots, six pilots, eight pilots, sixteen pilots, and thirty-two pilots, respectively.

Therefore, the 5 MHz mode can use 52 available subcarriers (indices −29 to −4 and +4 to +29) including 48 data tones (24*2d) and four pilot tones (2*2p), i.e., (24d+2p)*2. That is, the 5 MHz mode may include two 2.5 MHz resource blocks. Accordingly, a (3,2) guard band, i.e., five guard tones (indices −32, −31, −30, +30, and +31) may be used.

In some embodiments, the 5 MHz mode may be transmitted by a replica of the 2.5 MHz mode. That is, the 5 MHz mode may have the same tone allocation format as the 2.5 MHz mode as shown in Table 4. In one embodiment, the number of data tones used in the replica 2.5 MHz bandwidth of the 5 MHz mode may be different from the number of data tones used in the 2.5 MHz mode. In another embodiment, the number of data tones used in the replica 2.5 MHz bandwidth of the 5 MHz mode may be equal to the number of data tones used in the 2.5 MHz mode. Such 5 MHz mode is called a duplicated mode of the 2.5 MHz mode.

In some embodiments, the 10 MHz, 20 MHz, 40 MHz, 80 MHz, or 160 MHz mode may also be transmitted by a replica of the 2.5 MHz mode or by duplicating the 2.5 MHz mode.

Referring to Table 4 again, the 10 MHz mode may use 110 available subcarriers (indices −58 to −4 and +4 to +58) including 104 data tones (26*2d) and 6 pilot tones (2*3p), i.e., 26*4d+6p. That is, the 10 MHz mode may include four 2.5 MHz resource blocks. Accordingly, a (6,5) guard band, i.e., eleven guard tones (indices −64 to −59 and +59 to +63) may be used.

In some embodiments, the 20 MHz, 40 MHz, 80 MHz, or 160 MHz mode may also be transmitted by a replica of the 10 MHz mode or by duplicating the 10 MHz mode.

Referring to Table 4 again, the 20 MHz mode may use 242 available subcarriers (indices −124 to −4 and +4 to +124) including 234 data tones (26*9d) and 8 pilot tones (2*4p), i.e., 26*9d+8p. That is, the 20 MHz mode may include nine 2.5 MHz resource blocks. Accordingly, a (4,3) guard band, i.e., seven guard tones (indices −128 to −125 and +125 to +127) may be used.

In some embodiment, the 40 MHz, 80 MHz, or 160 MHz mode may also be transmitted by a replica of the 20 MHz mode or by duplicating the 20 MHz mode.

Referring to Table 4 again, the 40 MHz mode may use 484 available subcarriers (indices −245 to −4 and +4 to +245) including 468 data tones (26*18d) and 16 pilot tones (2*8p), i.e., 26*18d+16p. That is, the 40 MHz mode may include eighteen 2.5 MHz resource blocks. Accordingly, a (11,10) guard band, i.e., 21 guard tones (indices −256 to −246 and +246 to +255) may be used.

The 80 MHz mode may use 994 available subcarriers (indices −500 to −4 and +4 to +500) including 936 data tones (26*37d) and 32 pilot tones (2*16p), i.e., 26*37d+32p. That is, the 80 MHz mode may include thirty-seven 2.5 MHz resource blocks. Accordingly, a (12,11) guard band, i.e., 23 guard tones (indices −512 to −501 and +501 to +511) may be used.

In a case that 160 MHz mode is transmitted by the replica of the 80 MHz mode, the 160 MHz mode can be transmitted with the high power compared with a case that the 160 MHz mode is transmitted by a replica of a lower band. In this case, in order to minimize the effect by the channel interference, the number of DC tones may be increased and guard bands may be formed at both ends of the 80 MHz bandwidth.

In some embodiments, as shown in Table 4, the 160 MHz mode may use twice of 1024 subcarriers, i.e., 2048 subcarriers (indices −1024 to +1023). In order to minimize the effect by the channel interference, the subcarriers of indices −7 to +6 may be allocated to the DC tones. Further, (12,11)*2 guard bands, i.e., 42 (=21*2) guard tones (indices −1024 to −1013, −18 to −8, +7 to +18, and +1013 to +1023) may be used. Accordingly, the 160 MHz mode may use 1988 (=994*2) available subcarriers (indices −1012 to −19 and +19 to +1012) including 1872 data tones (936*2d) and 64 pilot tones (32*2p), i.e., 936*2d+32*2p. That is, the 160 MHz mode may include seventy-four 2.5 MHz resource blocks.

In some embodiments, the number of data tones, the number of nulling tones, the number of guard tones, the number of pilot tones, or the minimum resource block size exemplified in Table 4 may be defined by the tone allocation mode, and the tone allocation mode may be varied every frame. In one embodiment, the tone allocation mode may be varied according to a request or a response of a transmitting device or a receiving device.

While it has been assumed in Table 4 that the minimum resource block size is the 2.5 MHz bandwidth, the tones may be allocated in the same way in a case that the minimum resource block size is 5 MHz, 10 MHz, or 20 MHz bandwidth differently from Table 4.

In some embodiments, the duplicated mode may be used for protecting a secondary channel during a transmission interval of a frame or for acquiring receiving diversity.

In some embodiments, information of the duplicated mode may be included in a signal field, for example a HEW signal field (HEW-SIG-A), or may be included in a request frame or a response frame.

In some embodiments, the duplicated mode information may be not notified separately. In this case, a receiving device may detect a bandwidth by using a preamble, for example a HEW preamble and successfully receive a frame. Further, a transmitting device may protect a field after the signal field.

Figure 68:
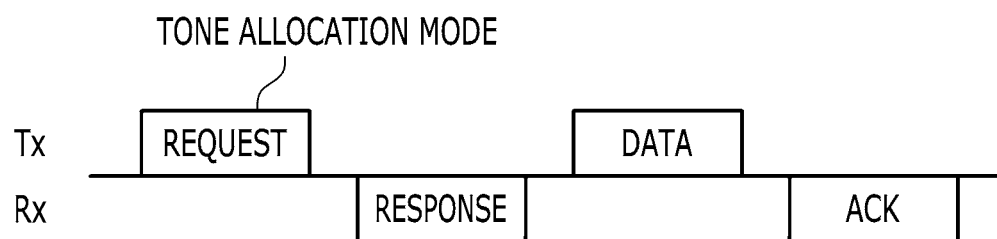
FIG. 68, FIG. 69, and FIG. 70 show various examples of a method for indicating a tone allocation mode in a wireless communication network according to an embodiment of the present invention.
Figure 69:
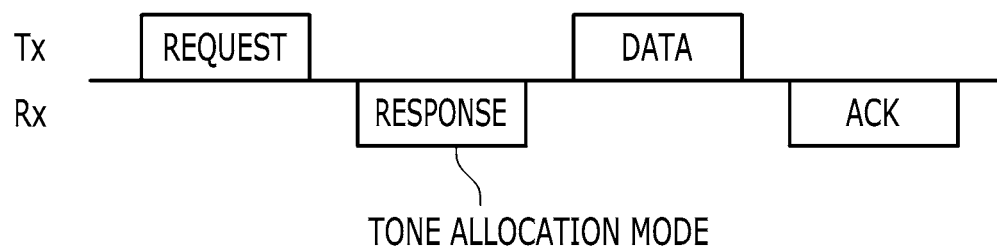
Figure 70:
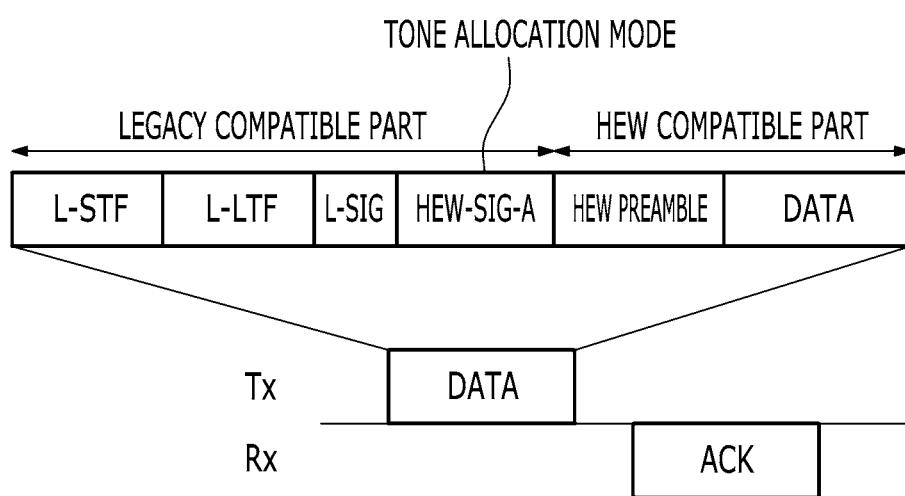

FIG. 68, FIG. 69, and FIG. 70 show various examples of a method for indicating a tone allocation mode in a wireless communication network according to an embodiment of the present invention.

Referring to FIG. 68 and FIG. 69, when a transmitting device has data to be transmitted to a receiving device, the transmitting device transmits a request frame to notify this. A receiver address (RA) field of the request frame is set to an address of the receiving device. The receiving device recognizes that its address matches the RA field of the request frame, and transmits a response frame to the transmitting device. An RA field of the response frame is set to an address of the transmitting device. In this case, the transmitting device and the receiving device may determine a tone allocation mode when exchanging the request frame and the response frame.

Accordingly, the transmitting device transmits a data frame whose tones are allocated according to the tone allocation mode that is determined after receiving the response frame. Since the receiving device knows that the determined tone allocation mode, the receiving device receives the data frame in accordance with the determined tone allocation mode and transmits an ACK frame to the transmitting device. For example, when the tone allocation mode indication indicates that the number of DC tones to be used is seven, the receiving device may remove the subcarriers whose indices are −3, −2, −1, 0, +1, +2, and +3. Alternatively, when the tone allocation mode indication indicates that the number of DC tones to be used is three, the receiving device may remove the subcarriers whose indices are −1, 0, and +1.

In one embodiment, as shown in FIG. 68, a request frame may include a tone allocation mode indication. For example, a HEW signal field (HEW-SIG-A) of the request frame may include the tone allocation mode indication. Therefore, the transmitting device may determine a tone allocation mode to be used for a data frame to be transmitted and may include the tone allocation mode indication indicating the determined tone allocation mode to the request frame. Accordingly, the receiving device can use the determined tone allocation mode at the time of receiving the data frame.

In another embodiment, as shown in FIG. 69, a response frame may include a tone allocation mode indication. For example, a HEW signal field (HEW-SIG-A) of the response frame may include the tone allocation mode indication. Therefore, the receiving device may determine a tone allocation mode to be used for a data frame to be received and may include the tone allocation mode indication indicating the determined tone allocation mode to the response frame. For example, when the receiving device determines that a current condition is an environment whether the performance degradation by the DC offset or channel frequency offset is great, the receiving device may request the transmitting device to allocate many DC tones.

In some embodiment, the request frame and the response frame may be an RTS frame and a CTS frame, respectively.

In another embodiment, the request frame and the response frame may be a request frame and a response frame for a link setup.

Referring to FIG. 70, a data frame may include a tone allocation mode indication. For example, a HEW signal field (HEW-SIG-A) of the data frame may include the tone allocation mode indication. In this case, since the receiving device can identify the tone allocation mode from the HEW signal field (HEW-SIG-A) of a legacy compatible part using a 64 FFT, the receiving device can receive a HEW compatible part to which the tone allocation mode is applied in accordance with the tone allocation mode.

A frame according to above embodiments of the present invention may be transmitted or received by a baseband processor 10 shown in FIG. 1 to FIG. 3. In one embodiment, instructions for transmitting or receiving the frame according to above embodiments of the present invention may be stored in a recording medium such as a memory 40. In another embodiment, at least some of the instructions may be MAC software. In yet another embodiment, at least some of the instructions may be transmitted from a recording medium of a certain server and may be stored in the memory 40.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims. Further, two or more embodiments may be combined.

What is claimed is:

1. A transmitting device for transmitting a frame in a wireless communication network, the transmitting device comprising:
   a processing device; and
   a set of memory units that store instructions, which when executed by the processing device cause the transmitting device to:
   generate a High Efficiency Signal A (HE-SIG-A) field, including a symbol having a first subcarrier spacing, the HE-SIG-A field carrying common signaling information for a set of receiving devices, the HE-SIG-A field being repeated in one or more 20 MHz bands of a bandwidth of the frame,
   generate a data field, including a symbol having a second subcarrier spacing narrower than the first subcarrier spacing,
   generate a High Efficiency Signal B (HE-SIG-B) field carrying HE-SIG-B information in a band of the bandwidth of the frame, the HE-SIG-B information including signaling information for the set of receiving devices, wherein the HE-SIG-B field includes a first part that occupies a first portion of the band of the bandwidth of the frame and a second part that occupies a second portion of the band of the bandwidth of the frame, wherein the first part includes the signaling information and the second part includes a duplicate of the signaling information, and
   transmit the frame, including the HE-SIG-A field, the HE-SIG-B field, and the data field, wherein the HE-SIG-A field is immediately followed in the frame by the HE-SIG-B field.

2. The transmitting device of claim 1, wherein a Fast Fourier Transform (FFT) period of the symbol having the second subcarrier spacing is four times of an FFT period of the symbol having the first subcarrier spacing.

3. The transmitting device of claim 1, wherein the second subcarrier spacing is ¼ of the first subcarrier spacing.

4. The transmitting device of claim 1, wherein the instructions further cause the transmitting device to generate a set of high-efficiency long-training fields (HE-LTFs) for channel estimation,
   wherein the long training field includes another symbol having the second subcarrier spacing.

5. The transmitting device of claim 4, wherein the instructions further cause the transmitting device to:
   generate a high-efficiency short-training field (HE-STF) for automatic gain control; and
   wherein transmitting the frame includes transmitting the HE-STF and the set of HE-LTFs along with the HE-SIG-A field, the HE-SIG-B field, and the data field, and
   wherein, in the frame, the HE-SIG-B field is immediately followed by the HE-STF, the HE-STF is immediately followed by the set of HE-LTFs, and the set of HE-LTFs is immediately followed by the data field.

6. The transmitting device of claim 1, wherein the first portion and the second portion are a same width.

7. The transmitting device of claim 1, wherein the instructions further cause the transmitting device to:
   transmit a guard interval for the symbol having the second subcarrier spacing selected out of a set of guard intervals according to a user or according to a current condition of a channel,
   wherein a first guard interval in the set of guard intervals has a duration of 0.8 µs, a second guard interval in the set of guard intervals has a duration of 1.6 µs, and a third guard interval in the set of guard intervals has a duration of 3.2 µs.

8. A receiving device for processing a frame in a wireless communication network, the receiving device comprising:
   a processing device; and
   a set of memory units that store instructions, which when executed by the processing device cause the receiving device to:
   decode a High Efficiency Signal A (HE-SIG-A) field, including a symbol having a first subcarrier spacing, the HE-SIG-A field carrying signaling information for a set of devices, including the receiving device, the HE-SIG-A field being repeated in one or more 20 MHz bands of a bandwidth of the frame, wherein the decoding of the HE-SIG-A field is on a basis of the first subcarrier spacing,
   decode a High Efficiency Signal B (HE-SIG-B) field carrying HE-SIG-B information in a band of the bandwidth of the frame, the HE-SIG-B information including signaling information for the set of devices, wherein the HE-SIG-B field includes a first part that occupies a first portion of the band of the bandwidth of the frame and a second part that occupies a second portion of the band of the bandwidth of the frame, wherein the first part includes the signaling information and the second part includes a duplicate of the signaling information, and
   decode a data field, including a symbol having a second subcarrier spacing narrower than the first subcarrier spacing, wherein decoding the symbol of the data field is on a basis of the second subcarrier spacing and the HE-SIG-B field.

9. The receiving device of claim 8, wherein a Fast Fourier Transform (FFT) period of the symbol having the second subcarrier spacing is four times of an FFT period of the symbol having the first subcarrier spacing.

10. The receiving device of claim 8, wherein the second subcarrier spacing is ¼ of the first subcarrier spacing.

11. The receiving device of claim 8, wherein the instructions further cause the receiving device to decode a set of high-efficiency long-training fields (HE-LTFs) for channel estimation, wherein the long training field includes another symbol having the second subcarrier spacing.

12. The receiving device of claim 11, wherein the instructions further cause the receiving device to:

decode a high-efficiency short-training field (HE-STF) for automatic gain control; and wherein, in the frame, the HE-SIG-B field is immediately followed by the HE-STF, the HE-STF is immediately followed by the set of HE-LTFs, and the set of HE-LTFs is immediately followed by the data field.

13. The receiving device of claim 8, wherein the first portion and the second portion are a same width.

14. The receiving device of claim 8, wherein the instructions further cause the receiving device to:

process a guard interval for the symbol having the second subcarrier spacing selected out of a set of guard intervals according to a user or according to a current condition of a channel, wherein the guard interval has a duration of 0.8 μs, 1.6 μs, or 3.2 μs.

15. A non-transitory machine-readable storage medium that includes instructions, which when executed by a processor of a receiving device operating in a wireless communication network, cause the receiving device to:

decode a High Efficiency Signal A (HE-SIG-A) field of a frame, including a symbol having a first subcarrier spacing, the HE-SIG-A field carrying signaling information for a set of devices, including the receiving device, the HE-SIG-A field being repeated in one or more 20 MHz bands of a bandwidth of the frame, wherein the decoding of the HE-SIG-A field is on a basis of the first subcarrier spacing;

decode a High Efficiency Signal B (HE-SIG-B) field carrying HE-SIG-B information in a band of the bandwidth of the frame, the HE-SIG-B information including signaling information for the set of devices, wherein the HE-SIG-B field includes a first part that occupies a first portion of the band of the bandwidth of the frame and a second part that occupies a second portion of the band of the bandwidth of the frame, wherein the first part includes the signaling information and the second part includes a duplicate of the signaling information; and decode a data field, including a symbol having a second subcarrier spacing narrower than the first subcarrier spacing, wherein decoding the symbol of the data field is on a basis of the second subcarrier spacing and the HE-SIG-B field.

16. The non-transitory machine-readable storage medium of claim 15, wherein a Fast Fourier Transform (FFT) period of the symbol having the second subcarrier spacing is four times of an FFT period of the symbol having the first subcarrier spacing.

17. The non-transitory machine-readable storage medium of claim 15, wherein the second subcarrier spacing is ¼ of the first subcarrier spacing.

18. The non-transitory machine-readable storage medium of claim 15, wherein the instructions further cause the receiving device to decode a set of high-efficiency long-training fields (HE-LTFs) for channel estimation, wherein the long training field includes another symbol having the second subcarrier spacing.

19. The non-transitory machine-readable storage medium of claim 18, wherein the instructions further cause the receiving device to:

decode a high-efficiency short-training field (HE-STF) for automatic gain control; and wherein, in the frame, the HE-SIG-B field is immediately followed by the HE-STF, the HE-STF is immediately followed by the set of HE-LTFs, and the set of HE-LTFs is immediately followed by the data field.

20. The non-transitory machine-readable storage medium of claim 15, wherein the first portion and the second portion are a same width.

* * * * *